United States Patent
Sudoh et al.

(10) Patent No.: US 12,181,673 B2
(45) Date of Patent: Dec. 31, 2024

(54) PROPAGATION OPTICAL SYSTEM AND VIRTUAL IMAGE DISPLAY DEVICE

(71) Applicants: Yoshifumi Sudoh, Kanagawa (JP); Naoki Nakamura, Saitama (JP); Masahiro Itoh, Kanagawa (JP); Susumu Momma, Kanagawa (JP); Shun Okazaki, Kanagawa (JP); Shigenobu Hirano, Kanagawa (JP); Yasuo Katano, Kanagawa (JP); Kenji Kameyama, Kanagawa (JP); Norikazu Igarashi, Kanagawa (JP); Aino Hasegawa, Kanagawa (JP); Takashi Maki, Kanagawa (JP); Masamichi Yamada, Kanagawa (JP); Takemasa Tsutsui, Kanagawa (JP)

(72) Inventors: Yoshifumi Sudoh, Kanagawa (JP); Naoki Nakamura, Saitama (JP); Masahiro Itoh, Kanagawa (JP); Susumu Momma, Kanagawa (JP); Shun Okazaki, Kanagawa (JP); Shigenobu Hirano, Kanagawa (JP); Yasuo Katano, Kanagawa (JP); Kenji Kameyama, Kanagawa (JP); Norikazu Igarashi, Kanagawa (JP); Aino Hasegawa, Kanagawa (JP); Takashi Maki, Kanagawa (JP); Masamichi Yamada, Kanagawa (JP); Takemasa Tsutsui, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 616 days.

(21) Appl. No.: 17/378,812

(22) Filed: Jul. 19, 2021

(65) Prior Publication Data
US 2022/0026716 A1     Jan. 27, 2022

(30) Foreign Application Priority Data

Jul. 22, 2020 (JP) .............................. 2020-125508
Jun. 14, 2021 (JP) .............................. 2021-098862

(51) Int. Cl.
*G02B 27/01* (2006.01)
*F21V 8/00* (2006.01)
*G02B 3/06* (2006.01)

(52) U.S. Cl.
CPC .......... *G02B 27/0172* (2013.01); *G02B 3/06* (2013.01); *G02B 6/003* (2013.01); *G02B 2027/0145* (2013.01)

(58) Field of Classification Search
CPC ...... G02B 27/0172; G02B 3/06; G02B 6/003; G02B 2027/0145
(Continued)

(56) References Cited

U.S. PATENT DOCUMENTS

| | | | |
|---|---|---|---|
| 5,233,474 A | 8/1993 | Hirakawa | |
| 2003/0086135 A1* | 5/2003 | Takeyama | G02B 27/0081 359/32 |

(Continued)

FOREIGN PATENT DOCUMENTS

| | | |
|---|---|---|
| CN | 103293675 A | 9/2013 |
| CN | 103984098 A | 8/2014 |

(Continued)

OTHER PUBLICATIONS

Chinese Office Action issued Feb. 29, 2024 in corresponding Chinese Patent Application No. 202110774340.X, 13 pages.
(Continued)

*Primary Examiner* — George G. King
(74) *Attorney, Agent, or Firm* — XSENSUS LLP

(57) ABSTRACT

A propagation optical system includes: a first optical system; an intermediate optical element; and a second optical sys-
(Continued)

tem. The first optical system, the intermediate optical element, and the second optical system being sequentially arranged in a direction from the image display element toward the light guide member along an optical axis. The intermediate optical element has a non-rotationally symmetric curved surface, of which shape is non-rotationally symmetric about the optical axis. A cross-sectional shape, of the non-rotationally symmetric curved surface, in a first plane including the optical axis is non-arc shape. The first plane is a plane in which the non-rotationally symmetric surface has a strongest positive power among planes including the optical axis. The propagation optical system is configured to form, between the first optical system and the second optical system, an intermediate image corresponding to an image displayed on the image display element.

20 Claims, 34 Drawing Sheets

(58) Field of Classification Search
USPC .................................................. 359/710, 711
See application file for complete search history.

(56) References Cited

U.S. PATENT DOCUMENTS

| | | |
|---|---|---|
| 2003/0165017 A1 | 9/2003 | Amitai |
| 2010/0276157 A1 | 11/2010 | Kriesels |
| 2012/0243102 A1* | 9/2012 | Takeda .................. G02B 6/003 |
| | | 359/630 |
| 2013/0222919 A1* | 8/2013 | Komatsu ............ G02B 27/0172 |
| | | 359/630 |
| 2014/0226215 A1 | 8/2014 | Komatsu et al. |
| 2016/0178909 A1* | 6/2016 | Komatsu ................ G02B 13/18 |
| | | 345/8 |
| 2016/0320619 A1 | 11/2016 | Watanabe |
| 2017/0090094 A1 | 3/2017 | Ohsugi et al. |
| 2017/0180685 A1 | 6/2017 | Takagi et al. |
| 2017/0184855 A1 | 6/2017 | Takagi et al. |
| 2017/0192239 A1 | 7/2017 | Nakamura et al. |
| 2019/0004235 A1 | 1/2019 | Ohsugi et al. |
| 2019/0353908 A1 | 11/2019 | Igarashi et al. |
| 2020/0400962 A1 | 12/2020 | Hirano et al. |

FOREIGN PATENT DOCUMENTS

| | | | |
|---|---|---|---|
| CN | 104423044 | A | 3/2015 |
| CN | 104932107 | A | 9/2015 |
| CN | 105593745 | A | 5/2016 |
| CN | 106896501 | A | 6/2017 |
| CN | 110261999 | A | 9/2019 |
| JP | H04-261511 | A | 9/1992 |
| JP | 2000-352691 | A | 12/2000 |
| JP | 12012-083458 | | 4/2012 |
| JP | 2012-198260 | | 10/2012 |
| JP | 2013-210633 | | 10/2013 |
| JP | 2017-120384 | A | 7/2017 |
| JP | 2017-122771 | A | 7/2017 |
| JP | 2019-113839 | | 7/2019 |
| WO | WO2009/074638 | A2 | 6/2009 |
| WO | WO-2020188487 | A1 * | 9/2020 ......... G02B 27/0172 |

OTHER PUBLICATIONS

Chinese Office Action issued Jul. 12, 2024 in corresponding Chinese Patent Application No. 202110774340.X, 4 pages.

* cited by examiner

PROPAGATION OPTICAL SYSTEM AND VIRTUAL IMAGE DISPLAY DEVICE

CROSS-REFERENCE TO RELATED APPLICATIONS

This patent application is based on and claims priority pursuant to 35 U.S.C. § 119(a) to Japanese Patent Application No. 2020-125508, filed on Jul. 22, 2020 and Japanese Patent Application No. 2021-098862, filed on Jun. 14, 2021, in the Japan Patent Office, the entire disclosure of which are hereby incorporated by reference herein.

BACKGROUND

Technical Field

Embodiments of the present disclosure relate to a propagation optical system and a virtual image display apparatus.

Related Art

A virtual image display that displays a virtual image of a two-dimensional image enlarged by a virtual-image optical system to allow an observer to observe the virtual image is now widely known as a head mounted display (HMD).

The HMD is roughly classified into a transmissive type and a non-transmissive type: the transmissive type is used in combination with an information processing terminal or used in combination with an augmented reality (AR), and a so-called "smart glass" has recently attracted attention; and the non-transmissive type is widely used in games and virtual reality (VR) because it provides a high sense of immersion.

SUMMARY

A propagation optical system incorporated in a virtual image display device, to propagate light emitted from an image display element to a light guide member to display a virtual image includes: a first optical system; an intermediate optical element; and a second optical system. The first optical system, the intermediate optical element, and the second optical system being sequentially arranged in a direction from the image display element toward the light guide member along an optical axis. The intermediate optical element has a non-rotationally symmetric curved surface, of which shape is non-rotationally symmetric about the optical axis. A cross-sectional shape, of the non-rotationally symmetric curved surface, in a first plane including the optical axis is non-arc shape. The first plane is a plane in which the non-rotationally symmetric surface has a strongest positive power among planes including the optical axis. The propagation optical system is configured to form, between the first optical system and the second optical system, an intermediate image corresponding to an image displayed on the image display element.

A virtual image display device includes an image display element configured to emit light to display an image; the propagation optical system configured to propagate light from the image display element to a light guide member; and the light guide member configured to guide and output the light from the propagation optical system to display a virtual image corresponding to the image displayed by the image display element.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1A:
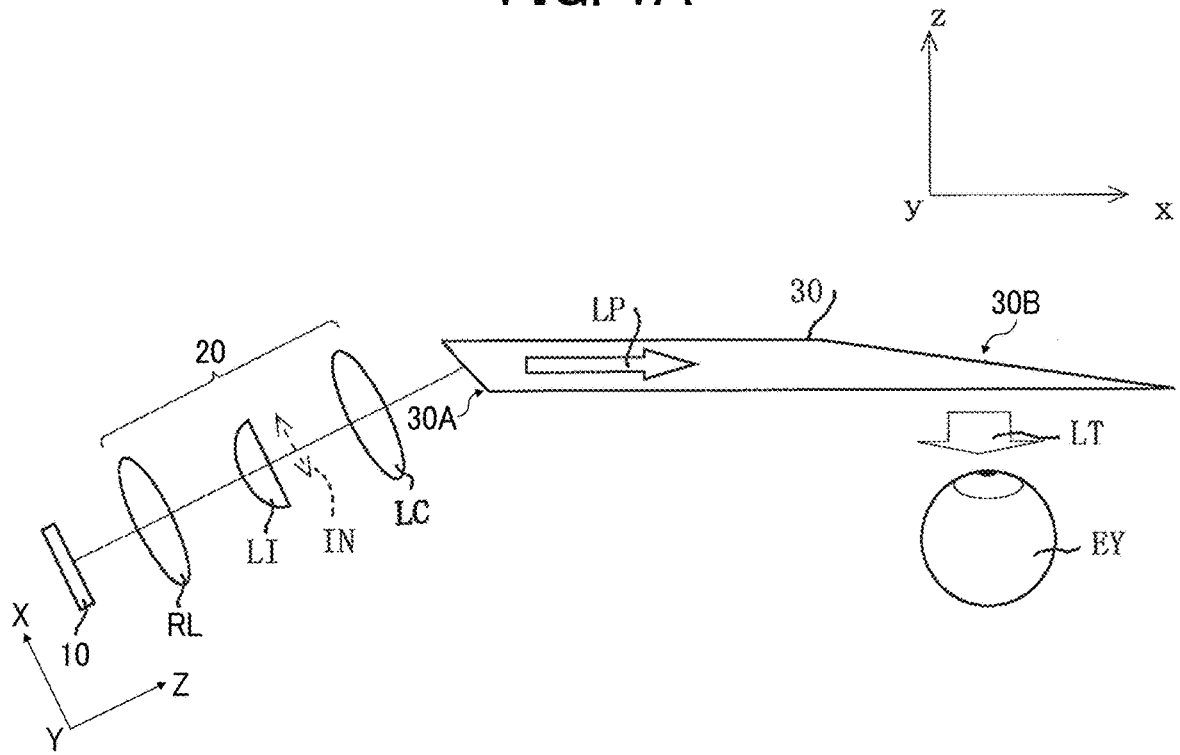
FIGS. 1A and 1B are conceptual diagrams of a virtual image display device.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a," "an," and "the" are intended to include the plural forms as well, unless the context clearly indicates otherwise.

Some embodiments of the present disclosure provide an improved propagation optical system for use in a virtual image display device using a light guide, to propagate an image displayed in an image display element to a light-guide member.

Figure 1B:
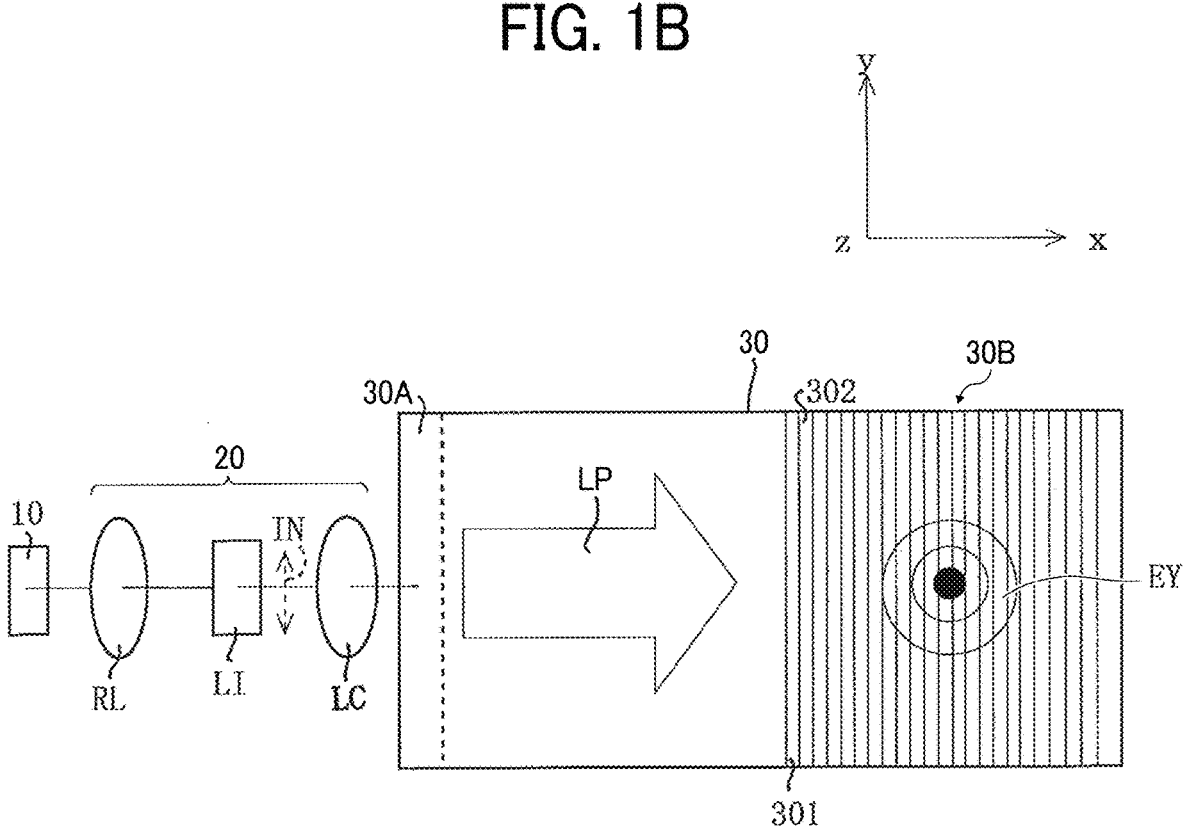

FIGS. 1A and 1B are illustrations of a virtual image display device 100 using a propagation optical system according to an embodiment of the present disclosure. In the example of FIGS. 1A and 1B, the virtual image display device 100 is mounted on an observer as an HMD.

In FIGS. 1A and 1B, the eyes EY of the observer is illustrated.

For the directions x, y, and z in FIGS. 1A and 1B, the y direction (i.e., a direction orthogonal to the drawing sheet in FIG. 1A) is a vertical direction of the observer wearing the HMD.

The virtual image display device 100 includes an image display element 10, a propagation optical system 20, and a light guide member 30.

The image display element 10 serves to display an image to be observed as a virtual image, and is preferably an organic light-emitting diode (OLED) (organic LED) array. Other examples of the image display element 10 include a laser diode (LD) array, a light-emitting diode (LED) array, and a digital micromirror device (DMD).

For the OLED array as the image display element 10, the image display area (i.e., a pixel arrangement area) has a size of, for example, 3 mm×4 mm and has about 10,000 pixels.

When pixels for an image to be displayed are caused to emit light, the images appear on the image display area. Light emitted from the displayed image is incident on the propagation optical system 20.

The propagation optical system 20 according to an embodiment includes a first optical system (RL), an intermediate optical element LI, and a second optical element (LC), which are arranged in that order in a direction from the image display element 10 to the light guide member 30.

In the following description, the first optical system is referred to as a relay optical system, and the second optical system is referred to as a collimator optical system.

At a position between the relay optical system RL as the first optical system and the collimator optical system LC as the second optical system, the propagation optical system 20 forms an intermediate image IN corresponding to the image displayed on the image display element 10, with the light emitted from the image display element 10 and incident on the propagation optical system 20.

In the example of FIGS. 1A and 1B, the intermediate image IN is formed between the intermediate optical element LI and the collimator optical system LC. However, the embodiments of the present disclosure are not limited to this example. In some examples, the intermediate image IN is formed between the relay optical system RL as the first optical system and the intermediate optical element LI. In some other examples, the intermediate image IN is formed inside the intermediate optical element LI.

The intermediate image IN is an object for the virtual image observed by the observer. In other words, the observer observes, through the light guide member 30, an enlarged virtual image formed downstream in the propagation direction of light, by an action of the second optical system (i.e., the collimator optical system LC in the example of FIGS. 1A and 1B) between the intermediate image IN and the light guide member 30.

As illustrated in FIG. 1A, the light guide member 30 has a plate-like form when viewed in the y-direction, and has a wedge portion on the right end of the light guide member 30, serving as an observed-light extraction portion 30B.

Light emitted from the propagation optical system 20 and incident on an incident portion 30A of the light guide member 30 becomes a guided light beam LP, and is guided to the observed-light extraction portion 30B while being repeatedly reflected by planes facing each other in parallel with the z direction in the light guide member 30.

The incident portion 30A of the light guide member 30 has substantially the same thickness (e.g., approximately 2 to 3 mm) as the thickness of the light guide member 30 when viewed in the y-direction.

The light guide member 30 has a rectangular shape when viewed in the z-direction as illustrated in FIG. 1B, and the guided light beam LP has a large width in the y-direction. The light guide member 30 has a length of approximately 20 to 30 mm in the y-direction.

In the light guide member 30, the upper side of the observed-light extraction portion 30B in the z direction as illustrated in FIG. 1A has strip-shaped planar portions 301 and 302 alternated arranged as illustrated in FIG. 1B.

The planar portions 301 each are tilted rightward (i.e., in the x direction) in FIG. 1A at a predetermined tilt angle, and the planar portions 302 each are parallel to the xy plane. In this arrangement, the planar portions 302 form steps at decreasing heights, and the planar portions 301 and 302 form the plane defining a wedge shape of the observed-light extraction portion 30B together with the lower side of the observed-light extraction portion 30B in the z direction in FIG. 1A.

The guided light beam LP is reflected by the planar portions 301, each having a tiled angle, of the observed-light extraction portion 30B and exits as observation image light LT toward the eye EY of the observer. Then, the light to be observed is incident on the eye EY, and forms a conjugate image of a virtual image on the retina. Thus, the observer observes an enlarged virtual image of the image in the z direction.

The relay optical system RL and the collimator optical system LC constituting the propagation optical system 20 are rotationally symmetric with respect to the optical axis and have positive power.

The intermediate optical element LI has a non-rotationally symmetric curved surface having a non-rotationally symmetric shape with respect to the optical axis (the optical axis shared by the relay optical system RL and the collimator optical system LC).

The non-rotationally symmetric curved surface has the strongest positive power in a specific plane (23) including the optical axis of the propagation optical system, among planes including the optical axis. A cross-sectional shape of the non-rotationally symmetric curved surface in the specific plane (23) has a non-arc shape. The specific plane (23) is referred to as a specific cross section. The cross-sectional shape of the non-rotationally symmetric surface (21) in the specific plane (23) is referred to as a shape on a specific cross section. Therefore, the shape in the specific cross section is non-arc curved shape.

To reduce the lens diameter of the collimator lens LC while obtaining a certain optical total length and achieving high performance, the propagation optical system is designed to form an intermediate image.

This can reduce the diameter of the relay optical system RL. The relay optical system RL serves to deal with the need for a space between the image display element and the propagation optical system due to the mechanical structure or an electrical system.

As described above, the propagation optical system 20 is composed of a relay optical system RL, an intermediate optical element LI, and a collimator optical system LC, which are sequentially arranged in a direction from the image display element 10 to the light guide member 30.

As the intermediate image IN is formed between the relay optical system RL and the collimator optical system LC, the non-rotationally symmetric curved surface of the intermediate optical element LI is closer to the intermediate image IN, and spherical aberration and coma aberration caused by the non-rotational symmetry can be reduced.

The specific cross section is preferably parallel with the horizontal direction (i.e., in the x direction in FIGS. 1A and 1B) of the virtual image to be displayed. This arrangement enables the off-axis principal rays of the propagation optical system 20, passing through the specific cross section having the strongest positive power, to intersect with the optical axis at a position near the incident portion 30A of the light guide member 30 to be incident on the incident portion 30A. This thus enables an effective propagation of light to the eyes EY.

Such an arrangement reduces the loss of the principal rays due to the incident portion 30A of the light guide member 30 and increases the utilization efficiency of light, even with the incident portion 30A having a small-width (i.e., the width of the yz plane opposed to the specific cross section) opening. In other words, the loss of the principal rays can be reduced even with a reduction in the width (i.e., a reduction in the size and the weight) of the light guide member 30.

The non-arc shape of the cross-sectional shape in the specific cross section preferably has a decreasing positive power with an increase in distance from the optical axis. This arrangement enables the off-axis principal rays of the propagation optical system 20 to intersect with the optical axis at a position closer to the incident portion 30A, thus enabling light to more effectively propagate to the eyes EY.

Such a shape that has decreasing positive power with an increase in the optical axis satisfies conditional expression (1) where Sag is a maximum difference in the amount of sag between the non-arc shape of the cross-sectional shape in the specific cross section and the arc of the paraxial curvature circle of the non-arc shape, and H is the effective ray height from the optical axis:

$$0.02 < \text{Sag}/H < 0.25 \quad (1)$$

The sign of the sag amount is positive in a direction in which the positive power of the non-arc shape decreases.

When the value exceeds the upper limit of the conditional expression (1), the degree of asphericity excessively increases, and overcorrection due to asphericity easily occurs. When the value falls below the lower limit of the conditional expression (1), undercorrection easily occurs. Failing to satisfy the conditional expression (1) tends to hamper an effective propagation of light to the eyes EY.

The parameter "Sag/H" of the conditional expression (1) more preferably satisfies conditional expression (1A) below:

$$0.05 < \text{Sag}/H < 0.20 \quad (1A)$$

Further, the relay optical system RL is composed of a first front group (hereinafter referred to as a relay front group RL1) having positive power and a first rear group (hereinafter referred to as a relay rear group RL2) having positive power, which are arranged in that order in a direction from the image display element toward the intermediate optical element LI. The distance along the optical axis between the relay front group RL1 and the relay rear group RL2 is longest within the relay optical system RL.

This arrangement achieves successful correction of various aberrations while providing a distance along the optical axis between the relay front group RL1 and the relay rear group RL2 and the total length of the propagation optical system 20, which are sufficient to achieve intended performance.

To achieve such an arrangement, conditional expression (2) is preferably satisfied where TLR is the total length of the relay optical system RL along the optical axis, and TLRa is the distance along the optical axis between the relay front group RL1 and the relay rear group RL2:

$$0.4 < TLRa/TLR < 0.7 \quad (2)$$

When the value exceeds the upper limit of the condition (2), the ratio of the distance between the relay front group RL1 and the relay rear group RL2 to the total length of the relay optical system along the optical axis excessively increases, and the space for the relay front group and the relay rear group is reduced, thus hampering correction of various aberrations. When the value falls below the lower limit of the conditional expression (2), the distance between the relay front group RL1 and the relay rear group RL2 excessively decreases, thus hampering correction of various aberrations within the relay optical system while obtaining the total length of the propagation optical system sufficient to achieve intended performance.

In the configuration of the relay optical system RL consisting of the relay front group RL1 and the relay rear group RL2, the relay front group RL1 sequentially is composed of a positive lens, a negative lens, and a positive lens in the direction from the image display element toward the intermediate optical element LI.

Such a configuration of the relay front group RL1 enables sufficient correction of chromatic aberration, particularly, spherical aberration and coma aberration. Preferably, the lens surfaces of the negative lens and the positive lens are aspheric.

The relay rear group RL2 is composed of two lenses of a positive lens and a negative lens, arranged in that order in the direction from the image display element 10 toward the intermediate optical element LI.

In such a configuration, the two lenses of the positive lens and the negative lens serve to correct the residual aberrations of the relay front group RL1 and the collimator optical system LC, and various aberrations are easily corrected to a sufficient level to achieve intended performance. In the configuration of the relay rear group RL2 composed of the positive lens and the negative lens, each lens surface of the two lenses are preferably aspheric.

In the above-described configuration, the conditional expression (3) is preferably satisfied where TLA is the distance along the optical axis between the non-rotationally symmetric curved surface of the intermediate optical element LI to the surface of the collimator optical system LC, which is closest to the light guide member 30, and TL is the distance along the optical axis between the surface of the relay optical system RL, which is closest to the image display element 10, to the surface of the collimator optical system LC, which is closest to the light guide member 30:

$$0.1 < TLA/TL < 0.5 \quad (3)$$

The "distance" is a value on the optical axis.

When the value exceeds the upper limit of the conditional expression (3), the distance between the non-rotationally symmetric curved surface and the light guide member 30 excessively increases, and the diameter of at least one of the intermediate optical element LI having the non-rotationally symmetric curved surface or the collimator optical system LC tends to excessively increase. When the value falls below the lower limit of the conditional expression (3), the distance between the non-rotationally symmetric curved surface and the light guide member 30 excessively decreases, and the effect of the non-rotationally symmetric curved surface decreases, thus causing the range in which light is incident on the light guide member 30 to excessively increase. Satisfying conditional expression (4) below enables a further downsizing of the propagation optical system 20.

In the above configuration, the conditional expression (4) is preferably satisfied where TLC is the total length of the collimator optical system LC along the optical axis, and TLR is the total length of the relay optical system RL along the optical axis:

$$0.3 < TLC/TLR < 0.6 \tag{4}$$

When the value exceeds the upper limit of the conditional expression (4), the total length of the collimator optical system LC along the optical axis increases, and the diameter of at least one of the the intermediate optical element LI having the non-rotationally symmetric curved surface and the collimator optical system LC tends to excessively increase. When the value falls below the lower limit of the conditional expression (4), the total length of the collimator optical system LC along the optical system decreases, thus hampering correction of various aberrations within the collimator optical system LC.

In the propagation optical system 20, conditional expression (5) is preferably satisfied where β_relay is a lateral magnification of the relay optical system RL:

$$-3.0 < \beta\_relay < -1.0 \tag{5}$$

Increasing the image display area of the image display element 10 increases the size of, for example, parts of the electric system such as a power circuit breaker (PCB), and hampers downsizing of the virtual image display device 100.

The size of the intermediate image is to be increased to increase the angle of view.

In view of such a situation, the conditional expression (5) defines an appropriate range of the lateral magnification β_relay of the relay optical system RL.

The non-rotationally symmetric curved surface (21) of the intermediate optical element LI is, for example, a toroidal surface or a cylindrical surface, and the intermediate optical element LI is a toroidal lens or a cylindrical lens.

In this case, the cylindrical lens as the intermediate optical element LI has another specific plane (26) in which the non-rotationally symmetric curved surface has the weakest positive power (power of 0) in a direction of non-curvature of the non-rotationally symmetric curved surface, and the curved surface shape in the cross section orthogonal to that direction is the non-arc shape as the shape of the specific cross section.

Such a cylindrical lens is processed more easily than a free-form surface lens such as a toroidal lens, and the processing cost can be reduced.

In the above configuration, further satisfying conditional expressions (6) and (7) enables a higher performance of the propagation optical system 20:

$$-0.5 < Pos1/Y < 0.5 \tag{6}$$

In the conditional expression (6), Pos1 is a position of an intermediate image with reference to a position of the non-rotationally symmetric curved surface on the optical axis, and Pos1 is negative when the non-rotationally symmetric curved surface is between the image display element 10 and the intermediate image. Further, Y is the diagonal length of the image display area of the image display element 10.

Failing to satisfy the conditional expression (6) increases the distance between the non-rotationally symmetric curved surface and the intermediate image, and hampers a reduction of occurrence of non-rotationally symmetric spherical aberration and coma aberration.

The propagation optical system 20 preferably satisfies conditional expression (7):

$$0.4 < f\_r/f\_rf < 0.8 \tag{7}$$

where f_r is the focal length (>0) of the relay optical system RL, and f_rf is the focal length of the relay front group RL1.

In the relay optical system RL, the relay front group RL1 mainly serves to form an image and is to be disposed to have an appropriate power arrangement with respect to the relay optical system RL. When the value falls below the lower limit of the conditional expression (7), the focal length of the relay front group RL decreases. When the value falls below the lower limit of the conditional expression (7), the focal length of the relay front group RL1 increases. In both cases, aberrations that occur within the relay front group RL1 are difficult to be sufficiently corrected.

In the virtual image display device, the propagation optical system 20 according to an embodiment described above as illustrated in FIGS. 1A and 1B propagates light forming an image displayed on the image display element 10, which has been emitted from the image display element 10 and incident on the propagation optical system 20, to the light guide member 30. The light is then guided through the light guide member 30 to an outside of the light guide member 30, and is thus displayed as a virtual image of the image.

The virtual image display device 100 described with reference to FIGS. 1A and 1B is, for example, an HMD, and is configured in a glasses type such as smart glasses described above.

Hereinafter, nine examples of the propagation optical system 20 are described.

FIGS. 2 to 6 sequentially illustrate five lens configurations of the propagation optical system 20.

In FIGS. 2 to 6, the X-direction and the Y-direction are defined as follows.

The Y-direction (hereinafter also referred to as the vertical direction) is parallel to the vertical direction of the image display area of the image display element 10. The X direction (hereinafter also referred to as the horizontal direction) is parallel to the horizontal direction of the image display area.

Note that the Y direction is a direction and is different from the diagonal length of the image display area of the image display element described above.

Note that definition of X-direction, Y-direction and Z-direction in FIGS. 2 to 6 is different from that of x-direction, y-direction and z-direction.

The image display area has 3.12 mm in the Y-direction (i.e., the vertical direction), 4.992 mm in the X-direction (i.e., the horizontal direction), and a diagonal length of 5.89 mm in the first to third and fifth examples of the virtual image display device to be described below.

In the fourth example of the propagation optical system 20, the image display area has 2.97 mm in the Y-direction (i.e., the vertical direction), 5.28 mm in the X-direction (i.e., the horizontal direction), and has a diagonal length of 6.06 mm.

In other words, in the virtual image display devices in FIGS. 1A and 1B, a virtual image passed through the light guide member 30 and observed by the observer is a horizontally oriented image and is observed as a plane parallel to the xy plane in FIG. 1A. The longer-side direction of the image display area is set as the horizontal direction (i.e., the x-direction), and the shorter-side direction is set as the vertical direction (i.e., the y-direction), which correspond to the directions of the virtual image.

Further, the direction orthogonal to the X-direction and the Y-direction is set as the Z-direction, which coincides with a direction along the optical axis of the propagation optical system 20.

FIGS. 2A, 3A, 4A, 5A, and 6A are illustrations of a cross-sectional shape of the YZ plane of the propagation optical system 20, and FIGS. 2B, 3B, 4B, 5B, and 6B are illustrations of a cross-sectional shape of the XZ plane of the propagation optical system 20. The left side of the drawing is the object side. In other words, the vertical direction is the Y-direction in FIGS. 2A, 3A, 4A, 5A, and 6A and is the X-direction in FIGS. 2B, 3B, 4B, 5B, and 6B.

In FIGS. 2 to 6, the same reference numerals are used for the purpose of simplification.

Figure 4A:
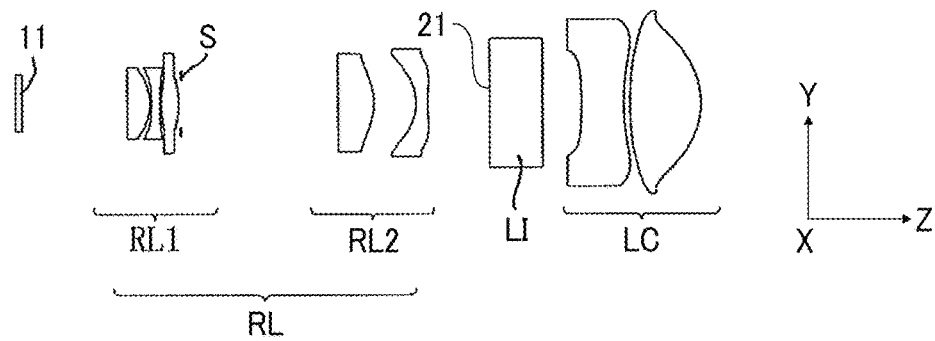
FIGS. 4A and 4B are illustrations of a configuration of a propagation optical system according to a third example.
Figure 4B:
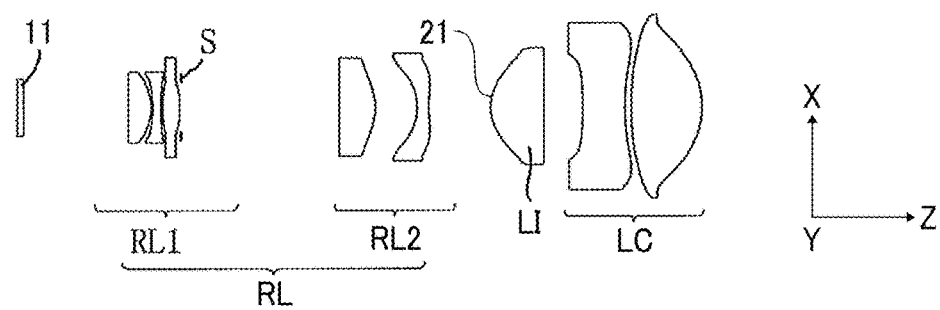
Figure 5A:
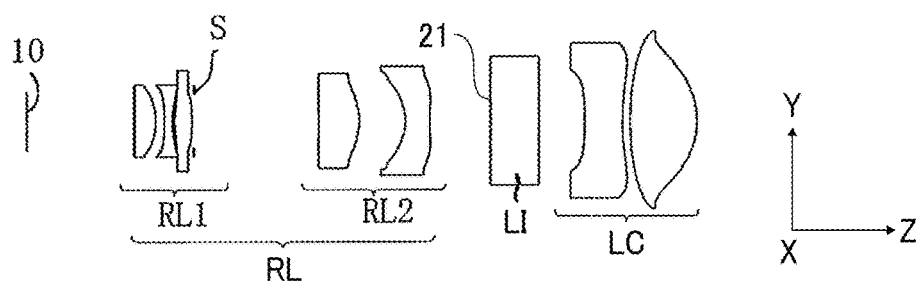
FIGS. 5A and 5B are illustrations of a configuration of a propagation optical system according to a fourth example.
Figure 5B:
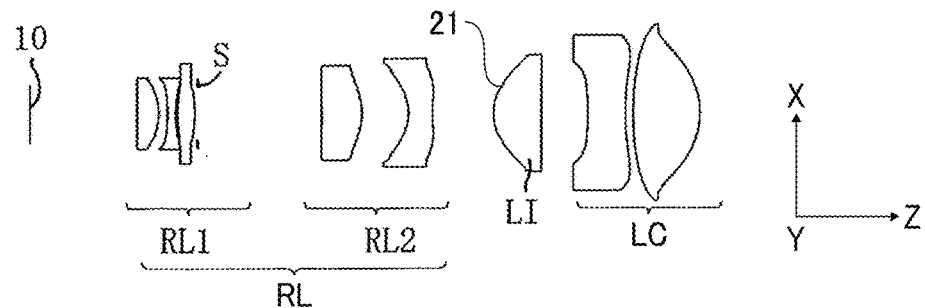

In FIGS. 5A and 5B, an image display surface 10a coincides with the image display area of the image display element 10. In FIGS. 2 to 4, and FIG. 6, a cover glass 11 is mounted on the image display surface 10a.

In each of FIGS. 2 to 6, the propagation optical system 20 sequentially includes a relay optical system RL, an intermediate optical element LI, and a collimator optical system LC in a direction from the image display element 10 (the left side in the drawings) toward the light guide member 30 (the right side in the drawings). Further, the relay optical system RL includes a relay front group RL1 and a relay rear group RL2. FIGS. 2 to 6 illustrates an aperture stop S.

In each example, the relay front group RL1 is composed of three lenses of positive, negative, and positive sequentially arranged in the direction from the image display element 10 toward the light guide member 30, and the relay rear group RL2 is composed of two lenses of positive and negative sequentially arranged in the direction from the image display element 10 toward the light guide member 30. The collimator optical system LC is composed of two lenses of negative and positive sequentially arranged in the direction from the image display element 10 toward the light guide member 30.

All the lenses constituting the relay front lens group RL1, the relay rear lens group RL2, and the collimator optical system LC are rotationally symmetric with respect to the optical axes (i.e., the Z-direction), and the relay front lens group RL1, the relay rear lens group RL2, and the collimator optical system LC, which all include the lenses arranged along the optical axis (i.e., the Z-direction), are also rotationally symmetric with respect to the optical axis.

The relay optical system RL1 and the relay front group RL1 and the relay rear group RL2 constituting the relay optical system RL all have positive power, and the collimator optical system LC also has positive power.

The intermediate optical element LI has no power in the YZ plane and positive power in the XZ plane.

The intermediate optical element LI of the propagation optical system 20 in FIGS. 2 to 6 is a cylindrical lens, one side of the intermediate optical element LI, which is closer to the image display element 10 (i.e., the relay optical system RL), is a cylindrical surface, and the other side closer to the collimator optical system LC is flat.

That cylindrical surface is a non-rotationally symmetric curved surface having a shape non-rotationally symmetric about the optical axis. The specific cross section in which the non-rotationally symmetric surface (21) has the strongest positive power among in the planes all including the optical axis of the relay optical system RL and the optical axis of the collimator optical system is an XY plane (i.e., the horizontal plane including the optical axis) as illustrated in FIGS. 2B, 3B, 4B, 5B, and 6B, and has a non-arc shape.

The following describes five specific examples of the virtual image display device 100 incorporating the propagation optical system 20 according to as illustrated in FIGS. 2 to 6. The symbols in the first example to the fifth example are as follows:

Rx denotes a radius of curvature in the XZ plane;

Ry denotes a radius of curvature in the YZ plane;

D denotes a surface distance;

$N_d$ denotes a refractive index; and $v_d$ denotes an Abbe number

The degree of asphericity: (ξ) of the aspherical surface is given by $$\xi = Ch^2/\{1+\sqrt{\text{square root over }(1-(1+K)C^2h^2)}\} + A_4h^4 + A_6h^6 + A_8h^8 + A_{10}h^{10} \quad \text{(A)}$$

where C denotes the reciprocal of a paraxial curvature radius (i.e., paraxial curvature), H denotes a height from the optical axis, K denotes a conic constant, and A4, A6, A8, and A10 denote the aspherical coefficients of the 4th, 6th, 8th, and 10th orders, respectively.

Unless otherwise specified, the measurement unit of length is mm in the specific data of the following examples.

In the following first example to fifth example, the light guide member is in the form of a parallel plate as a whole, unlike those as described above with reference to FIGS. 1A and 1B. Further, a portion corresponding to the observed-light extraction portion 30B in FIGS. 1A and 1B has multiple semi-transparent surfaces each being tiled in the x-direction.

First Example

Figure 2A:
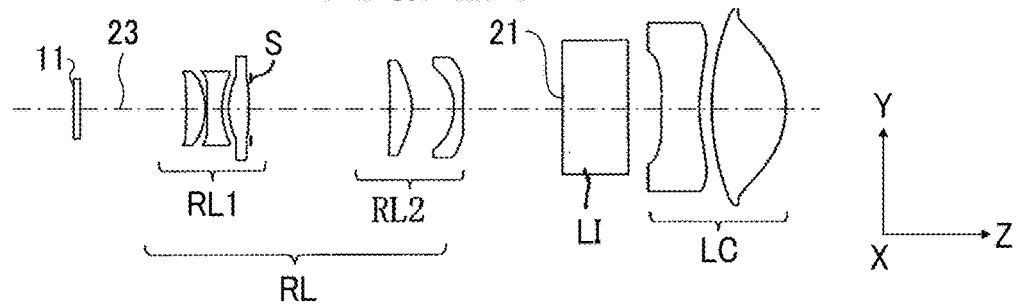
FIGS. 2A and 2B are illustrations of a configuration of a propagation optical system according to a first example.
Figure 2B:
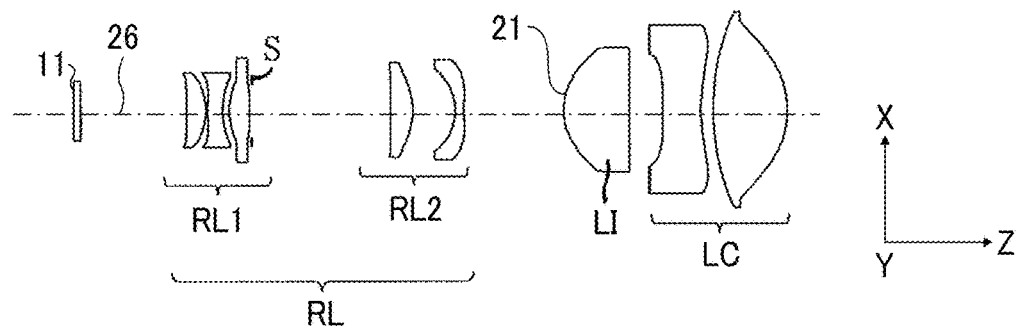

The first example uses the lens configuration of the propagation optical system as illustrated in FIGS. 2A and 2B.

The following describes the angle of view of the propagation optical system in each of the vertical direction (i.e., the y-direction), the horizontal direction (i.e., the x-direction), and the diagonal direction:

Angle of View:

Vertical direction: 17.9 degrees Horizontal direction: 35.5 degrees

Diagonal direction: 40.0 degrees

Virtual image distance: 1 m

Table 1 lists data for the first example.

TABLE 1

|   | Ry | Rx | D | Nd | νd |   |
|---|---|---|---|---|---|---|
| 0 |  |  | 0.00 |  |  |  |
| 1 | ∞ | ∞ | 0.70 | 1.51633 | 64.14 | S-BSL7(OHARA) |
| 2 | ∞ | ∞ | 11.50 |  |  |  |
| 3* | −63.045 | −63.045 | 2.08 | 1.53100 | 56 | E48R(ZEON) |
| 4* | −6.576 | −6.576 | 0.20 |  |  |  |
| 5* | −229.704 | −229.704 | 1.64 | 1.63200 | 23 | OKP4HT(Osaka Gas Chemicals) |
| 6* | 8.048 | 8.048 | 0.72 |  |  |  |
| 7* | 6.165 | 6.165 | 2.26 | 1.53100 | 56 | E48R(ZEON) |
| 8* | −61.294 | −61.294 | 0.20 |  |  |  |
| 9 | STOP |  | 15.12 |  |  |  |
| 10* | −168.219 | −168.219 | 2.48 | 1.53100 | 56 | E48R(ZEON) |
| 11* | −5.916 | −5.916 | 4.61 |  |  |  |
| 12* | −5.134 | −5.134 | 0.94 | 1.53100 | 56 | E48R(ZEON) |
| 13* | 20.079 | 20.079 | 10.94 |  |  |  |
| 14* | ∞ | 6.727 | 7.20 | 1.53100 | 56 | E48R(ZEON) |
| 15 | ∞ | ∞ | 3.58 |  |  |  |
| 16* | −283.972 | −283.972 | 4.20 | 1.63200 | 23 | OKP4HT(Osaka Gas Chemicals) |
| 17* | 20.750 | 20.750 | 1.40 |  |  |  |
| 18* | 37.277 | 37.277 | 8.00 | 1.53100 | 56 | E48R(ZEON) |
| 19* | −9.395 | −9.395 | 1.30 |  |  |  |
| 20 | ∞ | ∞ | 42.69 | 1.53100 | 56 | E48R(ZEON) |
| 21 | ∞ | ∞ |  |  |  |  |

In Table 1, the leftmost column lists the surface numbers, which are sequentially counted from a surface closest to the image display element 10, and the surface of the stop S is also counted. The sign "*" in the column indicates an aspherical surface. The rightmost column lists the product names of the materials of the lenses and other elements together with their manufacturers. The same form applies to the second example to the fifth example described below.

In FIGS. 2A and 2B for the first example, the cover glass 11 is in close contact with the image display surface coincident with the image display area of the image display element 10. In Table 1, the surface number "0" refers to the image display surface, and the surface numbers "1" and "2" refer to the respective surfaces of the cover glass 11.

Further, the surface numbers "3" to "13" refer to the surfaces of the relay optical system RL. The surface numbers "3" to "8" refer to the lenses of the relay front group RL1, which is between the image display element 10 and the stop S with a surface number of 9. The surface numbers "10" to "13" refer to the lenses of the relay rear group RL2.

The surface numbers "14" and "15" refer to the intermediate optical element LI. The intermediate optical element LI is a cylindrical lens having a cylindrical surface of an aspherical shape facing the image display element 10. The value Rx of the surface number "14" is a paraxial curvature of a non-arc shape in the specific cross section.

The surface numbers "16" to "19" refer to the lenses of the collimator optical system LC, and the surface numbers "20" and "21" refer to the light guide member in the form of a parallel plate. The distance between the surface of the surface number "20" and the surface of the surface number "21" is a value converted according to the number of reflections in the light guide member.

The distance between the surface number of 21 and the eye of the observer is an eye relief of 15 mm.

Table 2 lists aspherical-surface data of surfaces (except the surface number "14") to which the mark "*" is attached among the surface numbers of the aspherical surfaces in Table 1.

TABLE 2

|    | K | A4 | A6 | A8 | A10 |
|----|---|----|----|----|-----|
| 3  | 0.000 | −2.61811E−04 | −4.40475E−05 | 1.78961E−05 | −1.21807E−06 |
| 4  | 0.000 | −9.98371E−04 | 3.49580E−04 | −2.90112E−05 | 5.03403E−07 |
| 5  | 0.000 | −9.79694E−04 | 3.62391E−04 | −4.46026E−05 | 1.03563E−06 |
| 6  | 0.000 | −1.68072E−04 | −1.26362E−05 | 9.07903E−06 | −6.34868E−07 |
| 7  | 0.000 | −1.95501E−03 | −1.17213E−04 | 2.27081E−05 | −5.54134E−07 |
| 8  | 0.000 | −1.59575E−03 | −3.31045E−05 | 2.15092E−06 | 4.10687E−07 |
| 10 | 0.000 | 2.75964E−04 | −1.78714E−05 | −1.76136E−07 | 1.58750E−08 |
| 11 | 0.000 | 2.31805E−03 | −4.30037E−05 | 8.54899E−07 | 1.39846E−08 |
| 12 | 0.000 | 2.80696E−03 | −3.24267E−04 | 1.71895E−05 | −2.88910E−07 |
| 13 | 0.000 | −3.56293E−03 | 3.82499E−05 | 1.01405E−06 | −3.24670E−08 |
| 16 | 0.000 | −4.78743E−04 | −4.60809E−06 | 5.68828E−03 | −7.11595E−09 |
| 17 | 0.000 | 4.90218E−05 | −5.91854E−06 | 3.00642E−08 | −9.85769E−11 |
| 18 | 0.000 | 1.77575E−04 | −1.52376E−06 | −4.70266E−09 | 7.97978E−11 |
| 19 | 0.000 | −1.12415E−05 | −4.86714E−08 | 9.07794E−09 | 3.70864E−11 |

In the notation of Table 2, for example, "−2.61811E-04" means "−2.61811×10⁻⁴": The same applies to the following description.

Table 3 lists aspherical-surface data in the XZ plane for the surface number "14" that refers to the specific cross section.

TABLE 3

| | K | A4 | A6 | A8 | A10 |
|---|---|---|---|---|---|
| 14 | 0.000 | 1.04575E-03 | −1.16841E-04 | 3.99306E-06 | −5.33054E-08 |

Table 4 lists the values of parameters of the conditional expressions (1) to (7) of the propagation optical system according to the first example.

TABLE 4

| Sag/H | 0.10 |
|---|---|
| TLRa/TLR | 0.50 |
| TLA/TL | 0.37 |
| TLC/TLR | 0.45 |
| 8_relay | −2.07 |
| Pos1/Y | −0.25 |
| f_r/f_rf | 0.65 |

The value of "H" in the parameter of the conditional expression (1) in Table 4 is 6.0 mm (H=6.0 mm).

Second Example

Figure 3A:
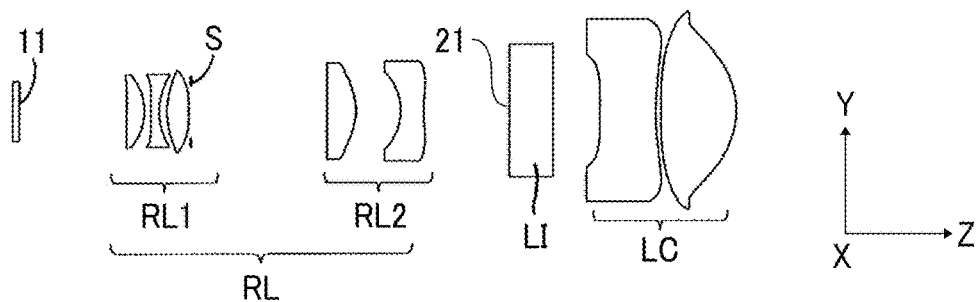
FIGS. 3A and 3B are illustrations of a configuration of a propagation optical system according to a second example.
Figure 3B:
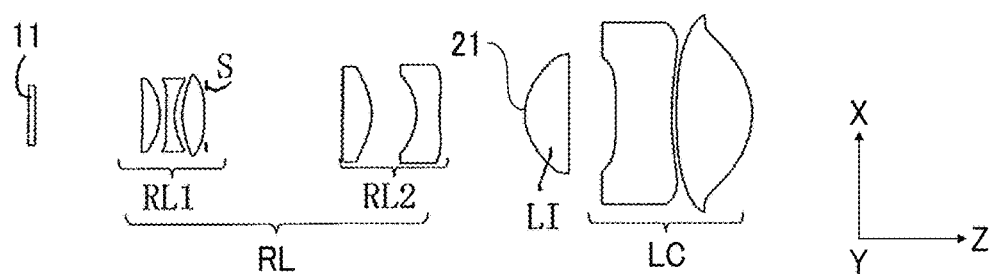

The second example uses the lens configuration of the propagation optical system as illustrated in FIGS. 3A and 3B.

The following describes the angle of view of the propagation optical system in each of the vertical direction (i.e., the y-direction), the horizontal direction (i.e., the x-direction), and the diagonal direction:

Angle-of-View
  Vertical direction: 18.1 degrees Horizontal direction: 35.4 degrees
  Diagonal direction: 39.8 degrees
  Virtual image distance: 1 m
Table 2 lists data for the second example.

In FIGS. 3A and 3B for the second example, the cover glass 11 is in close contact with the image display surface of the image display element 10. In Table 5, the surface number "0" refers to the image display surface, and the surface numbers "1" and "2" refer to the respective surfaces of the cover glass 11.

Further, the surface numbers "3" to "13" refer to the surfaces of the relay optical system RL. The surface numbers "3" to "8" refer to the lenses of the relay front group RL1, which is between the image display element 10 and the stop S with a surface number of 9. The surface numbers "10" to "13" refer to the lenses of the relay rear group RL2.

The surface numbers "14" and "15" refer to the intermediate optical element LI. The intermediate optical element LI is a cylindrical lens having a cylindrical surface of an aspherical shape facing the image display element 10. The value Rx of the surface number "14" is a paraxial curvature of a non-arc shape in the specific cross section.

The surface numbers "16" to "19" refer to the lenses of the collimator optical system LC, and the surface numbers "20" and "21" refer to the light guide member in the form of a parallel plate. The distance between the surface of the surface number "20" and the surface of the surface number "21" is a value converted according to the number of reflections in the light guide member.

The distance between the surface number of 21 and the eye of the observer is an eye relief of 15 mm.

Table 6 lists the aspherical-surface data of the aspherical surfaces as in Table 2.

TABLE 5

| | Ry | Rx | D | Nd | vd | |
|---|---|---|---|---|---|---|
| 0 | | | 0.00 | | | |
| 1 | ∞ | ∞ | 0.70 | 1.51633 | 64.14 | S-BSL7(OHARA) |
| 2 | ∞ | ∞ | 11.52 | | | |
| 3 | −61.813 | −61.813 | 1.92 | 1.53100 | 56 | E48R(ZEON) |
| 4* | −6.139 | −6.139 | 0.71 | | | |
| 5* | −267.271 | −267.271 | 0.90 | 1.63200 | 23 | OKP4HT(Osaka Gas Chemicals) |
| 6 | 7.326 | 7.326 | 0.87 | | | |
| 7* | 7.618 | 7.618 | 2.36 | 1.53100 | 56 | E48R(ZEON) |
| 8* | −26.863 | −26.863 | 0.20 | | | |
| 9 | STOP | | 14.71 | | | |
| 10 | −4011.613 | −4011.613 | 3.19 | 1.53100 | 56 | E48R(ZEON) |
| 11* | −6.013 | −6.013 | 4.79 | | | |
| 12* | −6.029 | −6.029 | 2.50 | 1.53100 | 56 | E48R(ZEON) |
| 13* | 10.744 | 10.744 | 9.34 | | | |
| 14* | ∞ | 6.560 | 4.77 | 1.53100 | 56 | E48R(ZEON) |
| 15 | ∞ | ∞ | 5.10 | | | |
| 16* | −422.579 | −422.579 | 6.00 | 1.63200 | 23 | OKP4HT(Osaka Gas Chemicals) |
| 17* | 36.723 | 36.723 | 0.55 | | | |
| 18* | 68.438 | 68.438 | 8.09 | 1.53100 | 56 | E48R(ZEON) |
| 19* | −9.471 | −9.471 | 1.30 | | | |
| 20* | ∞ | ∞ | 42.69 | 1.53100 | 56 | E48R(ZEON) |
| 21* | ∞ | ∞ | | | | |

TABLE 6

| | K | A4 | A6 | A8 | A10 |
|---|---|---|---|---|---|
| 4 | 0.000 | −3.80082E−05 | 7.13036E−07 | 5.20573E−07 | 1.68679E−08 |
| 5 | 0.000 | −3.55061E−04 | −9.13991E−05 | −4.83027E−06 | 2.49382E−07 |
| 7 | 0.000 | −2.40654E−03 | 2.73867E−05 | 7.15137E−06 | −2.47477E−07 |
| 8 | −35.000 | −2.53952E−03 | −2.46417E−05 | 3.60254E−06 | −7.20825E−08 |
| 11 | 0.000 | 1.75513E−03 | −1.49488E−05 | 3.75649E−07 | 9.00779E−09 |
| 12 | 0.000 | 1.64957E−03 | −1.28225E−04 | 2.47161E−06 | 1.70788E−08 |
| 13 | 0.000 | −3.50273E−03 | 8.47833E−05 | −2.17848E−06 | 3.05921E−08 |
| 16 | 0.000 | −4.79803E−04 | −4.69690E−06 | 2.94030E−08 | −6.03853E−09 |
| 17 | 0.000 | −5.09394E−05 | 1.58555E−06 | −3.03898E−08 | −1.42785E−11 |
| 18 | 0.000 | 5.31855E−06 | 5.99257E−06 | −8.03933E−08 | 3.79922E−10 |
| 19 | −0.517 | −5.22301E−05 | 1.00256E−06 | −1.98443E−08 | 2.68220E−10 |

Table 7 lists aspherical-surface data in the XZ plane for the surface number "14" that refers to the specific cross section.

TABLE 7

| | K | A4 | A6 | A8 | A10 |
|---|---|---|---|---|---|
| 14 | 0.000 | 7.94534E−04 | −1.03141E−04 | 3.62205E−06 | −5.12616E−08 |

Table 8 lists the values of parameters of the conditional expressions (1) to (7) of the propagation optical system according to the second example.

TABLE 8

| Sag/H | 0.13 |
|---|---|
| TLRa/TLR | 0.46 |
| TLA/TL | 0.37 |
| TLC/TLR | 0.46 |
| β_relay | −2.00 |
| Pos1/Y | −0.22 |
| f_r/f_rf | 0.59 |

The value of "H" in the parameter of the conditional expression (1) is 6.0 mm (H=6.0 mm).

Third Example

The third example uses the lens configuration of the propagation optical system as illustrated in FIGS. 4A and 4B.

The following describes the angle of view of the propagation optical system in each of the vertical direction (i.e., the y-direction), the horizontal direction (i.e., the x-direction), and the diagonal direction:

Angle-of-View
  Vertical direction: 18.1 degrees Horizontal direction: 35.9 degrees
  Diagonal direction: 40.1 degrees
  Virtual image distance: 1 m
Table 3 lists data for the second example.

TABLE 9

| | Ry | Rx | D | Nd | νd | |
|---|---|---|---|---|---|---|
| 0 | | | 0.00 | | | |
| 1 | ∞ | ∞ | 0.70 | 1.51633 | 64.14 | S-BSL7(OHARA) |
| 2 | ∞ | ∞ | 11.79 | | | |
| 3 | 1095.716 | 1095.716 | 2.62 | 1.53100 | 56 | E48R(ZEON) |
| 4* | −6.060 | −6.060 | 0.20 | | | |
| 5* | −14.288 | −14.288 | 0.90 | 1.63200 | 23 | OKP4HT(Osaka Gas Chemicals) |
| 6 | 25.047 | 25.047 | 0.20 | | | |
| 7* | 10.859 | 10.859 | 1.85 | 1.53100 | 56 | E48R(ZEON) |
| 8* | −21.467 | −21.467 | 0.20 | | | |
| 9 | STOP | | 18.01 | | | |
| 10 | −2890.588 | −2890.588 | 4.00 | 1.53100 | 56 | E48R(ZEON) |
| 11* | −6.424 | −6.424 | 4.79 | | | |
| 12* | −5.714 | −5.714 | 1.30 | 1.53100 | 56 | E48R(ZEON) |
| 13* | 11.091 | 11.091 | 6.98 | | | |
| 14* | ∞ | 6.526 | 6.00 | 1.53100 | 56 | E48R(ZEON) |
| 15 | ∞ | ∞ | 4.39 | | | |
| 16* | −46.560 | −46.560 | 4.81 | 1.63200 | 23 | OKP4HT(Osaka Gas Chemicals) |
| 17* | 26.657 | 26.657 | 0.74 | | | |
| 18* | 39.028 | 39.028 | 7.96 | 1.53100 | 56 | E48R(ZEON) |
| 19* | −9.147 | −9.147 | 1.30 | | | |
| 20* | ∞ | ∞ | 42.69 | 1.53100 | 56 | E48R(ZEON) |
| 21* | ∞ | ∞ | | | | |

In FIGS. 4A and 4B for the third example, the cover glass 11 is in close contact with the image display surface of the image display element 10. In Table 9, the surface number "0" refers to the image display surface, and the surface numbers "1" and "2" refer to the respective surfaces of the cover glass 11.

Further, the surface numbers "3" to "13" refer to the surfaces of the relay optical system RL. The surface numbers "3" to "8" refer to the lenses of the relay front group RL1, which is between the image display element 10 and the stop S with a surface number of 9. The surface numbers "10" to "13" refer to the lenses of the relay rear group RL2.

The surface numbers "14" and "15" refer to the intermediate optical element LI. The intermediate optical element LI is a cylindrical lens having a cylindrical surface of an aspherical shape facing the image display element 10. The value Rx of the surface number "14" is a paraxial curvature of a non-arc shape in the specific cross section.

The surface numbers "16" to "19" refer to the lenses of the collimator optical system LC, and the surface numbers "20" and "21" refer to the light guide member in the form of a parallel plate. The distance between the surface of the surface number "20" and the surface of the surface number "21" is a value converted according to the number of reflections in the light guide member.

The distance between the surface number of 21 and the eye of the observer is an eye relief of 15 mm.

Table 10 lists the aspherical-surface data of the aspherical surfaces as in Table 2.

Table 12 lists the values of parameters of the conditional expressions (1) to (7) of the propagation optical system according to the third example.

TABLE 12

| Sag/H | 0.11 |
| TLRa/TLR | 0.53 |
| TLA/TL | 0.37 |
| TLC/TLR | 0.40 |
| β_relay | −1.92 |
| Pos1/Y | −0.29 |
| f_r/f_rf | 0.57 |

The value of "H" in the parameter of the conditional expression (1) is 6.0 mm (H=6.0 mm).

Fourth Example

The fourth example uses the lens configuration of the propagation optical system as illustrated in FIGS. 5A and 5B.

The following describes the angle of view of the propagation optical system in each of the vertical direction (i.e.,

TABLE 10

|    | K      | A4           | A6           | A8           | A10          |
|----|--------|--------------|--------------|--------------|--------------|
| 4  | 0.000  | 8.51017E−05  | 6.09650E−06  | −1.57281E−06 | 1.13219E−07  |
| 5  | 0.000  | 6.11496E−05  | −8.52846E−06 | −3.56573E−06 | 2.15850E−07  |
| 7  | 0.000  | −2.40046E−03 | 8.91528E−00  | 6.53305E−06  | −5.24843E−07 |
| 8  | −70.000| −2.69923E−03 | −1.23764E−05 | 2.41996E−06  | −2.45192E−07 |
| 11 | 0.000  | 1.64239E−03  | −1.31771E−05 | 3.60878E−07  | 6.00088E−09  |
| 12 | 0.000  | 5.09632E−04  | −3.72173E−05 | 1.40317E−06  | 3.22115E−08  |
| 13 | 0.000  | −4.62292E−03 | 1.26195E−04  | −2.85056E−06 | 3.65411E−08  |
| 16 | 0.000  | 1.08929E−04  | −3.60636E−05 | 1.21625E−06  | −2.89565E−08 |
| 17 | 0.000  | 6.69376E−05  | −2.29243E−06 | −2.89254E−08 | 1.08118E−10  |
| 18 | 0.000  | −1.03824E−05 | 4.93013E−06  | −9.17496E−08 | 5.12229E−10  |
| 19 | −0.430 | −3.98452E−05 | 5.86308E−07  | −1.41830E−08 | 3.08098E−10  |

Table 11 lists aspherical-surface data in the XZ plane for the surface number "14" that refers to the specific cross section.

TABLE 11

|    | K     | A4          | A6           | A8          | A10          |
|----|-------|-------------|--------------|-------------|--------------|
| 14 | 0.000 | 4.24759E−03 | −3.70432E−04 | 1.15043E−05 | −1.35451E−07 | the y-direction), the horizontal direction (i.e., the x-direction), and the diagonal direction:

Angle-of-View

Vertical direction: 17.2 degrees Horizontal direction: 36.0 degrees

Diagonal direction: 40.0 degrees

Virtual image distance: 1 m

Table 4 lists data for the fourth example.

TABLE 13

|    | Ry       | Rx       | D     | Nd      | vd |                          |
|----|----------|----------|-------|---------|----|--------------------------|
| 0  |          |          | 12.00 |         |    |                          |
| 1  | 289.158  | 289.158  | 2.42  | 1.53100 | 56 | E48R(ZEON)               |
| 2* | −6.387   | −6.387   | 0.92  |         |    |                          |
| 3* | −23.783  | −23.783  | 0.90  | 1.63200 | 23 | OKP4HT(Osaka Gas Chemicals) |
| 4  | 13.401   | 13.401   | 0.21  |         |    |                          |
| 5* | 8.935    | 8.935    | 1.98  | 1.53100 | 56 | E48R(ZEON)               |
| 6* | −23.774  | −23.774  | 0.20  |         |    |                          |
| 7  | STOP     |          | 14.08 |         |    |                          |
| 8  | −276.399 | −276.399 | 4.50  | 1.53100 | 56 | E48R(ZEON)               |

TABLE 13-continued

| | Ry | Rx | D | Nd | νd | |
|---|---|---|---|---|---|---|
| 9* | −6.585 | −6.585 | 5.21 | | | |
| 10* | −5.531 | −5.531 | 2.72 | 1.53100 | 56 | E48R(ZEON) |
| 11* | 14.563 | 14.563 | 6.77 | | | |
| 12* | ∞ | 6.538 | 5.42 | 1.53100 | 56 | E48R(ZEON) |
| 13 | ∞ | ∞ | 5.18 | | | |
| 14* | −32.397 | −32.397 | 4.24 | 1.63200 | 23 | OKP4HT(Osaka Gas Chemicals) |
| 15* | 30.575 | 30.575 | 0.90 | | | |
| 16* | 40.115 | 40.115 | 7.43 | 1.53100 | 56 | E48R(ZEON) |
| 17* | −8.770 | −8.770 | 1.30 | | | |
| 18* | ∞ | ∞ | 42.69 | 1.53100 | 56 | E48R(ZEON) |
| 19* | ∞ | ∞ | | | | |

In FIGS. 5A and 5B for the fourth example, the image display surface 10a of the image display element 10 is illustrated. In Table 13, the surface number "0" refers to the image display surface 10a. Further, the surface numbers "1" to "11" refer to the surfaces of the relay optical system RL. The surface numbers "1" to "6" refer to the lenses of the relay front group RL1, which is between the image display element 10 and the stop S with a surface number of 7. The surface numbers "8" to "11" refer to the lenses of the relay rear group RL2.

The surface numbers "14" and "15" refer to the intermediate optical element LI. The intermediate optical element LI is a cylindrical lens having a cylindrical surface of an aspherical shape facing the image display element 10. The value Rx of the surface number "12" is a paraxial curvature of a non-arc shape in the specific cross section.

The surface numbers "14" to "17" refer to the lenses of the collimator optical system LC, and the surface numbers "18" and "19" refer to the light guide member in the form of a parallel plate. The distance between the surface of the surface number "18" and the surface of the surface number "19" is a value converted according to the number of reflections in the light guide member.

The distance between the surface number of 21 and the eye of the observer is an eye relief of 15 mm.

Table 14 lists the aspherical-surface data of the aspherical surfaces as in Table 2.

TABLE 14

| | K | A4 | A6 | A8 | A10 |
|---|---|---|---|---|---|
| 2 | 0.000 | 2.02617E−04 | 3.81441E−06 | −1.09458E−06 | 5.73506E−08 |
| 3 | 0.000 | 2.02617E−04 | 3.81441E−06 | −1.09458E−06 | 5.73506E−08 |
| 5 | 0.000 | −2.48736E−03 | 6.96418E−06 | 5.84594E−06 | −5.06996E−07 |
| 6 | −70.000 | −2.84051E−03 | −2.41278E−05 | 1.50140E−06 | −2.35530E−07 |
| 9 | 0.000 | 1.43493E−03 | −7.97213E−06 | 3.30661E−07 | 8.04386E−09 |
| 10 | 0.000 | 1.43493E−03 | −7.97213E−06 | 3.30661E−07 | 8.04386E−09 |
| 11 | 0.000 | 1.43498E−03 | −7.97213E−00 | 3.30661E−07 | 8.04386E−09 |
| 14 | 0.000 | −6.04597E−05 | −3.41907E−05 | 1.03311E−06 | −2.87406E−08 |
| 15 | 0.000 | −6.04597E−05 | −3.41907E−05 | 1.03311E−06 | −2.87406E−08 |
| 16 | 0.000 | −6.04597E−05 | −3.41907E−05 | 1.03311E−06 | −2.87406E−08 |
| 17 | −0.465 | −3.28683E−05 | 5.26193E−07 | −8.57003E−09 | 3.57991E−10 |

Table 15 lists aspherical-surface data in the XZ plane for the surface number "12" that refers to the specific cross section.

TABLE 15

| | K | A4 | A6 | A8 | A10 |
|---|---|---|---|---|---|
| 12 | 0.000 | 5.03879E−03 | −4.57696E−04 | 1.46891E−05 | −1.72588E−07 |

Table 16 lists the values of parameters of the conditional expressions (1) to (7) of the propagation optical system according to the fourth example.

TABLE 16

| | |
|---|---|
| Sag/H | 0.10 |
| TLRa/TLR | 0.42 |
| TLA/TL | 0.37 |
| TLC/TLR | 0.38 |
| β_relay | −1.98 |
| Pos1/Y | −0.19 |
| f_r/f_rf | 0.57 |

The value of "H" in the parameter of the conditional expression (1) is 6.0 mm (H=6.0 mm).

Fifth Example

Figure 6A:
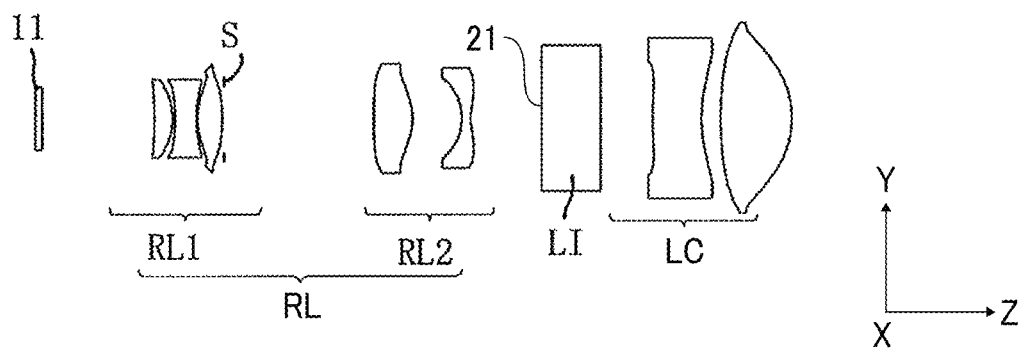
FIGS. 6A and 6B are illustrations of a configuration of a propagation optical system according to a fifth example.
Figure 6B:
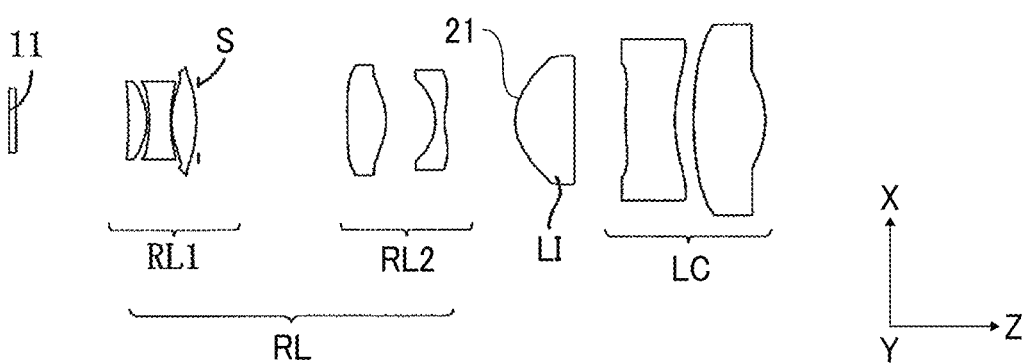

The fifth example uses the lens configuration of the propagation optical system as illustrated in FIGS. 6A and 6B.

The following describes the angle of view of the propagation optical system in each of the vertical direction (i.e., the y-direction), the horizontal direction (i.e., the x-direction), and the diagonal direction:

Angle-of-View
  Vertical direction (y-direction): 19.6 degrees Horizontal direction (x-direction): 34.7 degrees
  Diagonal direction: 40.0 degrees The virtual image distance is substantially at infinity.

Table 17 lists data for the fifth example as in Table 1.

TABLE 17

| | Ry | Rx | D | Nd | νd | |
|---|---|---|---|---|---|---|
| 0 | | | 0.00 | | | |
| 1 | ∞ | ∞ | 0.70 | 1.51633 | 64.14 | S-BSL7(OHARA) |
| 2 | ∞ | ∞ | 11.50 | | | |
| 3* | −26.652 | −26.652 | 1.86 | 1.53100 | 56 | E48R(ZEON) |
| 4* | −6.422 | −6.422 | 0.23 | | | |
| 5* | −21.541 | −21.541 | 2.22 | 1.63200 | 23 | OKP4HT(Osaka Gas Chemicals) |
| 6* | 13.816 | 13.816 | 0.12 | | | |
| 7* | 7.759 | 7.759 | 2.51 | 1.53100 | 56 | E48R(ZEON) |
| 8* | −17.711 | −17.711 | 0.20 | | | |
| 9 | STOP | | 15.22 | | | |
| 10* | 140.342 | 140.342 | 3.89 | 1.53100 | 56 | E48R(ZEON) |
| 11* | −5.932 | −5.932 | 5.04 | | | |
| 12* | −4.808 | −4.808 | 0.93 | 1.53100 | 56 | E48R(ZEON) |
| 13* | 7.481 | 7.481 | 7.23 | | | |
| 14* | ∞ | 6.584 | 6.00 | 1.53100 | 56 | E48R(ZEON) |
| 15 | ∞ | ∞ | 5.32 | | | |
| 16* | −29.687 | −29.687 | 5.00 | 1.63200 | 23 | OKP4HT(Osaka Gas Chemicals) |
| 17* | 18.358 | 18.358 | 1.91 | | | |
| 18* | 52.344 | 52.344 | 7.30 | 1.53100 | 56 | E48R(ZEON) |
| 19* | −9.383 | −9.383 | 1.30 | | | |
| 20 | ∞ | ∞ | 42.69 | 1.53100 | 56 | E48R(ZEON) |
| 21 | ∞ | ∞ | | | | |

Table 18 lists the aspherical-surface data of the aspherical surfaces as in Table 2.

TABLE 18

| | K | A4 | A6 | A8 | A10 |
|---|---|---|---|---|---|
| 3 | 0.000 | 5.50110E−04 | −7.02951E−05 | 1.56971E−05 | −8.30744E−07 |
| 4 | 0.000 | −1.56030E−03 | 4.23722E−04 | −2.61406E−05 | 3.47790E−07 |
| 5 | 0.000 | −2.52881E−03 | 5.39148E−04 | −4.53234E−05 | 9.72345E−07 |
| 6 | 0.000 | −2.11284E−04 | 7.53890E−06 | 2.94117E−06 | −2.50419E−07 |
| 7 | 0.000 | −6.27722E−04 | −1.66001E−05 | 1.65980E−05 | −4.98434E−07 |
| 8 | 0.000 | −4.36807E−04 | −7.30603E−05 | 4.44546E−06 | −5.71817E−08 |
| 10 | 0.000 | 6.22769E−04 | −2.83778E−05 | 1.50134E−06 | −1.61817E−08 |
| 11 | 0.000 | 2.52486E−03 | −5.61126E−05 | 1.94691E−06 | 4.08042E−09 |
| 12 | 0.000 | 4.17141E−03 | −5.90815E−05 | 3.82098E−05 | −7.89407E−07 |
| 13 | 0.000 | −5.30193E−03 | 9.15326E−05 | 1.14394E−06 | −5.98876E−08 |
| 16 | 0.000 | −4.78743E−04 | −4.60809E−06 | 5.68828E−08 | −7.11595E−09 |
| 17 | 0.000 | 1.62407E−04 | −9.09702E−06 | 9.10528E−08 | −5.86605E−10 |
| 18 | 0.000 | 9.60691E−05 | 1.82183E−06 | −3.71149E−08 | 2.13800E−10 |
| 19 | −0.422 | −5.12818E−05 | 1.62730E−06 | −2.33181E−08 | 3.15585E−10 |

Table 19 lists aspherical-surface data in the XZ plane for the surface number "14" that refers to the specific cross section.

TABLE 19

| | K | A4 | A6 | A8 | A10 |
|---|---|---|---|---|---|
| 14 | 0.000 | 3.86589E−03 | −3.65998E−04 | 1.18369E−05 | −1.39643E−07 |

Table 20 lists the values of parameters of the conditional expressions (1) to (7) of the propagation optical system according to the fifth example.

TABLE 20

| | |
|---|---|
| Sag/H | 0.10 |
| TLRa/TLR | 0.47 |
| TLA/TL | 0.39 |
| TLC/TLR | 0.44 |
| β_relay | −2.06 |
| Pos1/Y | 0.03 |
| f_r/f_rf | 0.50 |

The value of "H" in the parameter of the conditional expression (1) is 6.0 mm (H=6.0 mm).

FIGS. 8 to 12 are lateral aberration diagrams of the propagation optical systems according to the first example to the fifth example.

Figure 7:
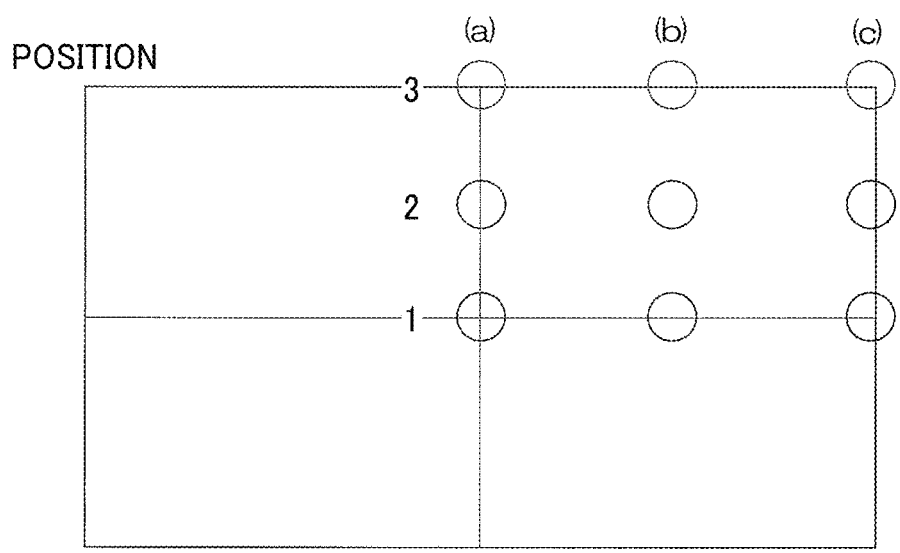
FIG. 7 is an illustration of positions on a virtual image in a propagation optical system according to an embodiment.

The lateral aberrations in those diagrams each are at a position defined by a combination of the vertical positions "1", "2", and "3" and the horizontal (lateral) positions (a), (b), and (c) in a virtual image as illustrated in FIG. 7.

Figure 8A:
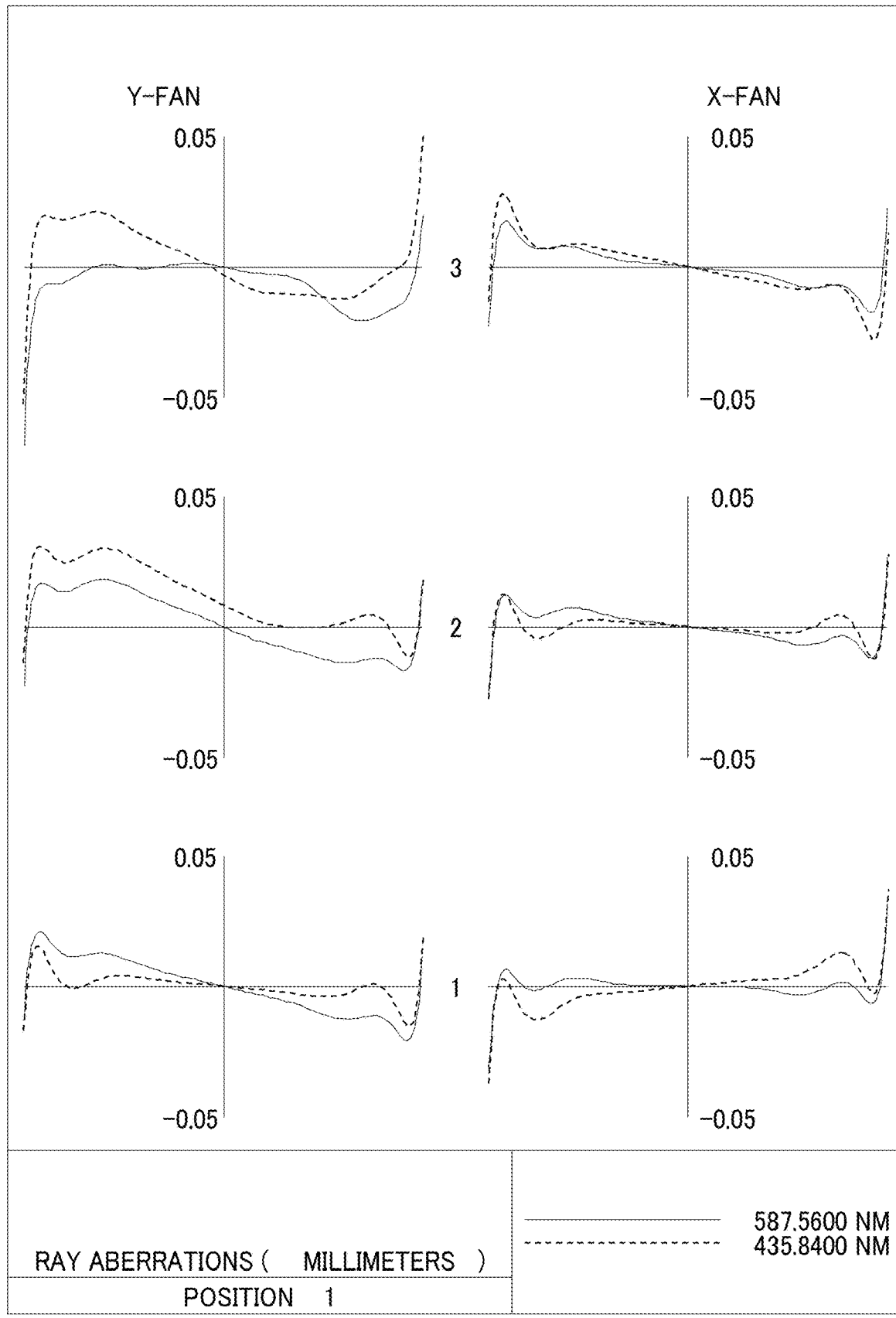
FIGS. 8A, 8B, and 8C are lateral aberration diagrams of the propagation optical system according to the first example.
Figure 8B:
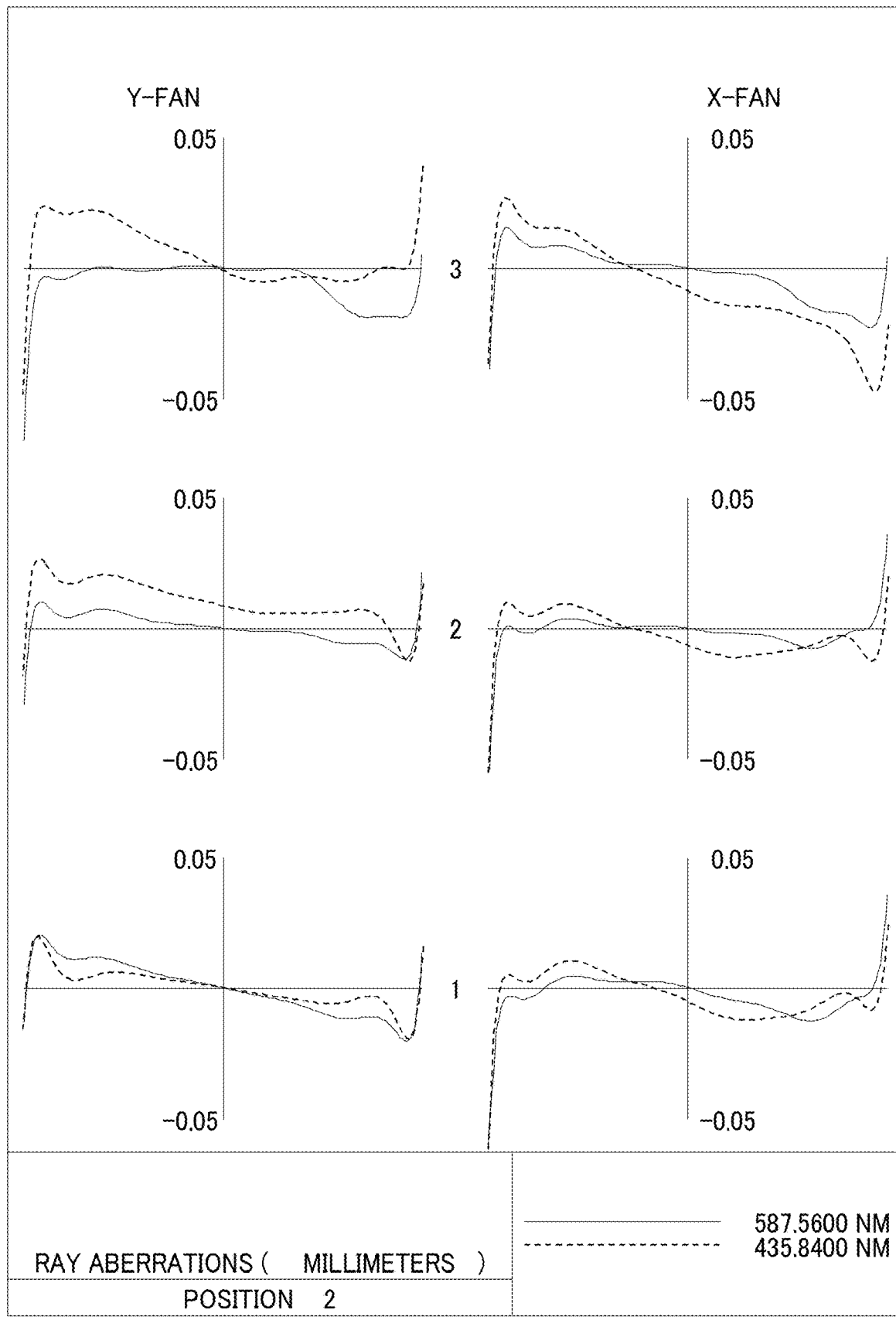
Figure 8C:
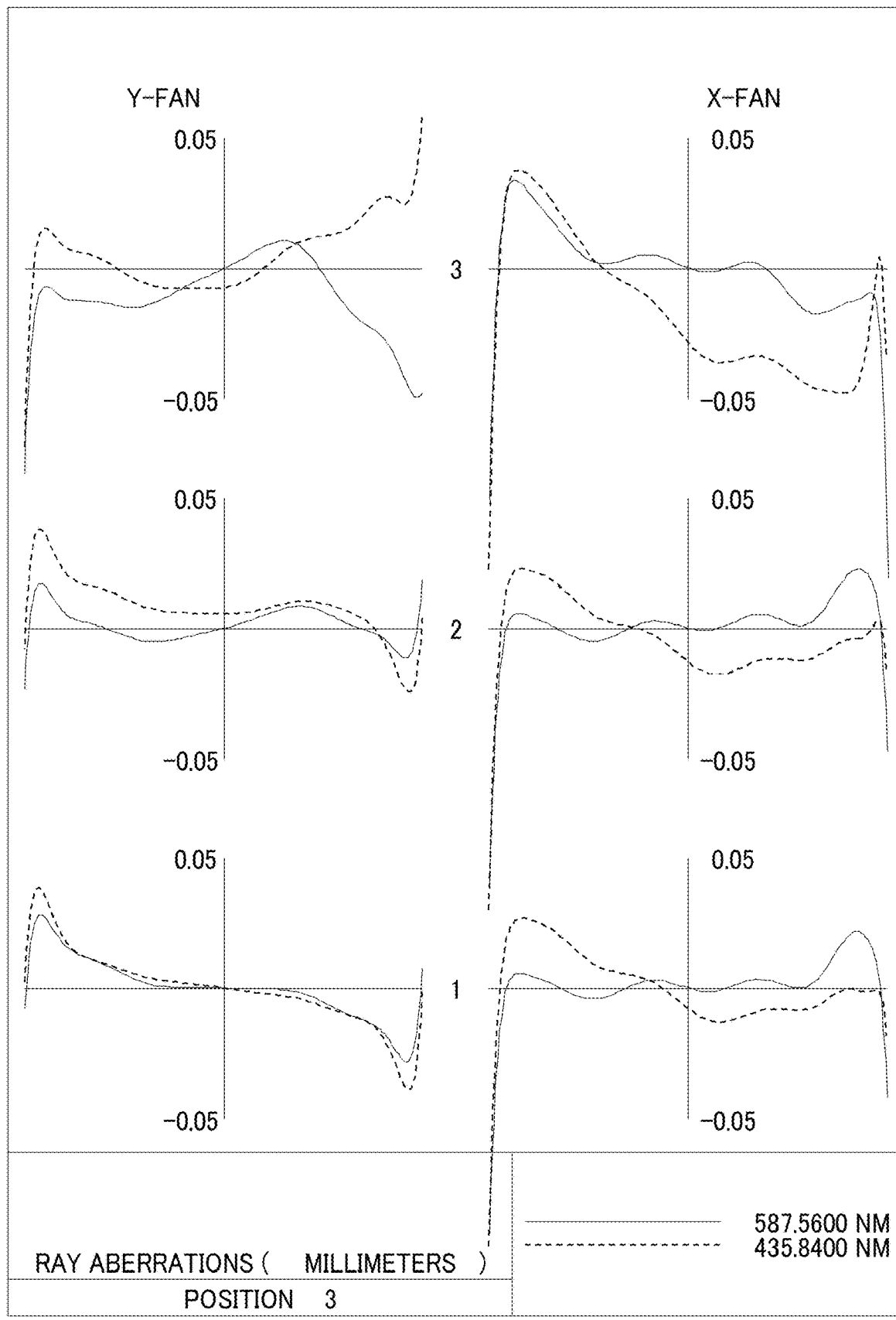
Figure 9A:
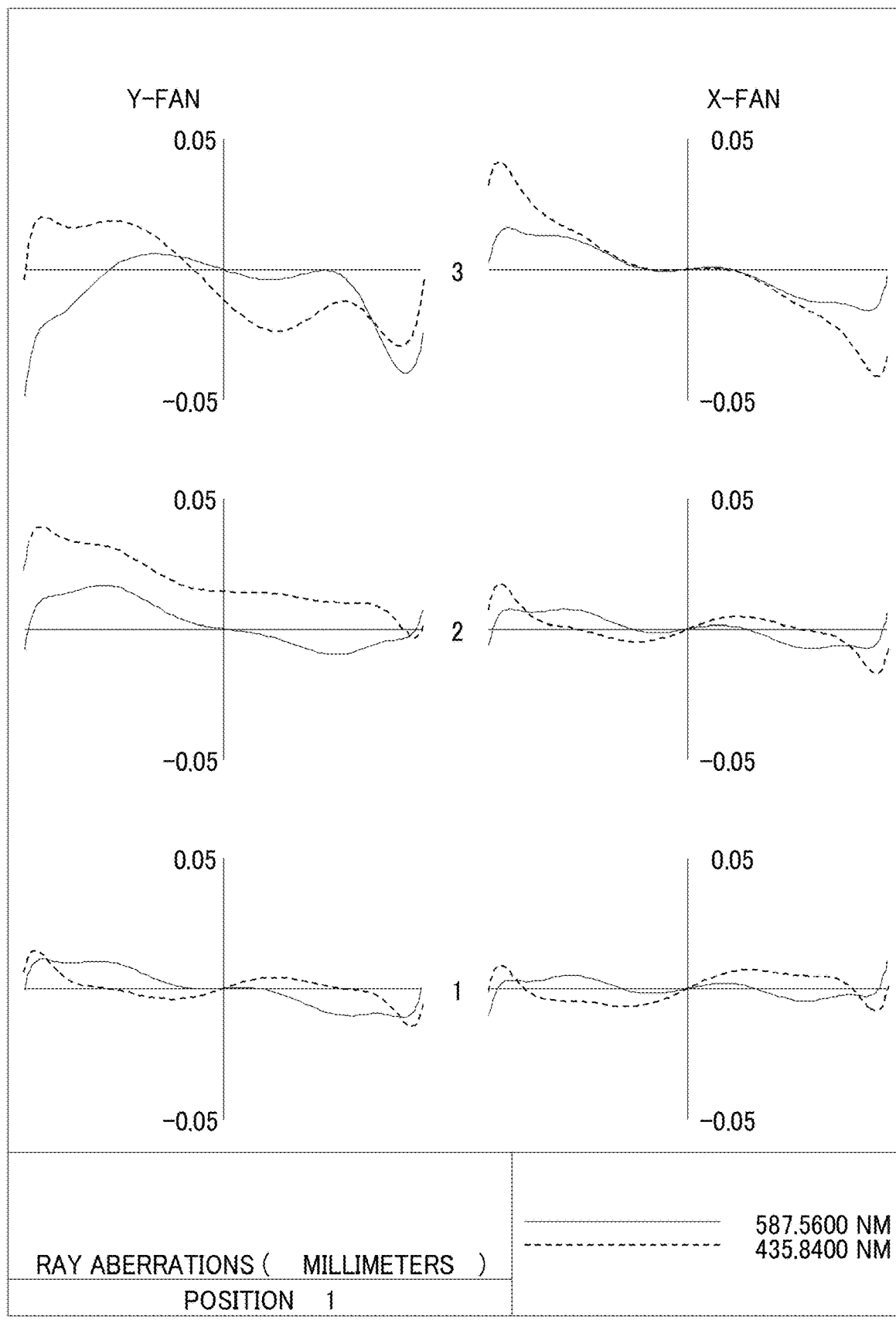
FIGS. 9A, 9B, and 9C are lateral aberration diagrams of the propagation optical system according to the second example.
Figure 9B:
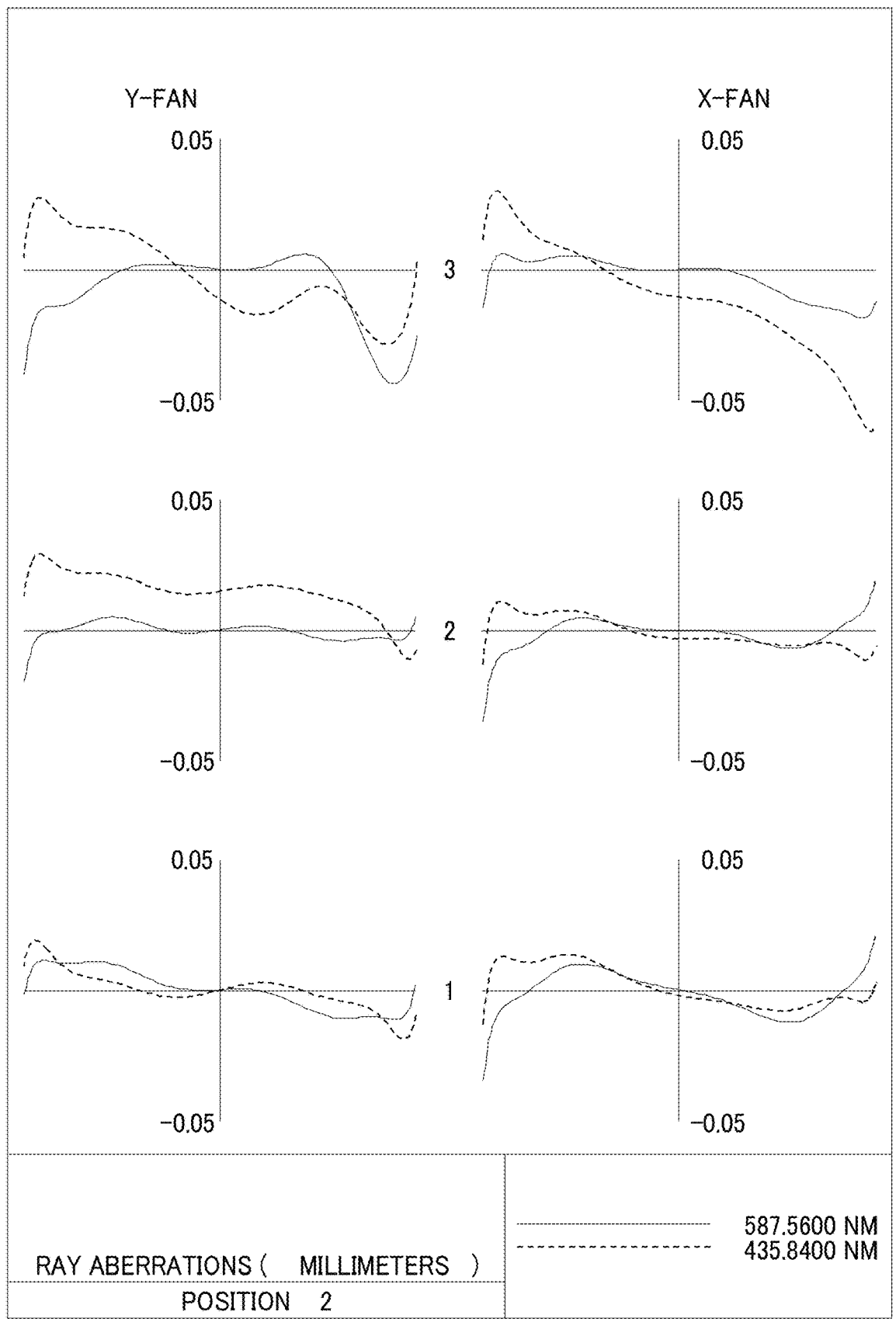
Figure 9C:
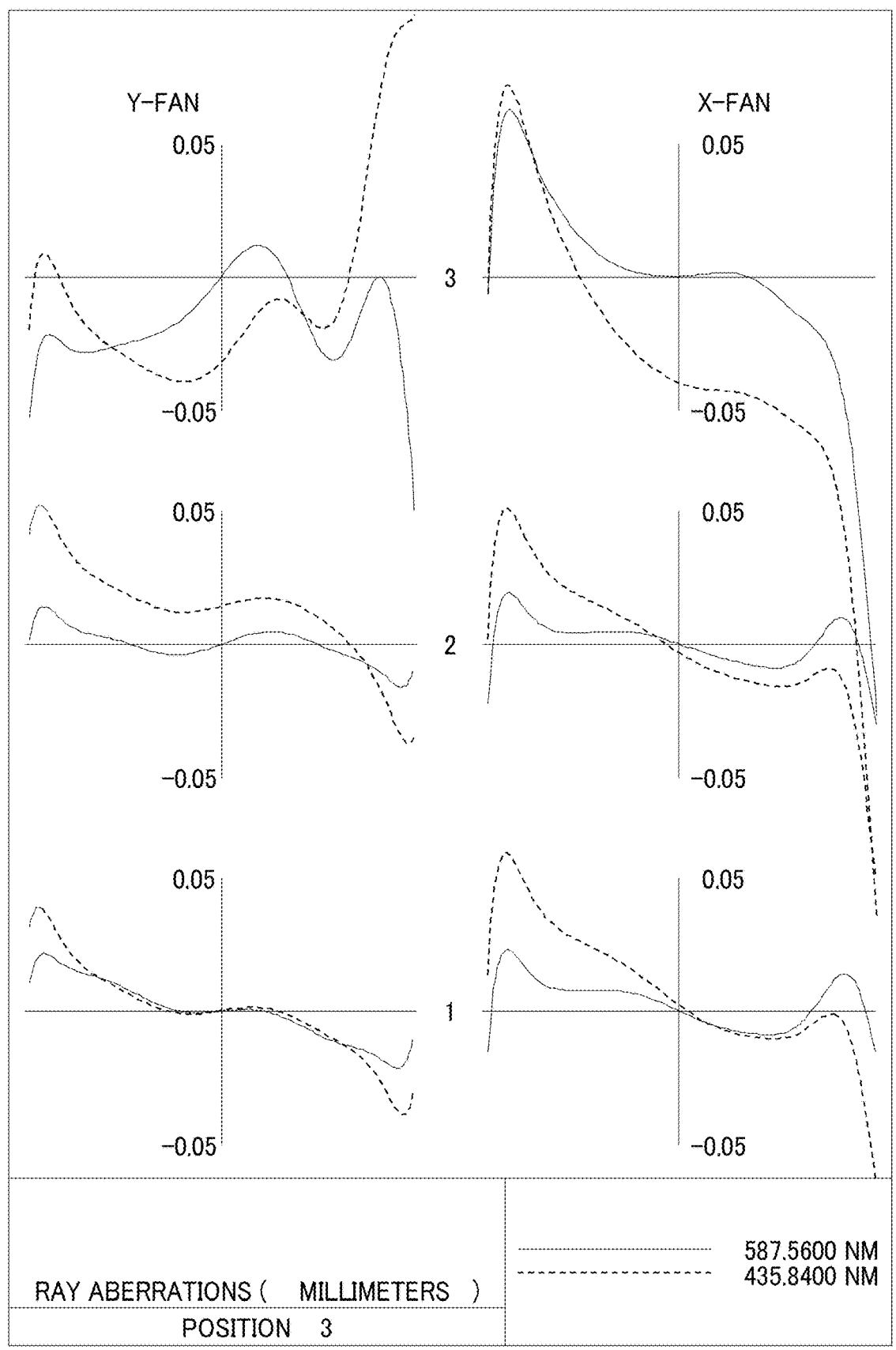
Figure 10A:
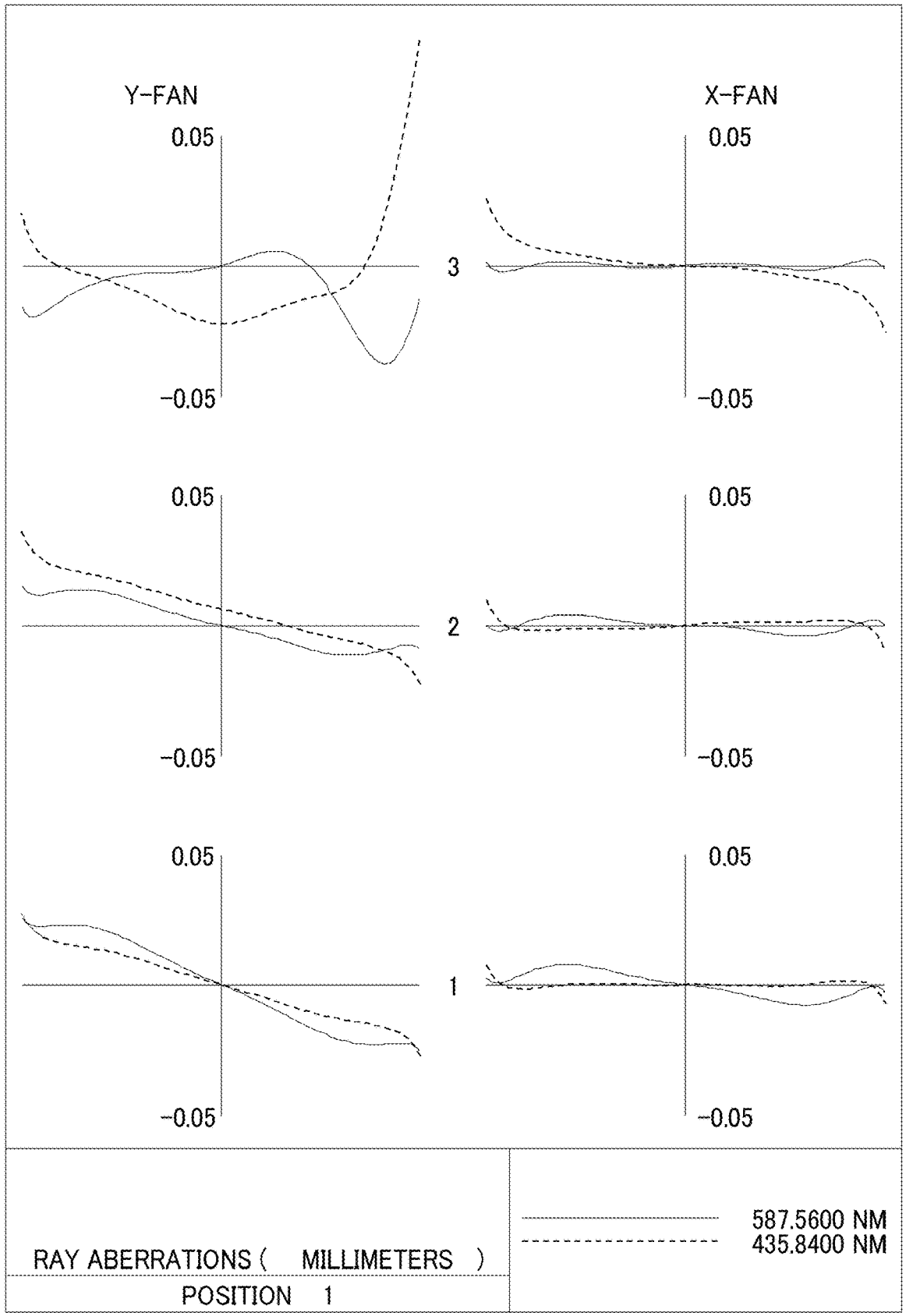
FIGS. 10A, 10B, and 10C are lateral aberration diagrams of the propagation optical system according to the third example.
Figure 10B:
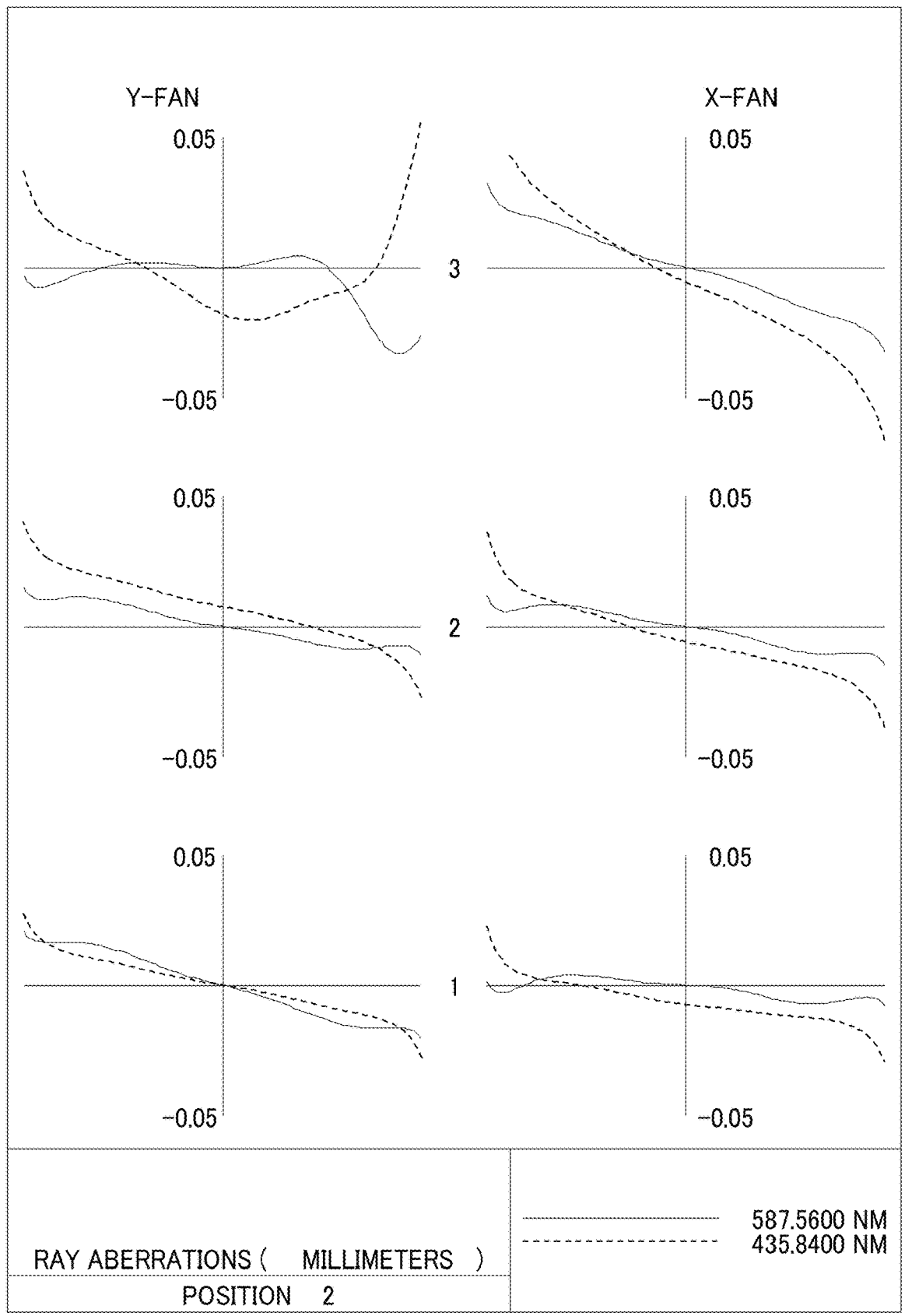
Figure 10C:
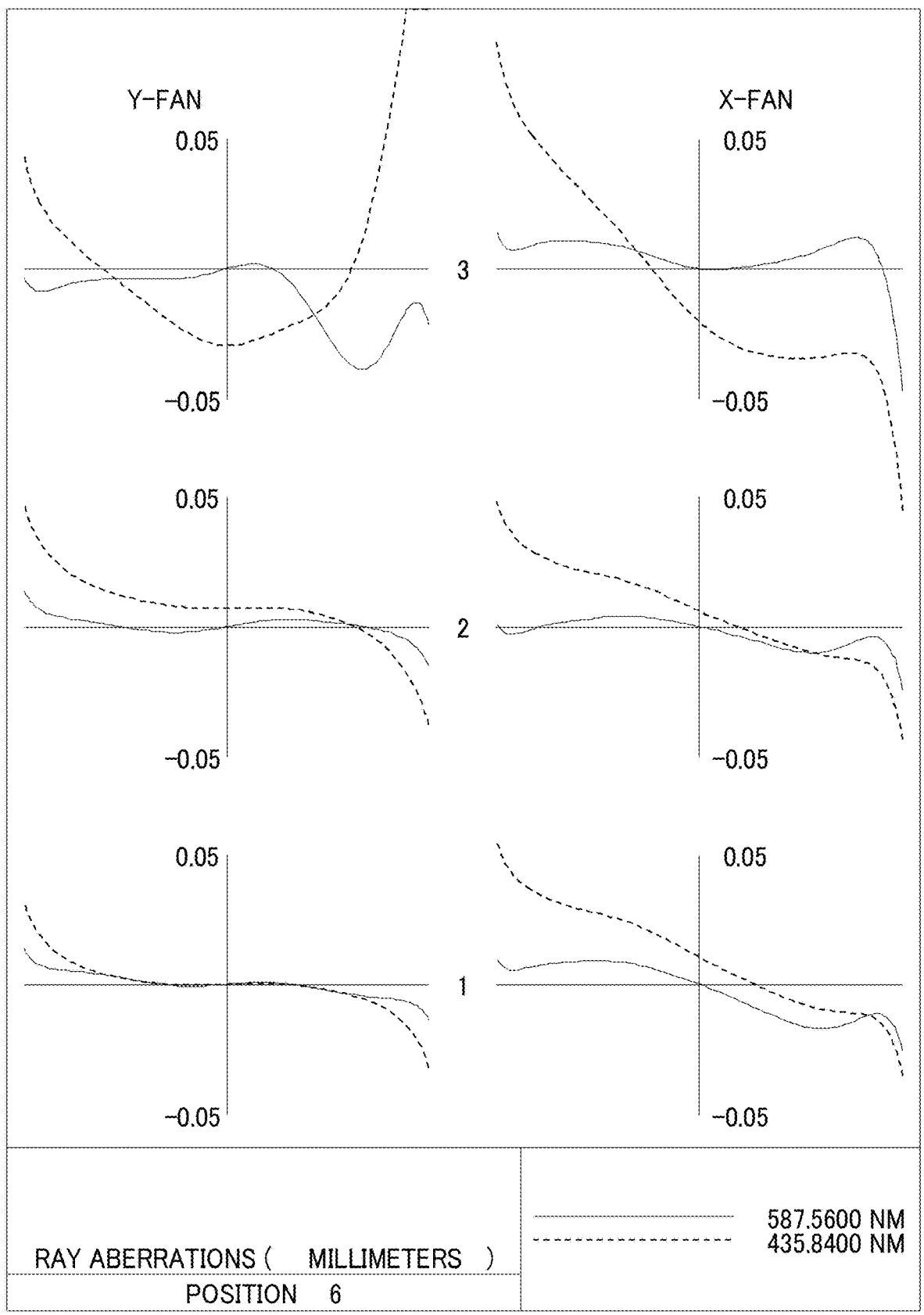
Figure 11A:
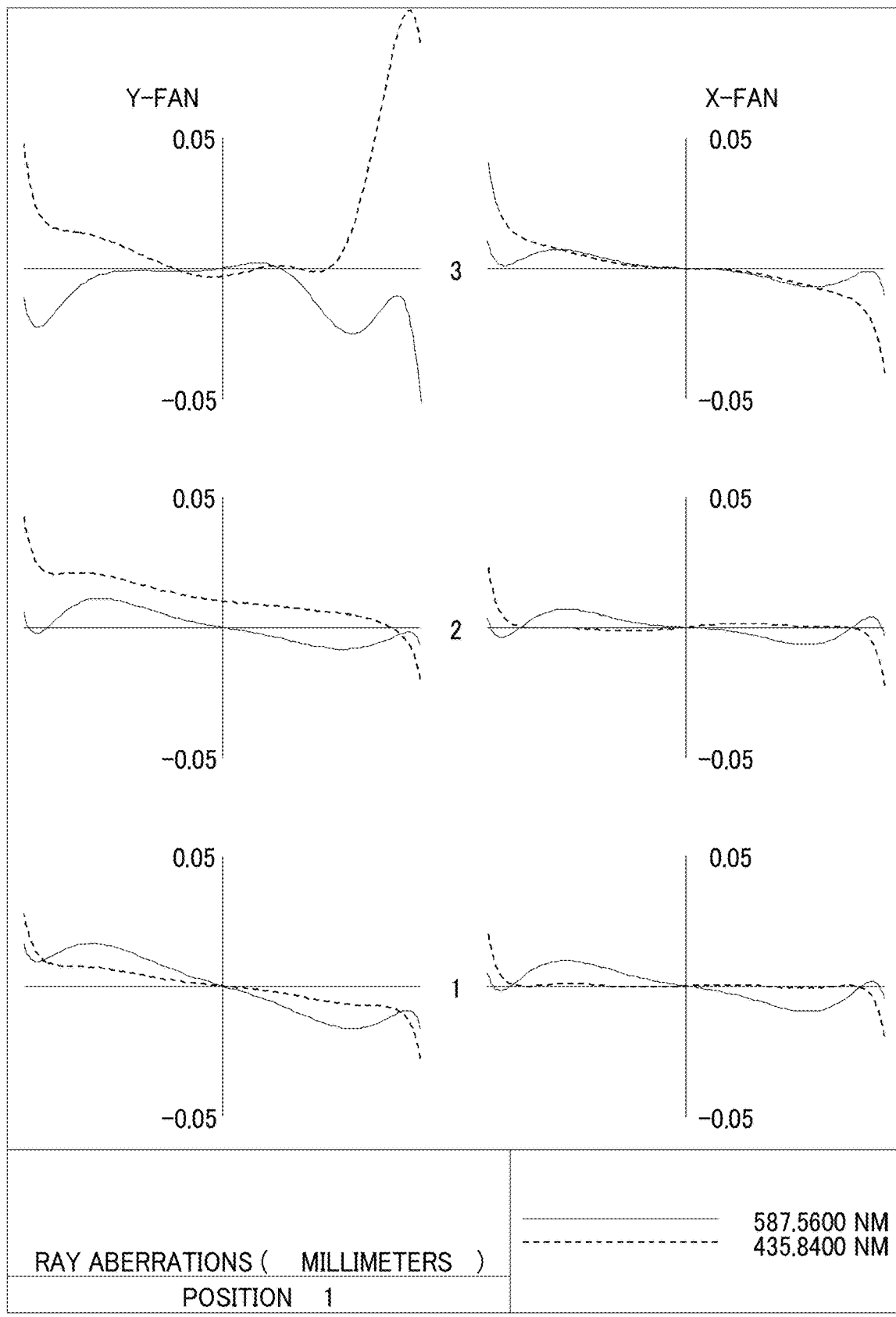
FIGS. 11A, 11B, and 11C are lateral aberration diagrams of the propagation optical system according to the fourth example.
Figure 11B:
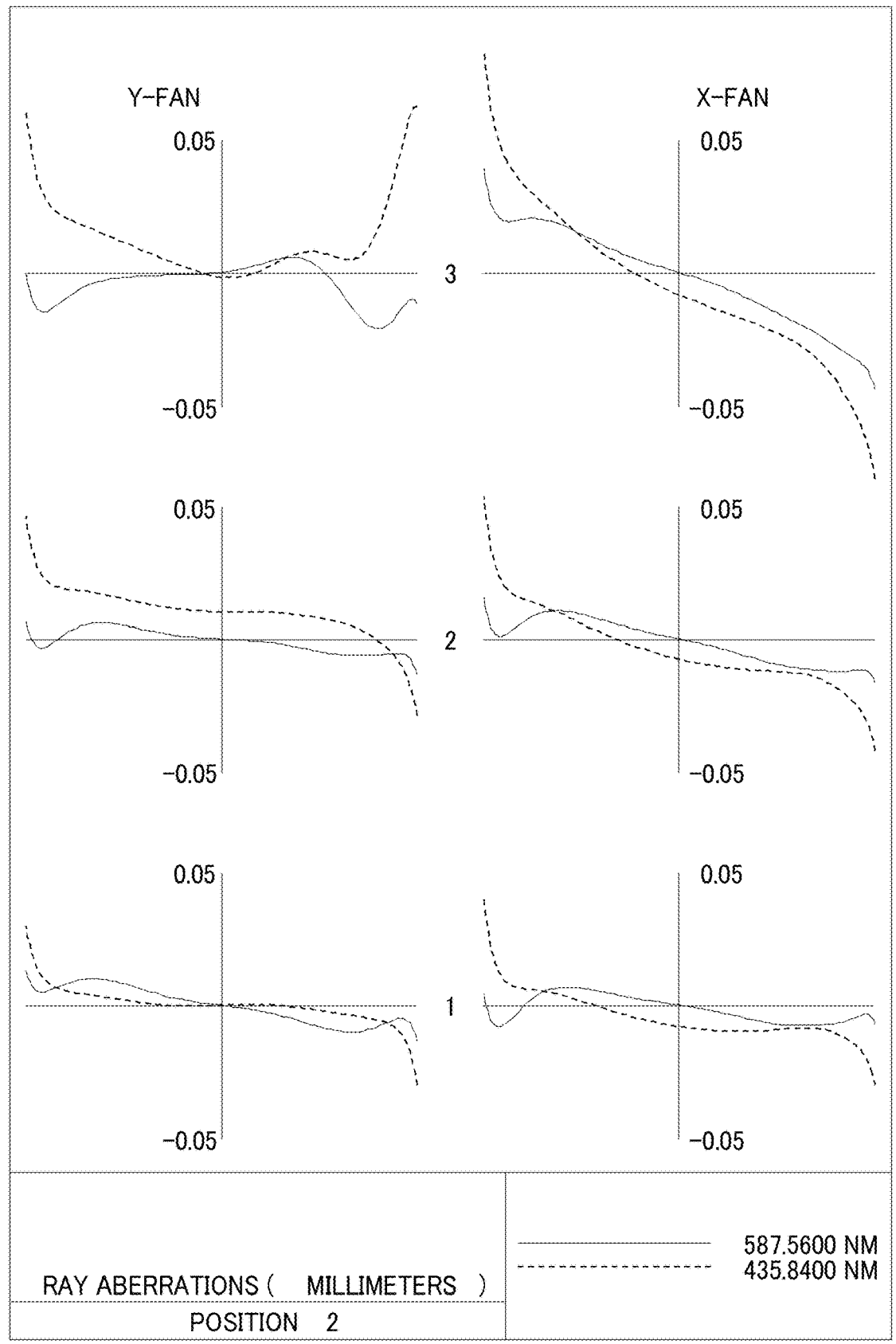
Figure 11C:
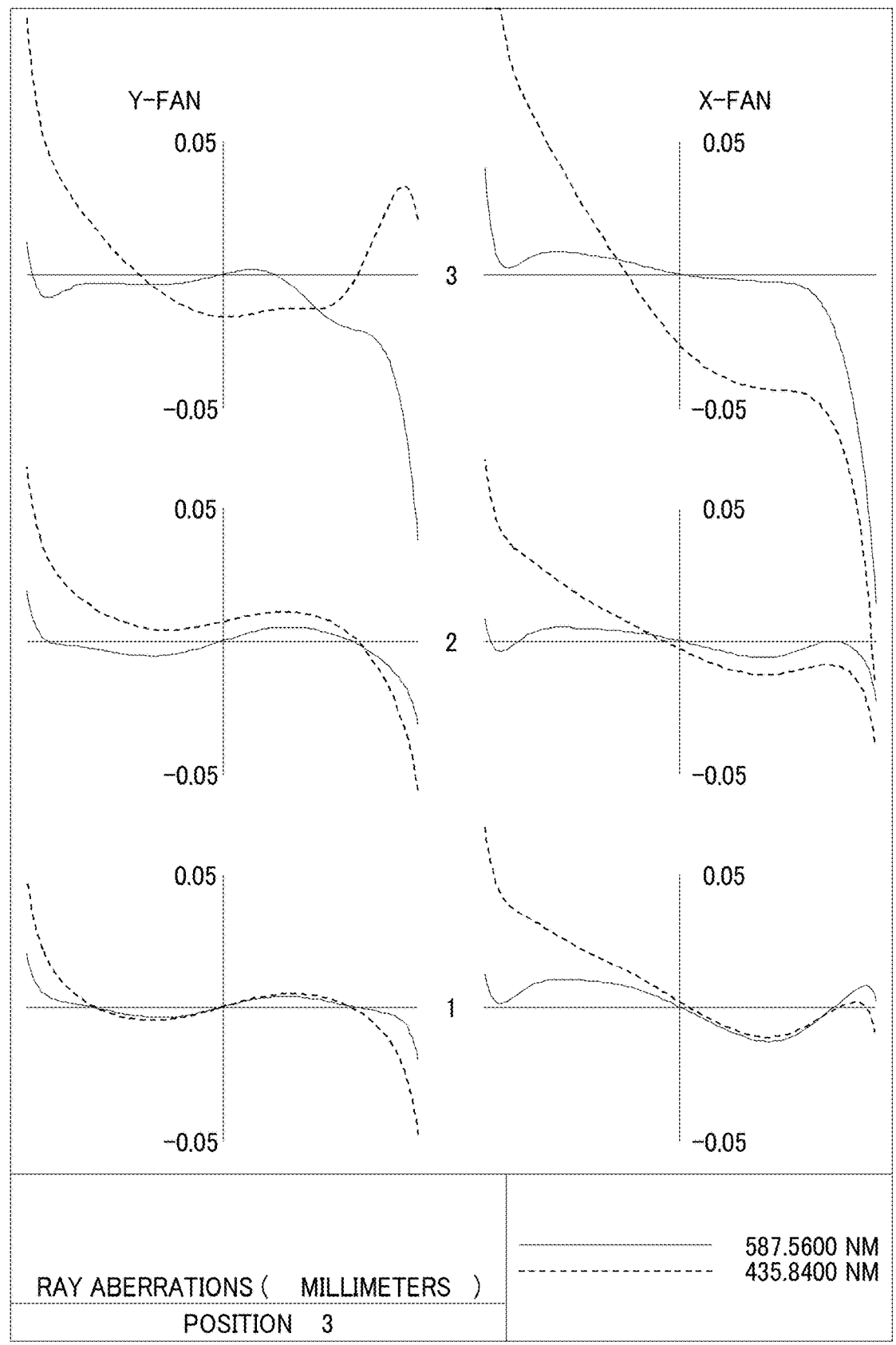
Figure 12A:
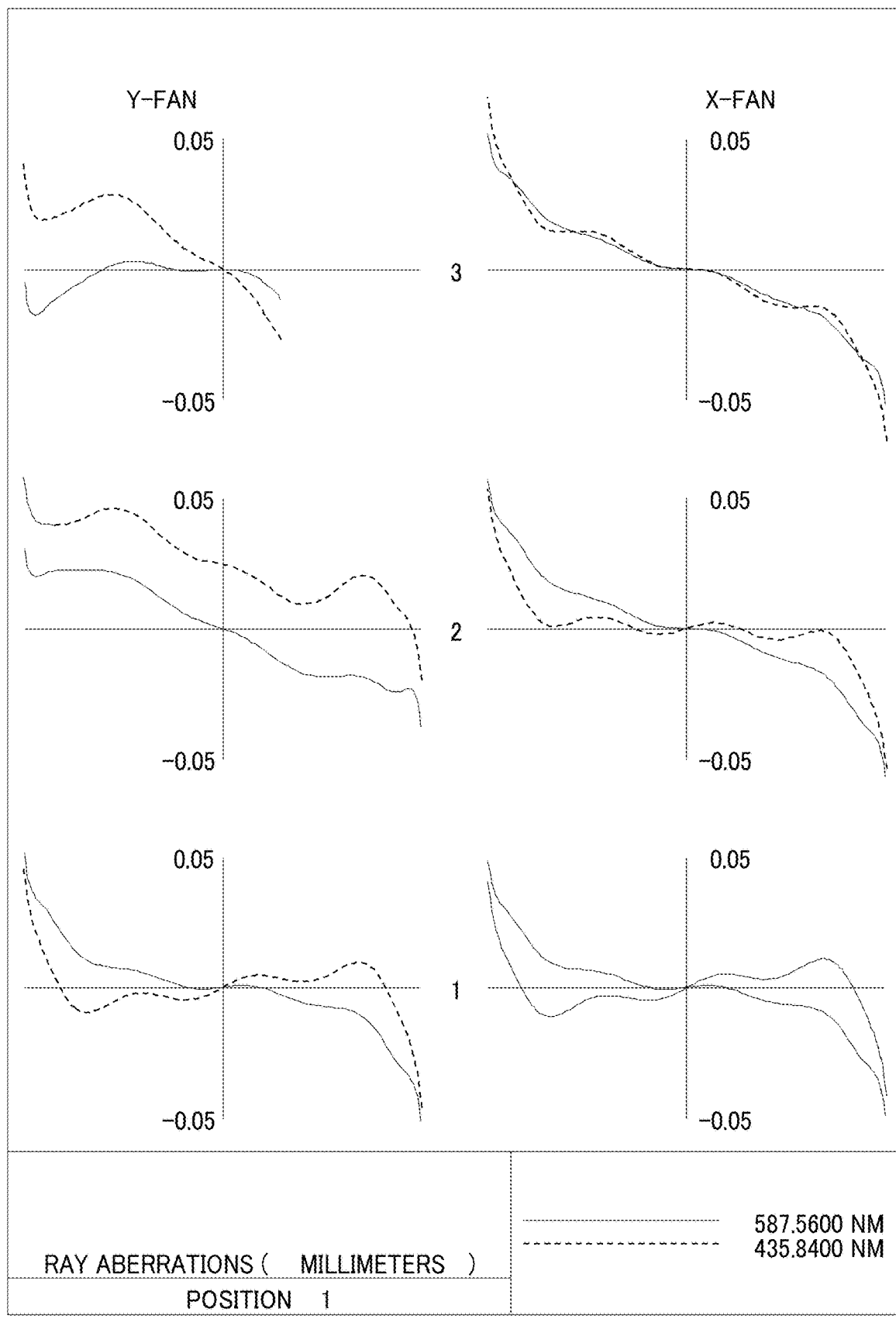
FIGS. 12A, 12B, and 12C are lateral aberration diagrams of the propagation optical system according to the fifth example.
Figure 12B:
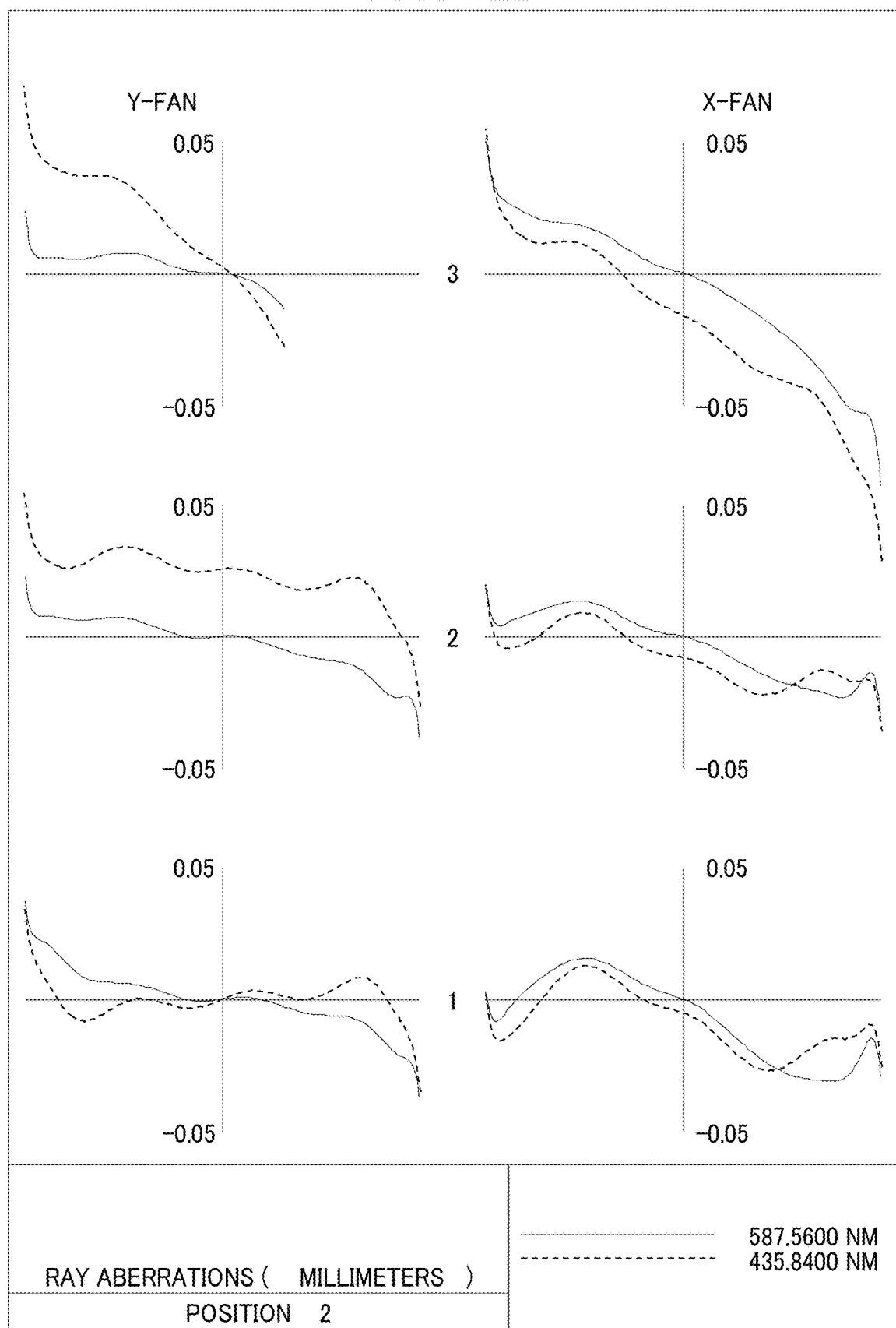
Figure 12C:
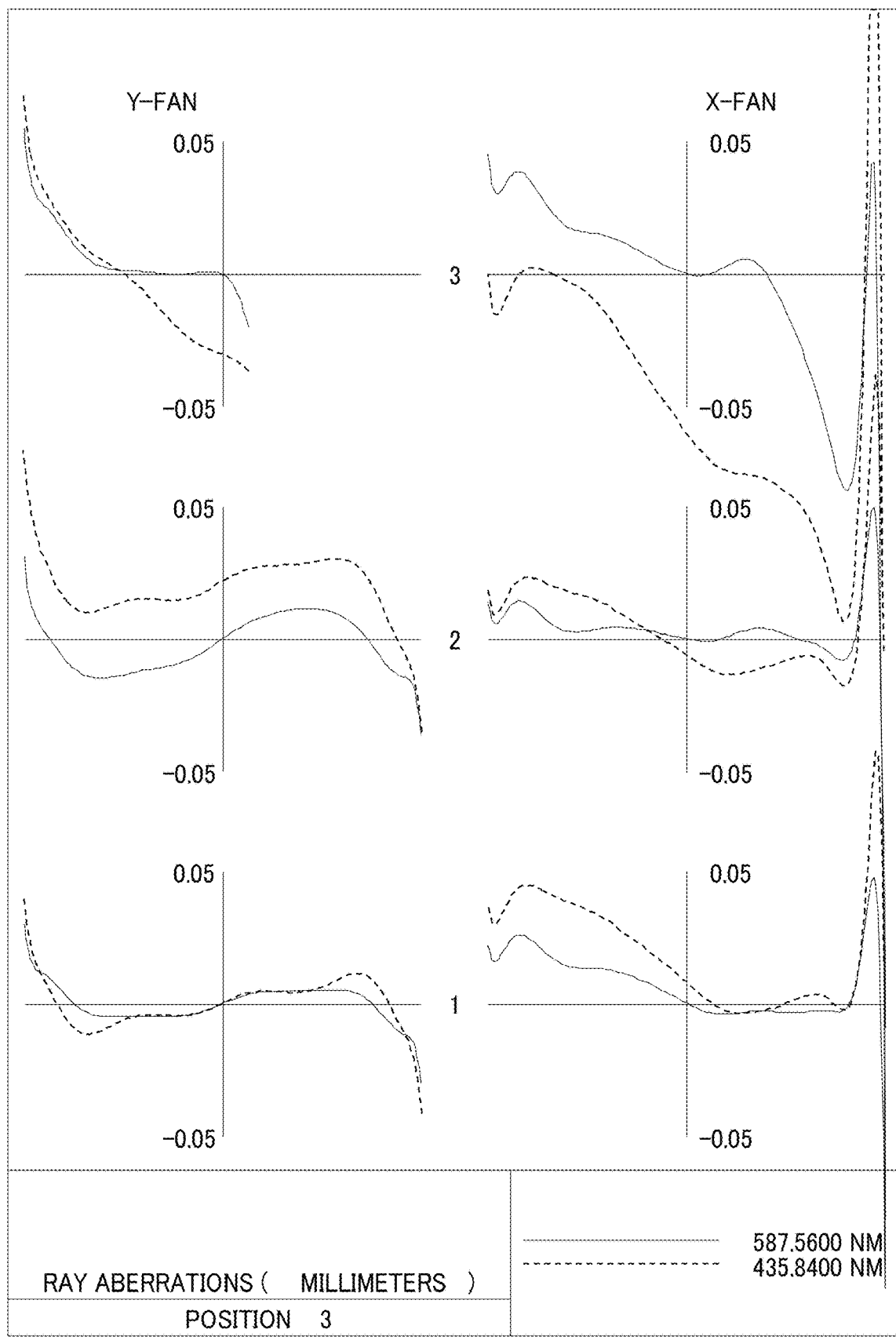

The following describes FIGS. 8A, 8B, and 8C for an example. FIG. 8A illustrates the lateral aberrations at positions (a) (i.e., (1, (a)), (2, (a)), and (3, (a))) in the virtual image of FIG. 7. In FIG. 8A, the lateral aberrations at the bottom are at the position (1, (a)), the lateral aberrations in the middle are at the position (2, (a)), and the lateral aberrations on the top are at the position (3, (a)). In FIG. 8A, the lateral aberration diagrams on the left relate to the XZ cross section, and the lateral aberration diagrams on the right relate to the YZ cross section.

In short, FIG. 8A illustrates the lateral aberrations at positions (1, (a)), (2, (a)), and (3, (a)) in the virtual image of FIG. 7.

Similarly, FIG. 8B illustrates the lateral aberrations at positions (1, (b)), (2, (b)), and (3, (b)) in the virtual image of FIG. 7. FIG. 8C illustrates the lateral aberrations at positions (1, (c)), (2, (c)), and (3, (c)) in the virtual image of FIG. 7.

The same applies to FIGS. 9 to 12 as in FIGS. 8A, 8B, and 8C.

As is clear from the lateral aberrations in FIGS. 8 to 12, the propagation optical systems used in the first example to the fifth example each have successful performance.

The propagation optical systems according to the first example to the fifth example each have a wide angle of view in each of the horizontal direction, the vertical direction, and the diagonal direction. Particularly in the horizontal direction (i.e., the longer-side direction of the image display area), an extremely wide angle of view of 35 or more degrees is achieved, and thus an extremely successful imaging performance is achieved.

The first example to the fifth example are given for the specific examples of the propagation optical system 20 in 1A and 1B. In the first example to the fifth example, the non-rotationally symmetric surface (21) of the intermediate optical element LI is a cylindrical lens surface. Further, a cross-sectional shape of the cylindrical lens surface in the specific cross section is an aspherical shape, and the cylindrical lens surface has zero power in another specific cross section.

The non-rotationally symmetric surface of the intermediate optical element in the propagation optical system according to the embodiments is not limited to the cylindrical lens surface as described above.

Various surfaces other than the toroidal surface described above are applicable as the non-rotationally symmetric surface.

The following describes cases where an anamorphic aspherical surface (22) is used as the non-rotationally symmetrical surface.

For the anamorphic aspherical surface (22), a first specific cross section (a first cross section) has the strongest positive power among in the cross sections, each of which includes the optical axis, of the image optical element having the anamorphic aspherical surface (22).

Among those cross sections including the optical axis, a second specific cross section (a second cross section) is orthogonal to the first specific cross section.

The anamorphic aspherical surface (22) has the strongest positive power in a first specific plane (24) including the optical axis of propagation optical system among in the planes including the optical system. The first specific plane (24) is referred to as a first cross section (a 1st cross section). A plane including the optical axis and orthogonal to the first specific plane (24) (the first cross section) is a second specific plane. The second specific plane (25) is referred to as a second cross section (a 2nd cross section).

The anamorphic aspherical surface (22) of the intermediate optical element LI in the present disclosure is a non-rotationally symmetric surface of which cross-sectional shape in the first cross section and that in the second cross section are aspherical shapes.

The specific cross section of the cylindrical lens as described above is the same as the first specific cross section of the anamorphic aspherical surface, and another specific cross section of the cylindrical lens as described above is oriented in the direction of non-curvature of the cylindrical lens and the cross sectional shape in the another specific cross section is a straight-line.

The second specific cross section of the anamorphic aspherical surface (22) is different from another specific cross section (orthogonal to the specific cross section) of the cylindrical lens in that the second specific cross section of the anamorphic aspherical surface has an aspherical shape.

The cross-sectional shape of the anamorphic aspherical surface (22) in the second cross section is aspherical shape, so that it is different from the cross-sectional shape of the cylindrical lens surface in the another cross section.

In the following sixth example to the ninth example, the surface shape of the non-rotational body main surface is defined by the following formula (B):

$$Z = \{CxX^2 + CyY^2\}/[1+\sqrt{1-(1+Kx)Cx^2X^2-(1+Ky)Cy^2Y^2)}] + AR_4((1-AP_4)X^2+(1+AP_4)Y^2)^2 + AR_6((1-AP_6)X^2+(1+AP_6)Y^2)^3 + AR_8((1-AP_8)X^2+(1+AP_8)Y^2)^4 + AR_{10}((1-AP_{10})X^2+(1+AP_{10})Y^2)^5 \quad (B)$$

In the formula (B), Cx denotes a paraxial curvature in the x-axis direction (an inverse number of a paraxial radius of curvature), Cy denotes a paraxial curvature in the y-axis direction, X and Y denote coordinates of the anamorphic aspherical surface (22) with reference to the optical axis, and Z denotes the degree of asphericity of the anamorphic aspherical surface (22) in the coordinates.

The meanings of other symbols are as follows.

Kx: conical constant of the X-axis
Ky: conical constant of the Y-axis
$AR_4$: fourth-order coefficient of rotational symmetry
$AR_6$: sixth-order coefficient of rotational symmetry
$AR_8$: eighth-order coefficient of rotational symmetry
$AR_{10}$: 10th-order coefficient of rotational symmetry
$AP_4$: fourth-order coefficient of rotational asymmetry
$AP_6$: sixth-order coefficient of rotational asymmetry
$AP_8$: eighth-order coefficient of rotational asymmetry
$AR_{10}$: 10th-order coefficient of rotational asymmetry The x-axis is coincident with the horizontal direction, and the Y-axis is coincident with the vertical direction.

The relay optical system RL and the collimator optical system LC are rotationally symmetric with respect to the optical axis and have positive power.

To reduce the lens diameter of the collimator lens LC while obtaining a certain optical total length and achieving high performance, the propagation optical system is designed to form an intermediate image with a smaller diameter of the relay optical system RL. The relay optical system RL serves to deal with the need for a space between the image display element and the propagation optical system due to the mechanical structure or an electrical system.

As described above referring to FIGS. 1A and 1B, the propagation optical system 20 is composed of a relay optical system RL, an intermediate optical element LI, and a collimator optical system LC, which are sequentially arranged in the direction from the image display element 10 to the light guide member 30. As the intermediate image IN is formed between the relay optical system RL and the collimator optical system LC, the anamorphic aspherical surface (22) of the intermediate optical element LI is closer to the intermediate image IN, and spherical aberration and coma aberration caused by the non-rotational symmetry can be reduced.

The first specific cross section of the anamorphic aspherical surface (22) is preferably parallel with the horizontal direction (i.e., in the x-direction in FIGS. 1A and 1B) of the virtual image to be displayed. This arrangement enables the off-axis principal rays of the propagation optical system 20, passing through the first specific cross section, to intersect with the optical axis at a position near the incident portion 30A of the light guide member 30 to be incident on the incident portion 30A. This thus enables an effective propagation of light to the eyes EY.

Such an arrangement reduces the loss of the principal rays due to the incident portion 30A having an even small-width (i.e., the width of the xy plane opposed to the first specific cross section) opening and increases the utilization efficiency of light. In other words, the loss of the principal rays can be reduced even with a reduction in the width (i.e., a reduction in the size and the weight) of the light guide member 30.

The second specific cross section is parallel with the vertical direction (i.e., y-direction in FIGS. 1A and 1B) of the virtual image to be displayed. This arrangement enables the off-axis principal rays of the propagation optical system 20, passing through the second specific cross section, to intersect with the optical axis at a position near the incident portion 30A of the light guide member 30 to be incident on the incident portion 30A. This thus enables an effective propagation of light to the eyes EY.

In the above configuration, the anamorphic aspherical surface (22) has a shape in which a paraxial radius of curvature Rp in the first specific cross section and a paraxial radius of curvature Rn in the second specific cross section satisfy the conditional expression (11), where the anamorphic aspherical surface (22) has the strongest positive power in the first specific cross section, and the second specific cross section is orthogonal to the first cross section.

$$-0.9 < (Rp+Rn)/(Rp-Rn) < -0.3$$

When the value exceeds the upper limit of the conditional expression (11), the power difference between the first specific cross section and the second specific cross section orthogonal to the first specific cross section excessively increases. This causes the off-axis principal rays of the propagation optical system 20, passing through the first specific cross section, to intersect with the optical axis at a position closer to the propagation optical system than the incident portion 30A of the light guide member 30. This thus hampers an effective propagation of light to the eyes EY.

When the value falls below the lower limit of the conditional expression (11), the power difference between the first specific cross section and the second specific cross section orthogonal to the first specific cross section excessively decreases. This causes the off-axis principal rays of the propagation optical system 20, passing through the first specific cross section, to intersect with the optical axis at a position closer to the eyes EY than the incident portion 30A of the light guide member 30. This thus hampers an effective propagation of light to the eyes EY.

The paraxial radius of curvature is obtained by measuring a surface and fitting the measurement by the least-square method. The paraxial radius of curvature Rn of the second specific cross section is preferably negative to enable higher performance The non-arc shape of cross-sectional shape of non-rotationally symmetric surface (21) in the first specific cross section preferably has a decreasing positive power with an increase in distance from the optical axis. This arrangement enables the off-axis principal rays of the propagation optical system to intersect with the optical axis at a position closer to the incident portion 30A, thus enabling light to more effectively propagate to the eyes EY.

The above-described shape having a decreasing positive power with an increase in distance from the optical axis preferably satisfies conditional expression (12) where Sagp is the maximum value of the sag amount of the shape in the first specific cross section, in which the anamorphic aspherical surface (22) (i.e., the anamorphic lens) has the strongest positive power among in the cross sections including the optical axis, and Sag_rp is the sag amount defined by a circle of the paraxial curvature in the first specific cross section at the ray height from the optical axis, which gives the maximum sag amount Sagp:

$$0.6 < Sagp/Sag\_rp < 1.0$$

When the value exceeds the upper limit value of the conditional expression (12), the high off-axis principal rays of the propagation optical system 20 intersects with the optical axis at a position closer to the propagation optical system 20 than the incident portion 30A of the light guide member 30, thus hampering an effective propagation of light toward the eyes EY. When the value falls below the lower limit of the conditional expression (12), the high off-axis principal rays of the propagation optical system 20 intersects with the optical axis at a position closer to the eyes EY than the incident portion 30A of the light guide member 30, thus hampering an effective propagation of light toward the eyes EY.

The non-arc shape of the cross-sectional shape of the anamorphic aspherical surface (22) in the second specific cross section preferably has a decreasing power with an increase in distance from the optical axis. This arrangement enables the high off-axis principal rays of the propagation optical system 20 to intersect with the optical axis at a position closer to the incident portion 30A, thus enabling light to more effectively propagate to the eyes EY.

The cross-sectional shape of the anamorphic aspherical surface (22) in the second specific cross section in which the power decreases as the distance from the optical axis increases preferably satisfies conditional expression (13) where Sagn is a maximum value of the sag amount in the second specific cross section orthogonal to the first specific section in which the anamorphic aspherical surface (22) has the strongest positive power among in the cross section including the optical axis, and Sag_rn is the sag amount defined by a circle of a paraxial curvature of the anamorphic aspherical surface (22) in the second specific cross section at the ray height from the optical axis, which gives the maximum value of the sag among Sagn in the second specific cross section:

$$0.6 < Sagn/Sag\_rn < 1.0$$

When the value exceeds the upper limit of the conditional expression (13), the high off-axis principal rays of the propagation optical system 20 intersects with the optical axis at a position upstream of the eyes EY in a direction of travel of light from the light guide member 30, thus hampering an effective propagation of light toward the eyes EY.

When the value falls below the upper limit of the conditional expression (13), the high off-axis principal rays of the propagation optical system 20 intersects with the optical axis at a position downstream of the eyes EY in a direction of travel of light from the light guide member 30, thus hampering an effective propagation of light toward the eyes EY.

In the examples using an anamorphic aspherical surface (22), any one or more of the conditional expressions (2) to (7) described above is preferably satisfied to achieve a higher performance of the propagation optical system.

For the anamorphic aspherical surface (22), in the conditional expression (6), Pos1 is a position of an intermediate image with reference to a position of the anamorphic aspherical surface (22) on the optical axis, and Pos1 is negative when the intermediate image is between the image display element 10 and the anamorphic aspherical surface (22).

Further, Y is the diagonal length of the image display area of the image display element 10. Failing to satisfy the conditional expression (6) increases the distance between the anamorphic aspherical surface (22) and the intermediate image along the optical axis, and hampers a reduction of occurrence of non-rotationally symmetric spherical aberration and coma aberration.

In a case where such an anamorphic aspherical surface (22) is used, the relay optical system RL is composed of a relay front group RL1 and a relay rear group RL2 each having positive power, which are arranged in that order in the direction from the image display element toward the intermediate optical element. The distance between the relay front group RL1 and the relay rear group RL2 along the optical axis is longest within the relay optical system RL.

This arrangement achieves successful correction of various aberrations while providing a distance along the optical axis between the relay front group RL1 and the relay rear group RL2 and the total length of the propagation optical system 20, which are sufficient to achieve intended performance In this case as well, satisfying the conditional expression (2) provides an appropriate space for the relay front group RL1 and the relay rear group RL2 and the total length of the propagation optical system 20 sufficient to achieve intended performance, thus achieving successful correction of various aberrations within the relay optical system RL.

In the configuration of the relay optical system RL composed of the relay front group RL1 and the relay rear group RL2, the relay front group RL1 is composed of a positive lens, a negative lens, and a positive lens sequentially arranged in the direction from the image display element toward the intermediate optical element.

Such a configuration of the relay front group RL1 enables sufficient correction of chromatic aberration, particularly, spherical aberration and coma aberration. Preferably, the lens surfaces of the negative lens and the positive lens are aspheric.

The relay rear group RL2 is composed of two lenses of a positive lens and a negative lens, arranged in that order in the direction from the image display element toward the intermediate optical element.

In such a configuration, the two lenses of the positive lens and the negative lens serve to correct the residual aberrations of the relay front group RL1 and the collimator optical system LC, and various aberrations are easily corrected to a sufficient level to achieve intended performance. In the configuration of the relay rear group RL2 composed of the positive lens and the negative lens, each lens surface of the two lenses are preferably aspheric.

Further, the conditional expression (3) is preferably satisfied where TLA is the distance along the optical axis between the anamorphic aspherical surface (22) of the intermediate optical element LI to the surface of the collimator optical system LC, which is closest to the light guide member 30, and TL is the distance along the optical axis between the surface of the relay optical system RL, which is closest to the image display element 10, to the surface of the collimator optical system LC, which is closest to the light guide member 30. Satisfying the conditional expression (3) enables a downsizing of the propagation optical system.

For the anamorphic aspherical surface (22) as well, satisfying the conditional expression (4) reduces an excessive increase in the diameters of the intermediate optical element having the anamorphic aspherical surface (22) and the collimator optical system while appropriately maintaining the total length of the collimator optical system along the optical axis, to thus successfully correct various aberrations within the collimator optical system.

Further, satisfying the conditional expression (5) enables a suitable range for the lateral magnification ($\beta$_relay) of the relay optical system.

Similarly to the above description, satisfying conditional expressions (6) and (7) enables a higher performance of the propagation optical system.

The following describes the sixth example to the ninth example of the propagation optical system 20 incorporating an anamorphic aspherical surface (22) as a non-rotationally symmetrical surface.

FIGS. 13 to 16 sequentially illustrate the lens configurations of the propagation optical systems according to the sixth example to the ninth example.

The X-direction and the Y-direction are defined the same as in FIGS. 2 to 6.

In the sixth example to the ninth example, the image display element 10 has a length of 3.12 mm in the Y-direction (i.e., the vertical direction), a length of 4.992 mm in the X-direction (i.e., the horizontal direction), and a diagonal length of 5.89 mm, which are the same as those in the first, second, third, and fifth examples described above.

In other words, in the virtual image display devices in FIGS. 1A and 1B, a virtual image passed through the light guide member 30 and observed by the observer is a horizontally oriented image and is observed as a plane parallel to the xy plane in FIG. 1A. The longer-side direction of the image display area is set as the horizontal direction (i.e., the X-direction), and the shorter-side direction is set as the vertical direction (i.e., the Y-direction), which correspond to the directions of the virtual image.

Further, the direction orthogonal to the X-direction and the Y-direction is set as the Z-direction, which coincides with a direction along the optical axis of the propagation optical system in FIGS. 13 to 16.

FIGS. 13A, 14A, 15A, and 16A are illustrations of a cross-sectional shape of the YZ plane of the propagation optical system, and FIGS. 13B, 14B, 15B, and 16B are illustrations of a cross-sectional shape of the XZ plane of the propagation optical system. The left side of the drawing is the object side. In other words, the vertical direction is the y-direction in FIGS. 13A, 14A, 15A, and 16A and is the x-direction in FIGS. 13B, 14B, 15B, and 16B.

The same reference numerals as in FIGS. 2 to 6 are used in the FIGS. 13 to 16.

In FIGS. 13 to 16, a cover glass 11 is mounted on the image display surface coincide with the image display area of the image display element 10. In FIGS. 13 to 16, the relay optical system RL, the collimator optical system LC, the intermediate optical element LII, the relay front group RL1, and the relay rear group RL2 are illustrated.

An aperture stop S and a light guide member 30 are also illustrated in FIGS. 13 to 16.

In the examples of FIGS. 13 to 16 as well, the propagation optical system sequentially includes a relay optical system RL, an intermediate optical element LII, and a collimator optical system LC in the direction from the image display element 10 toward the light guide member 30. The relay optical system RL is composed of a relay front group RL1 and a relay rear group RL2.

In each example, the relay front group RL1 is composed of three lenses of positive, negative, and positive sequentially arranged in the direction from the image display element 10 toward the light guide member 30, and the relay rear group RL2 is composed of two lenses of positive and negative sequentially arranged in the direction from the image display element 10 toward the light guide member 30. The collimator optical system LC is composed of two lenses of negative and positive sequentially arranged in the direction from the image display element 10 toward the light guide member 30.

All the lenses constituting the relay front lens group RL1, the relay rear lens group RL2, and the collimator optical system LC are rotationally symmetric with respect to the optical axes (i.e., the z-direction), and the relay front lens group RL1, the relay rear lens group RL2, and the collimator optical system LC, which all include the lenses arranged along the optical axis (i.e., the z-direction), are also rotationally symmetric with respect to the optical axis.

The relay optical system RL1 and the relay front group RL1 and the relay rear group RL2 constituting the relay optical system RL all have positive power, and the collimator optical system LC also has positive power.

The intermediate optical element LII of the propagation optical system in FIGS. 13 to 16 is a lens with an anamorphic aspherical surface (22) facing the image display element 10 and a flat surface facing the collimator optical system LC.

The anamorphic aspherical surface (22) is a non-rotationally symmetric curved surface. In the first specific cross section, the anamorphic aspherical surface (22) has the strongest positive power among in the cross sections including the optical axis of the propagation optical system and the first specific cross section is an XZ plane (i.e., the horizontal plane including the optical axis) as illustrated in FIGS. 13A, 14A, 15A, and 16A. The second specific cross section is a YZ plane as illustrated in FIGS. 13B, 14B, 15B, and 16B.

The following describes the sixth example to the ninth example of the virtual image display device 100 incorporating one of the propagation optical systems as illustrated in FIGS. 13 to 16.

The symbols in the sixth example to the ninth example means the same as those in the first example to the fifth example. The aspherical surfaces each are given by the formula (A) described above, and the anamorphic aspherical surfaces each are given by the formula (B) described above.

Unless otherwise specified, the measurement unit of length is mm in the specific data of the following examples.

In the sixth example to ninth example, the light guide member in the form of a parallel plate as a whole, the same as those according to the first example to the fifth example.

Further, a portion corresponding to the observed-light extraction portion 30B as illustrated in FIGS. 1A and 1B has multiple semi-transparent surfaces each being tiled in the y-direction.

In Tables 21 and some other Tables for the sixth example to the ninth example, the surface number "0" refers to the image display surface, and the surface numbers "1" and "2" refer to the respective surfaces of the cover glass 11. Further, the surface numbers "3" to "13" refer to the surfaces of the relay optical system RL. The surface numbers "3" to "8" refer to the lenses of the relay front group RL1, which is between the image display element 10 and the stop S with a surface number of 9. The surface numbers "10" to "13" refer to the lenses of the relay rear group RL2.

The surface numbers "14" and "15" refer to the intermediate optical element LII. The intermediate optical element LI is a lens having an anamorphic aspherical surface facing the image display element 10. For the surface number "14", Rx is a paraxial curvature of a non-arc shape in a first specific cross section, and Ry is a paraxial curvature of a non-arc shape in the second specific cross section.

The surface numbers "16" to "19" refer to the lenses of the collimator optical system LC, and the surface numbers "20" and "21" refer to the light guide member in the form of a parallel plate. The distance between the surface of the surface number "20" and the surface of the surface number "21" is a value converted according to the number of reflections in the light guide member.

Sixth Example

Figure 13A:
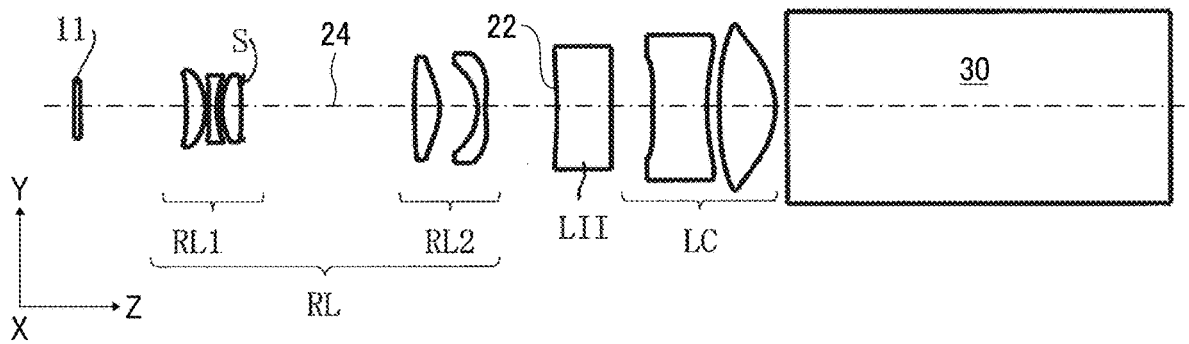
FIGS. 13A and 13B are illustrations of a configuration of a propagation optical system according to a sixth example.
Figure 13B:
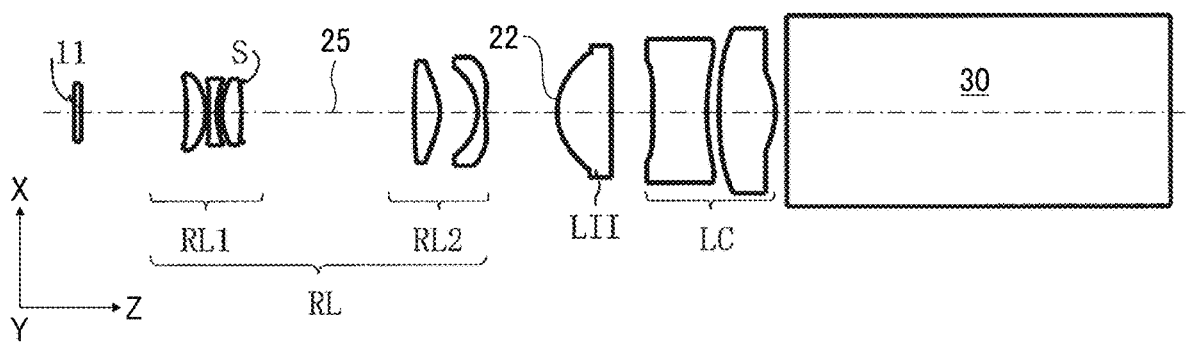

The sixth example uses the lens configuration of the propagation optical system as illustrated in FIGS. 13A and 13B.

The following describes the angle of view of the propagation optical system in each of the vertical direction (i.e., the y-direction), the horizontal direction (i.e., the x-direction), and the diagonal direction:

Angle-of-View
  Vertical direction (y-direction): 18.5 degrees Horizontal direction (x-direction): 35.4 degrees
  Diagonal direction: 40.0 degrees
  Virtual image distance: 1 m Table 21 lists data for the sixth example.

TABLE 21

|  | Ry | Rx | D | Nd | νd |  |
| --- | --- | --- | --- | --- | --- | --- |
| 0 |  |  | 0.00 |  |  |  |
| 1 | ∞ | ∞ | 0.70 | 1.51633 | 64.14 | S-BSL7(OHARA) |
| 2 | ∞ | ∞ | 11.82 |  |  |  |
| 3* | −39.696 | −39.696 | 2.18 | 1.53100 | 56 | E48R(ZEON) |
| 4* | −6.503 | −6.503 | 0.29 |  |  |  |
| 5* | −3755.363 | −3755.363 | 0.90 | 1.63200 | 23 | OKP4HT(Osaka Gas Chemicals) |
| 6* | 8.732 | 8.732 | 0.51 |  |  |  |
| 7* | 6.269 | 6.269 | 2.20 | 1.53100 | 56 | E48R(ZEON) |
| 8* | −78.590 | −78.590 | 0.20 |  |  |  |
| 9 | STOP |  | 19.07 |  |  |  |
| 10* | 129.642 | 129.642 | 2.82 | 1.53100 | 56 | E48R(ZEON) |
| 11* | −6.215 | −6.215 | 4.32 |  |  |  |
| 12* | −5.296 | −5.296 | 0.90 | 1.53100 | 56 | E48R(ZEON) |
| 13* | 13.251 | 13.251 | 7.99 |  |  |  |
| 14* | −51.048 | 6.585 | 6.00 | 1.53100 | 56 | E48R(ZEON) |
| 15 | ∞ | ∞ | 4.60 |  |  |  |
| 16* | 123.226 | 123.226 | 6.00 | 1.63200 | 23 | OKP4HT(Osaka Gas Chemicals) |
| 17* | 21.001 | 21.001 | 1.38 |  |  |  |
| 18* | 47.480 | 47.480 | 6.33 | 1.53100 | 56 | E48R(ZEON) |
| 19* | −9.075 | −9.075 | 1.30 |  |  |  |
| 20 | ∞ | ∞ | 42.69 | 1.53100 | 56 | E48R(ZEON) |
| 21 | ∞ | ∞ |  |  |  |  |

Table 22 lists the aspherical-surface data of the aspherical surfaces as in Table 2.

TABLE 22

| | K | A4 | A6 | A8 | A10 |
|---|---|---|---|---|---|
| 3 | 0.000 | 2.99731E−04 | −9.54341E−05 | 1.55348E−05 | −9.33793E−07 |
| 4 | 0.000 | −1.05734E−03 | 3.23371E−04 | −2.49305E−05 | 4.22980E−07 |
| 5 | 0.000 | −1.86185E−03 | 4.89521E−04 | −4.52525E−05 | 9.45573E−07 |
| 6 | 0.000 | −2.50297E−04 | 3.94302E−05 | −4.35740E−07 | −3.16638E−07 |
| 7 | 0.000 | −6.86270E−04 | −1.78637E−04 | 1.68227E−05 | −3.45262E−07 |
| 8 | 0.000 | −6.93285E−04 | −3.87683E−05 | 5.44894E−07 | 2.68866E−07 |
| 10 | 0.000 | 1.57112E−05 | 1.33564E−05 | −5.03009E−07 | 6.58945E−09 |
| 11 | 0.000 | −1.85245E−03 | −8.78384E−08 | 1.18013E−07 | 8.70699E−09 |
| 12 | 0.000 | 2.62484E−03 | −2.43958E−04 | 1.10371E−05 | −1.46569E−07 |
| 13 | 0.000 | −3.38459E−03 | 2.70392E−05 | 1.05402E−06 | −2.55106E−08 |
| 16 | 0.000 | −4.78743E−04 | −4.60809E−06 | 5.68828E−08 | −7.11595E−09 |
| 17 | 0.000 | −2.08401E−04 | 7.04191E−06 | −1.81825E−07 | 1.01916E−09 |
| 18 | 0.000 | −6.51757E−05 | 8.94762E−06 | −1.54656E−07 | 8.63243E−10 |
| 19 | −0.571 | −4.82656E−05 | 8.64157E−07 | −3.02594E−09 | 2.36819E−10 |

Table 23 lists the conic constants of the anamorphic aspherical surfaces.

TABLE 23

| | Ky | Kx |
|---|---|---|
| 14 | 0.000 | 0.000 |

Table 24 lists the coefficients of rotational symmetry of the anamorphic aspherical surfaces.

TABLE 24

| | $AR_4$ | $AR_6$ | $AR_8$ | $AR_{10}$ |
|---|---|---|---|---|
| 14 | 8.30789E−05 | −8.68897E−06 | −1.62025E−07 | −1.17543E−09 |

Table 25 lists the coefficients of rotational asymmetry of the anamorphic aspherical surfaces.

TABLE 25

| | $AP_4$ | $AP_6$ | $AP_8$ | $AP_{10}$ |
|---|---|---|---|---|
| 14 | −1.81810E+00 | −1.23091E+00 | −1.2718E+00 | −1.08816E+00 |

Table 26 lists the values of parameters of the conditional expressions of the propagation optical system according to the sixth example.

TABLE 26

| (Rp + Rn)/(Rp − Rn) | −0.77 |
|---|---|
| Sagp/Sag_rp | 0.79 |
| Sagn/Sag_rn | 0.92 |
| Pos1/Y | −0.21 |
| TLRa/TLR | 0.58 |
| TLA/TL | 0.37 |
| TLC/TLR | 0.41 |
| β_relay | 1.99 |

The ray height "H" for calculating the parameter is 5.9 (H=5.9) for the conditional expression (12) and 3.7 (H=3.7) for the conditional expression (13).

Seventh Example

Figure 14A:
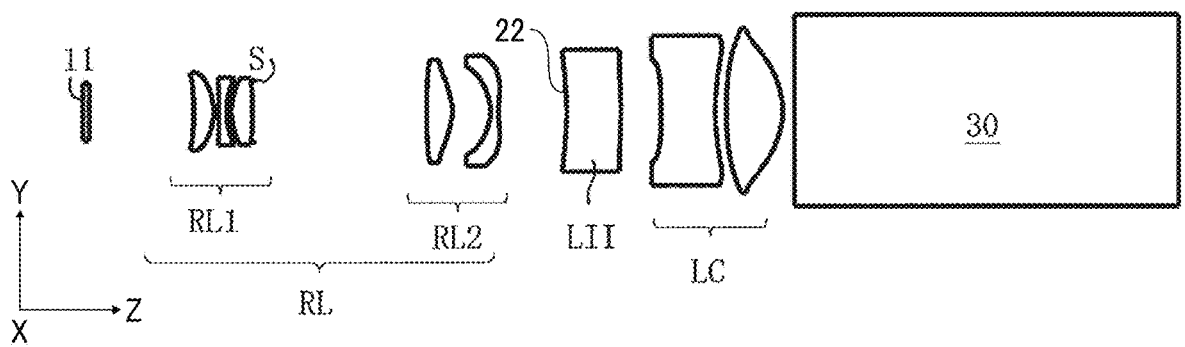
FIGS. 14A and 14B are illustrations of a configuration of a propagation optical system according to a seventh example.
Figure 14B:
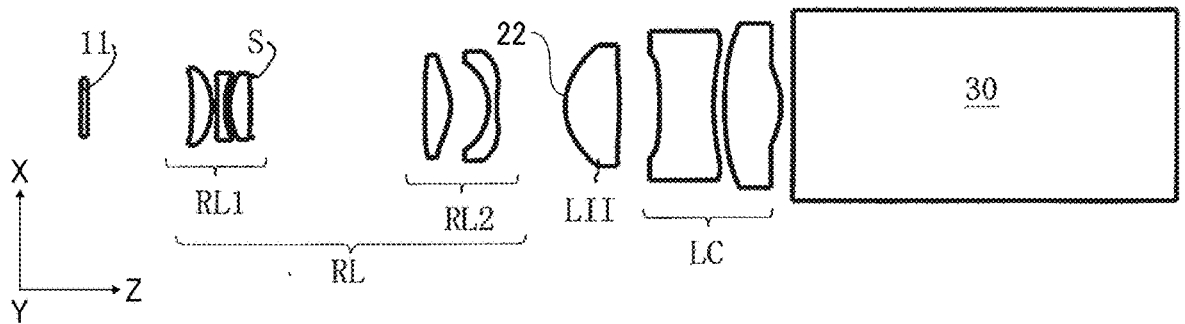

The seventh example uses the lens configuration of the propagation optical system as illustrated in FIGS. 14A and 14B.

The following describes the angle of view of the propagation optical system in each of the vertical direction (i.e., the y-direction), the horizontal direction (i.e., the x-direction), and the diagonal direction:

Angle-of-View
  Vertical direction (y-direction): 18.8 degrees Horizontal direction (x-direction): 35.5 degrees
  Diagonal direction: 40.0 degrees
  Virtual image distance: 1 m
  Table 27 lists data for the seventh example.

TABLE 27

| | Ry | Rx | D | Nd | vd | |
|---|---|---|---|---|---|---|
| 0 | | | 0.00 | | | |
| 1 | ∞ | ∞ | 0.70 | 1.51633 | 64.14 | S-BSL7(OHARA) |
| 2 | ∞ | ∞ | 11.73 | | | |
| 3* | −39.484 | −39.484 | 2.25 | 1.53100 | 56 | E48R(ZEON) |
| 4* | −6.520 | −6.520 | 0.52 | | | |
| 5* | 249.561 | 249.561 | 0.90 | 1.63200 | 23 | OKP4HT(Osaka Gas Chemicals) |
| 6* | 8.470 | 8.470 | 0.47 | | | |
| 7* | 6.135 | 6.135 | 2.35 | 1.53100 | 56 | E48R(ZEON) |
| 8* | −102.133 | −102.133 | 0.20 | | | |
| 9 | STOP | | 19.21 | | | |
| 10* | 107.278 | 107.278 | 2.84 | 1.53100 | 56 | E48R(ZEON) |
| 11* | −6.335 | −6.335 | 4.37 | | | |
| 12* | −5.458 | −5.458 | 0.91 | 1.53100 | 56 | E48R(ZEON) |
| 13* | 12.997 | 12.997 | 7.62 | | | |
| 14* | −40.807 | 6.898 | 6.00 | 1.53100 | 56 | E48R(ZEON) |
| 15* | −55.552 | −55.552 | 4.45 | | | |
| 16* | −343.746 | −343.746 | 6.00 | 1.63200 | 23 | OKP4HT(Osaka Gas Chemicals) |

TABLE 27-continued

|    | Ry     | Rx     | D     | Nd      | vd |           |
|----|--------|--------|-------|---------|----|-----------|
| 17* | 21.336 | 21.336 | 1.24 |         |    |           |
| 18* | 37.567 | 37.567 | 6.38 | 1.53100 | 56 | E48R(ZEON) |
| 19* | −9.081 | −9.081 | 1.30 |         |    |           |
| 20 | ∞      | ∞      | 42.69 | 1.53100 | 56 | E48R(ZEON) |
| 21 | ∞      | ∞      |       |         |    |           |

Table 28 lists the aspherical-surface data of the aspherical surfaces as in Table 2.

TABLE 28

|    | K      | A4           | A6           | A8           | A10          |
|----|--------|--------------|--------------|--------------|--------------|
| 3  | 0.000  | 2.17712E−04  | −4.12854E−05 | 9.72053E−06  | −7.35922E−07 |
| 4  | 0.000  | −1.08045E−03 | 3.13349E−04  | −2.31998E−05 | 3.79760E−07  |
| 5  | 0.000  | −1.82779E−03 | 4.61859E−04  | −4.28284E−05 | 9.44787E−07  |
| 6  | 0.000  | −2.43031E−04 | 3.51200E−05  | −1.19390E−07 | −3.07823E−07 |
| 7  | 0.000  | −7.30612E−04 | −1.73556E−04 | 1.74989E−05  | −4.20640E−07 |
| 8  | 0.000  | −7.41881E−04 | −2.57386E−05 | 3.82801E−07  | 2.35566E−07  |
| 10 | 0.000  | −8.46081E−05 | 1.90782E−05  | −4.23332E−07 | 2.52192E−09  |
| 11 | 0.000  | 1.62297E−03  | 3.65626E−06  | −5.51422E−08 | 6.06075E−09  |
| 12 | 0.000  | 2.13648E−03  | −1.49079E−04 | 4.252$SE−06  | −2.33543E−08 |
| 13 | 0.000  | −3.13931E−03 | 2.73068E−05  | 1.51446E−07  | −5.98917E−09 |
| 15 | 0.000  | −7.02120E−05 | 1.05079E−05  | −2.40669E−07 | 2.46177E−09  |
| 16 | 0.000  | −4.78743E−04 | −4.60809E−06 | 5.68828E−08  | −7.11595E−09 |
| 17 | 0.000  | −2.12149E−05 | 6.07956E−06  | −1.48577E−07 | 7.51206E−10  |
| 18 | 0.000  | −4.95982E−05 | 6.93974E−06  | −1.20040E−07 | 6.78296E−10  |
| 19 | −0.579 | −3.70110E−05 | 6.83450E−07  | −3.02120E−09 | 2.46618E−10  |

Table 29 lists the conic constants of the anamorphic aspherical surfaces.

TABLE 29

|    | Ky    | Kx    |
|----|-------|-------|
| 14 | 0.000 | 0.000 |

Table 30 lists the coefficients of rotational symmetry of the anamorphic aspherical surfaces.

TABLE 30

|    | AR$_4$ | AR$_5$ | AR$_8$ | AR$_{10}$ |
|----|--------|--------|--------|-----------|
| 14 | 1.17244E−04 | −8.38655E−06 | −1.65241E−07 | −1.06775E−09 |

Table 31 lists the coefficients of rotational asymmetry of the anamorphic aspherical surfaces.

TABLE 31

|    | AP$_4$ | AP$_6$ | AP$_8$ | AR$_{10}$ |
|----|--------|--------|--------|-----------|
| 14 | −1.37007E+00 | −1.16760E+00 | −1.02288E+00 | −1.01363E+00 |

Table 32 lists the values of parameters of the conditional expressions (1) to (7) of the propagation optical system according to the seventh example.

TABLE 32

| (Rp + Rn)/(Rp − Rn) | −0.71 |
|---|---|
| Sagp/Sag_rp | 0.83 |
| Sagn/Sag_rn | 0.98 |
| Pos1/Y | −0.22 |
| TLRa/TLR | 0.57 |
| TLA/TL | 0.37 |
| TLC/TLR | 0.40 |
| β_relay | 1.96 |

The ray height "H" for calculating the parameter is 5.9 (H=5.9) for the conditional expression (12) and 3.7 (H=3.7) for the conditional expression (13).

Eighth Example

Figure 15A:
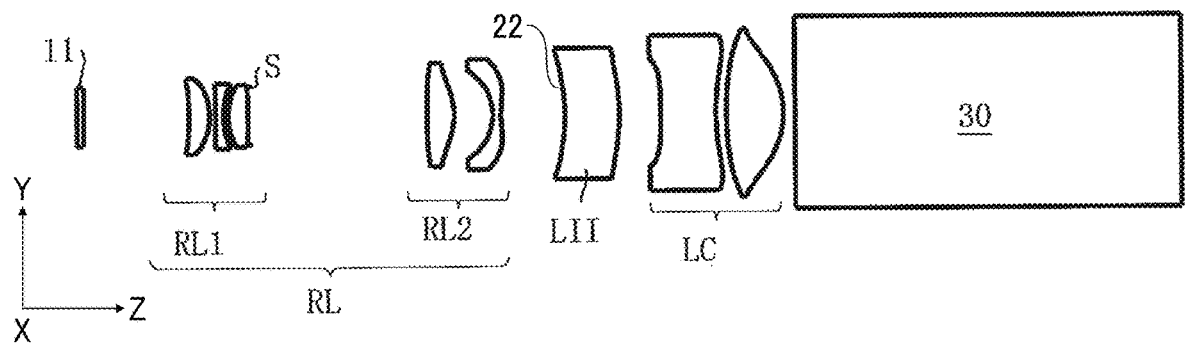
FIGS. 15A and 15B are illustrations of a configuration of a propagation optical system according to an eighth example.
Figure 15B:
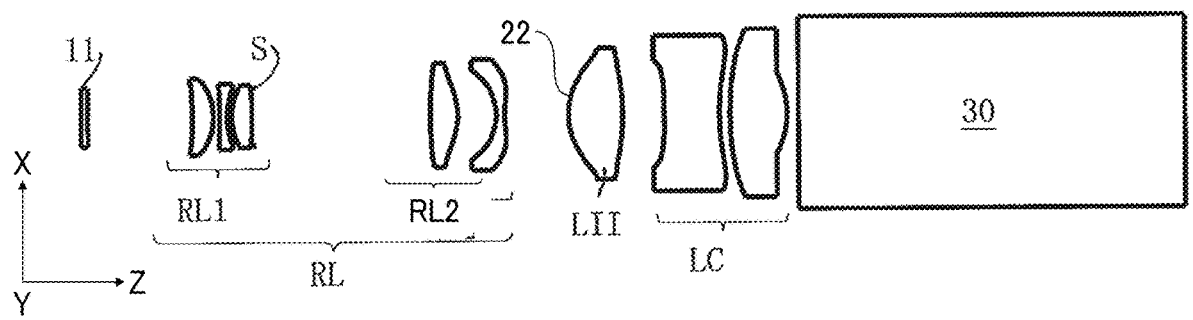

The eighth example uses the lens configuration of the propagation optical system as illustrated in FIGS. 15A and 15B.

The following describes the angle of view of the propagation optical system in each of the vertical direction (i.e., the y-direction), the horizontal direction (i.e., the x-direction), and the diagonal direction:

Angle-of-View

Vertical direction (y-direction): 18.9 degrees Horizontal direction (x-direction): 35.3 degrees Diagonal direction: 40.0 degrees Virtual image distance: 1 m Table 33 lists data for the eighth example.

TABLE 33

|  | Ry | Rx | D | Nd | vd |  |
|---|---|---|---|---|---|---|
| 0 |  |  | 0.00 |  |  |  |
| 1 | ∞ | ∞ | 0.70 | 1.51633 | 64.14 | S-BSL7(OHARA) |
| 2 | ∞ | ∞ | 11.68 |  |  |  |
| 3* | −36.658 | −36.658 | 2.29 | 1.53100 | 56 | E48R(ZEON) |
| 4* | −6.405 | −6.405 | 0.61 |  |  |  |
| 5* | 314.048 | 314.048 | 0.90 | 1.63200 | 23 | OKP4HT(Osaka Gas Chemicals) |
| 6* | 8.461 | 8.461 | 0.49 |  |  |  |
| 7* | 6.118 | 6.118 | 2.18 | 1.53100 | 56 | E48R(ZEON) |
| 8* | −98.683 | −98.683 | 0.20 |  |  |  |
| 9 | STOP |  | 19.56 |  |  |  |
| 10* | 101.987 | 101.987 | 3.03 | 1.53100 | 56 | E48R(ZEON) |
| 11* | −6.326 | −6.326 | 4.34 |  |  |  |
| 12* | −5.422 | −5.422 | 0.90 | 1.53100 | 56 | E48R(ZEON) |
| 13* | 12.890 | 12.890 | 7.11 |  |  |  |
| 14* | −21.507 | 8.000 | 6.00 | 1.53100 | 56 | E48R(ZEON) |
| 15* | −22.644 | −22.644 | 4.58 |  |  |  |
| 16* | −150.920 | −150.920 | 6.00 | 1.63200 | 23 | OKP4HT(Osaka Gas Chemicals) |
| 17* | 21.927 | 21.927 | 1.19 |  |  |  |
| 18* | 38.382 | 38.382 | 6.32 | 1.53100 | 56 | E48R(ZEON) |
| 19* | −9.162 | −9.162 | 1.30 |  |  |  |
| 20 | ∞ | ∞ | 42.69 | 1.53100 | 56 | E48R(ZEON) |
| 21 | ∞ | ∞ |  |  |  |  |

Table 34 lists the aspherical-surface data of the aspherical surfaces as in Table 2.

TABLE 34

|  | K | A4 | A6 | A8 | A10 |
|---|---|---|---|---|---|
| 3 | 0.000 | 3.11269E−04 | −4.14558E−05 | 8.67283E−06 | −6.72406E−07 |
| 4 | 0.000 | −9.13789E−04 | 2.62842E−04 | −1.87087E−05 | 2.71956E−07 |
| 5 | 0.000 | −1.74793E−03 | 4.15319E−04 | −3.83713E−05 | 8.66332E−07 |
| 6 | 0.000 | −2.41644E−04 | 3.47680E−05 | −3.20938E−07 | −2.85222E−07 |
| 7 | 0.000 | −7.19498E−04 | −1.69695E−04 | 1.65791E−05 | −3.93746E−07 |
| 8 | 0.000 | −7.12040E−04 | −2.80635E−05 | 5.67887E−07 | 2.26008E−07 |
| 10 | 0.000 | −4.58508E−05 | 1.81668E−05 | −3.64516E−07 | 3.16062E−09 |
| 11 | 0.000 | 1.57308E−03 | 7.36628E−06 | −2.46278E−07 | 1.08623E−08 |
| 12 | 0.000 | 1.49467E−03 | −8.47791E−05 | −2.29808E−07 | 8.47463E−08 |
| 13 | 0.000 | −3.23060E−03 | 3.06788E−05 | −2.06797E−07 | 4.04231E−09 |
| 15 | 0.000 | −7.31884E−05 | 1.03905E−05 | −2.12958E−07 | 1.38466E−09 |
| 16 | 0.000 | −4.78743E−04 | −4.60809E−06 | 5.68828E−08 | −7.11595E−09 |
| 17 | 0.000 | −2.31219E−04 | 6.13585E−06 | −1.40930E−07 | 6.83235E−10 |
| 18 | 0.000 | −5.60999E−05 | 6.80013E−06 | −1.16103E−07 | 6.50097E−10 |
| 19 | −0.575 | −3.35421E−05 | 6.88178E−07 | −3.79580E−09 | 2.43121E−10 |

Table 35 lists the conic constants of the anamorphic aspherical surfaces.

TABLE 35

|  | Ky | Kx |
|---|---|---|
| 14 | 0.000 | 0.000 |

Table 36 lists the coefficients of rotational symmetry of the anamorphic aspherical surfaces.

TABLE 36

|  | AR$_4$ | AR$_6$ | AR$_8$ | AR$_{10}$ |
|---|---|---|---|---|
| 14 | 2.58245E−04 | −9.32734E−06 | 1.54793E−07 | −9.75409E−10 |

Table 37 lists the coefficients of rotational asymmetry of the anamorphic aspherical surfaces.

TABLE 37

|  | AP$_4$ | AP$_6$ | AP$_8$ | AP$_{10}$ |
|---|---|---|---|---|
| 14 | −1.25053E+00 | −1.16556E+00 | −9.79655E−01 | −8.91028E−01 |

Table 38 lists the values of parameters of the conditional expressions (1) to (7) of the propagation optical system according to the eighth example.

TABLE 38

| (Rp + Rn)/(Rp − Rn) | −0.46 |
|---|---|
| Sagp/Sag_rp | 0.95 |
| Sagn/Sag_rn | 0.99 |
| Pos1/Y | −0.21 |
| TLRa/TLR | 0.57 |
| TLA/TL | 0.37 |
| TLC/TLR | 0.39 |
| β_relay | 1.92 |

The ray height "H" for calculating the parameter is 5.9 (H=5.9) for the conditional expression (12) and 3.7 (H=3.7) for the conditional expression (13).

Ninth Example

Figure 16A:
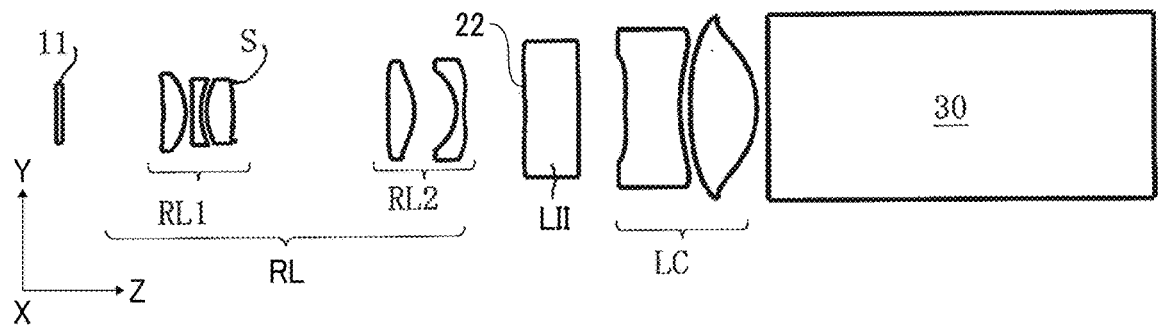
FIGS. 16A and 16B are illustrations of a configuration of a propagation optical system according to a ninth example.
Figure 16B:
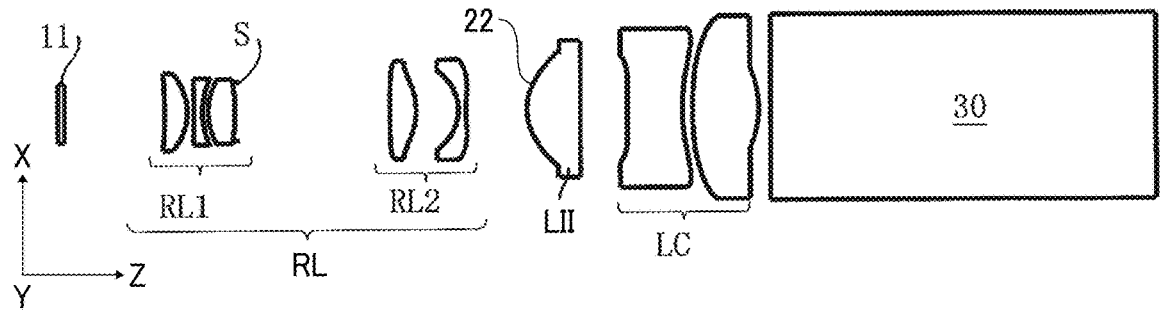
Figure 17A:
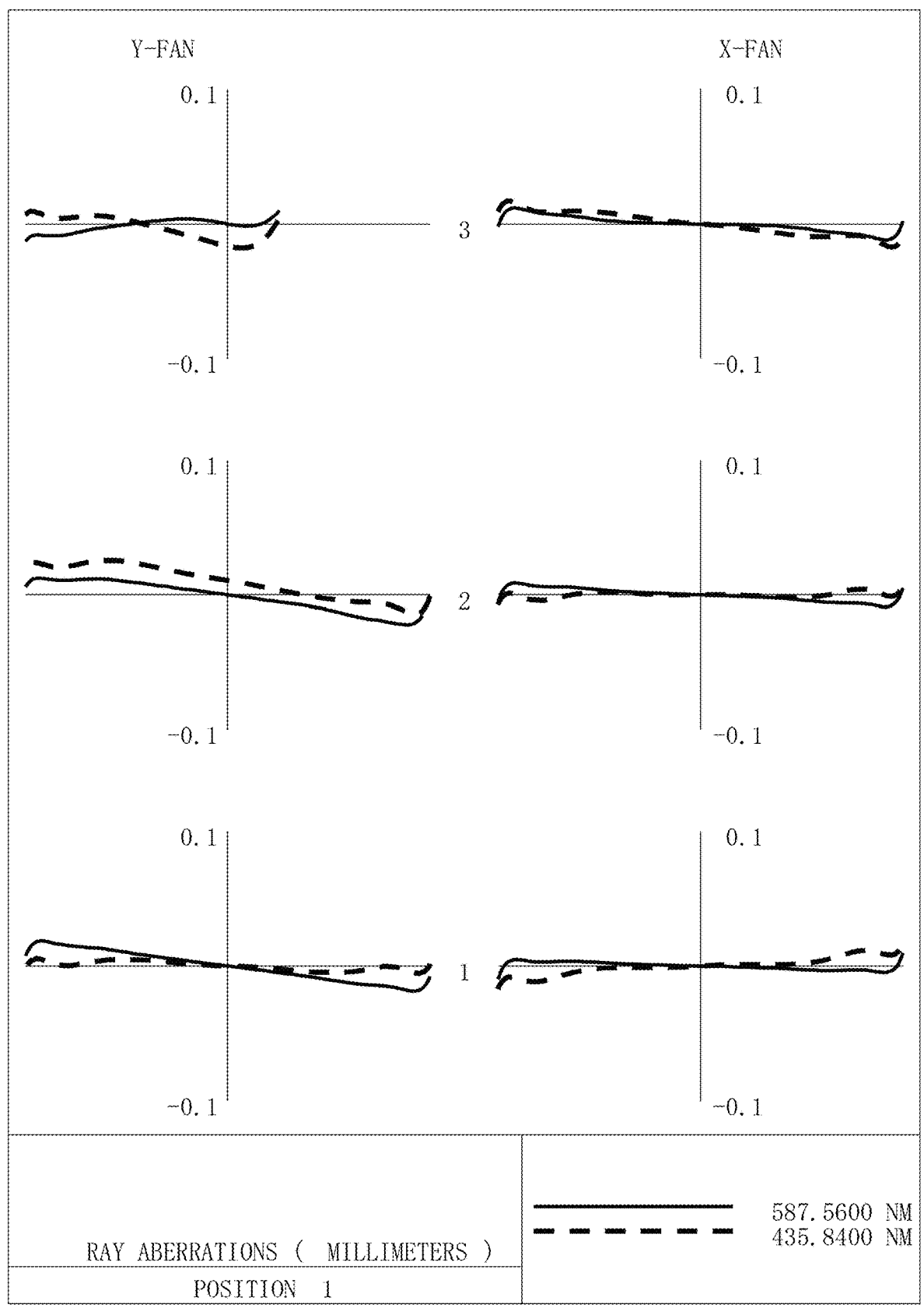
FIGS. 17A, 17B, and 17C are lateral aberration diagrams of the propagation optical system according to the sixth example.
Figure 17B:
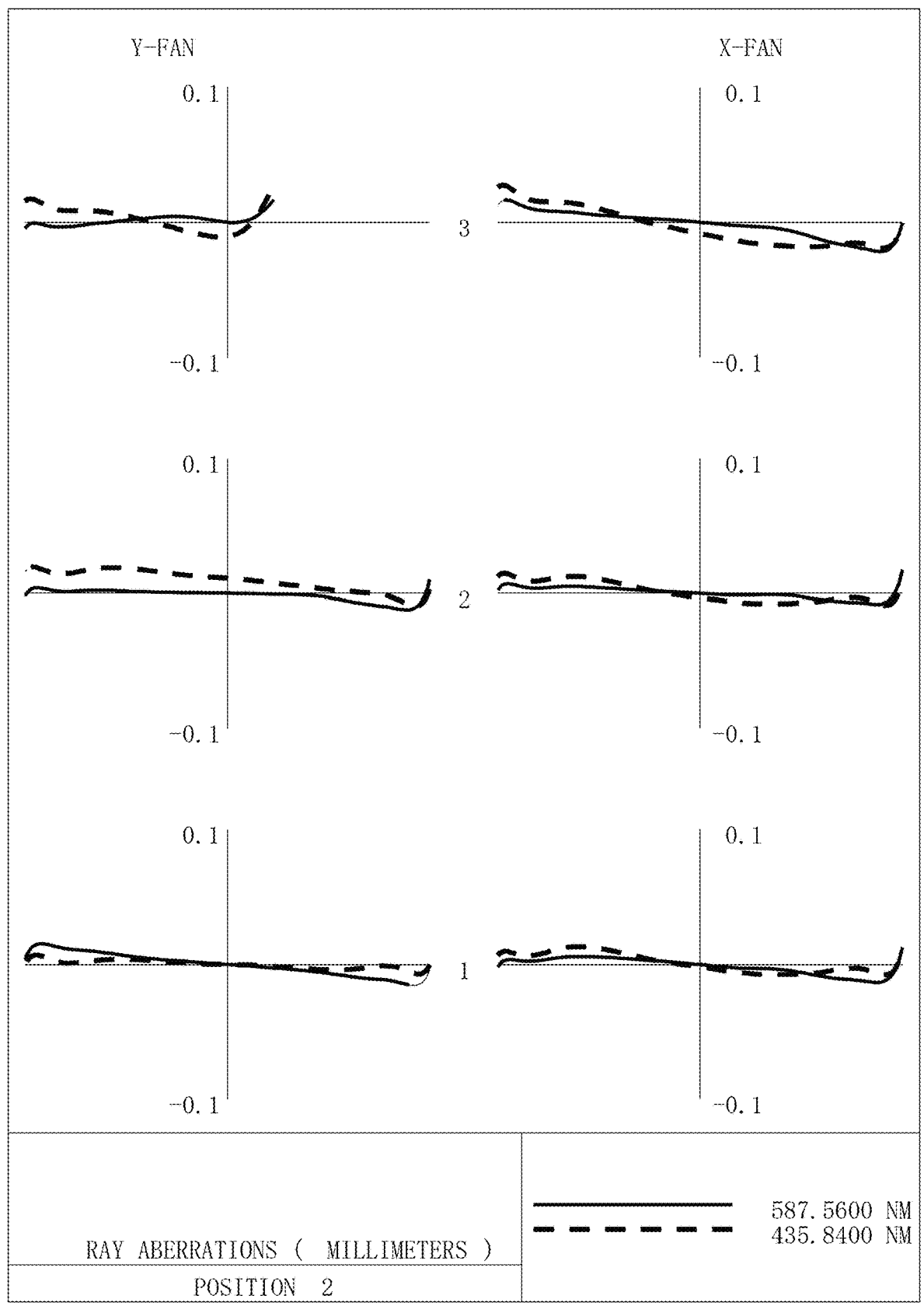
Figure 17C:
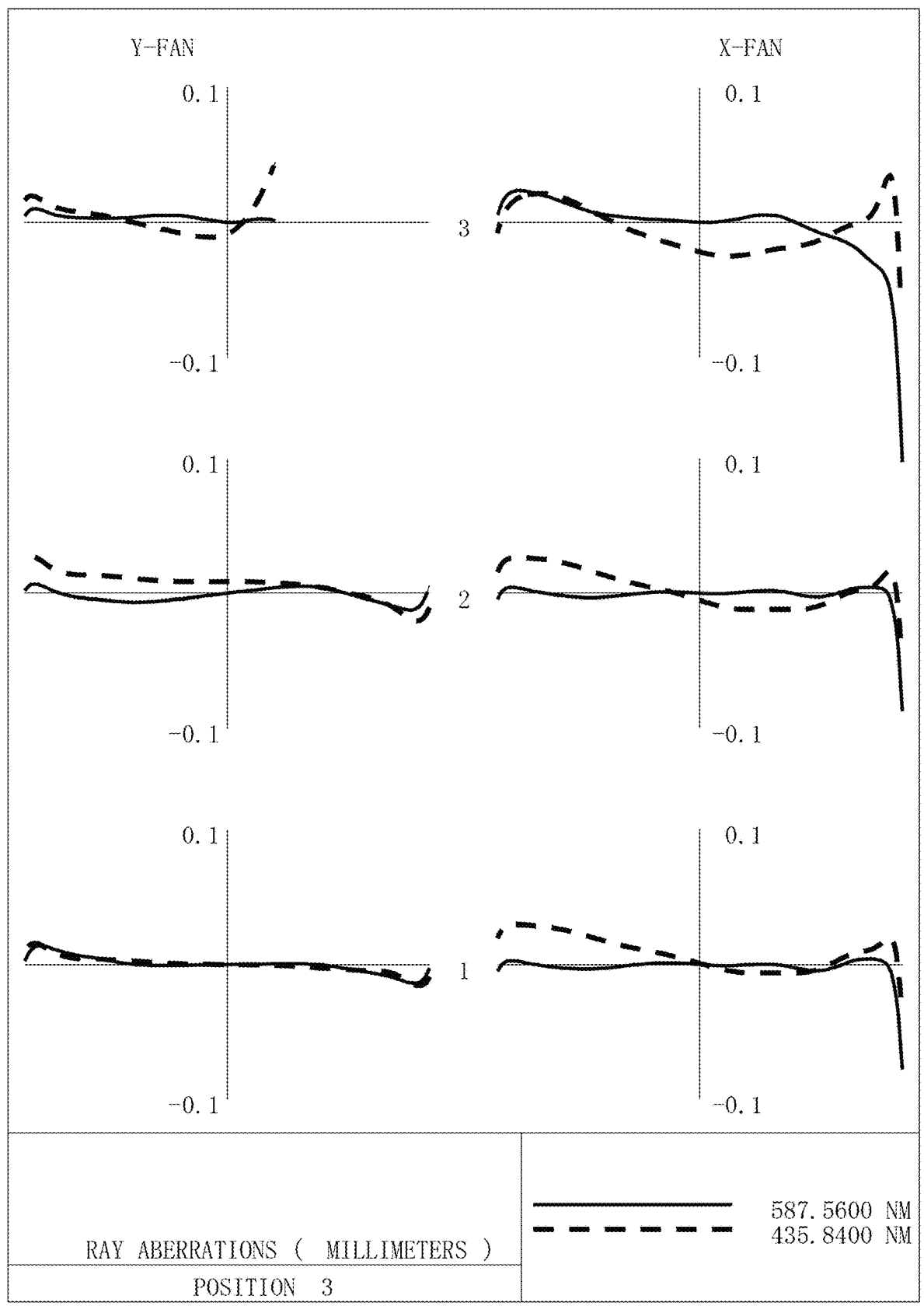
Figure 18A:
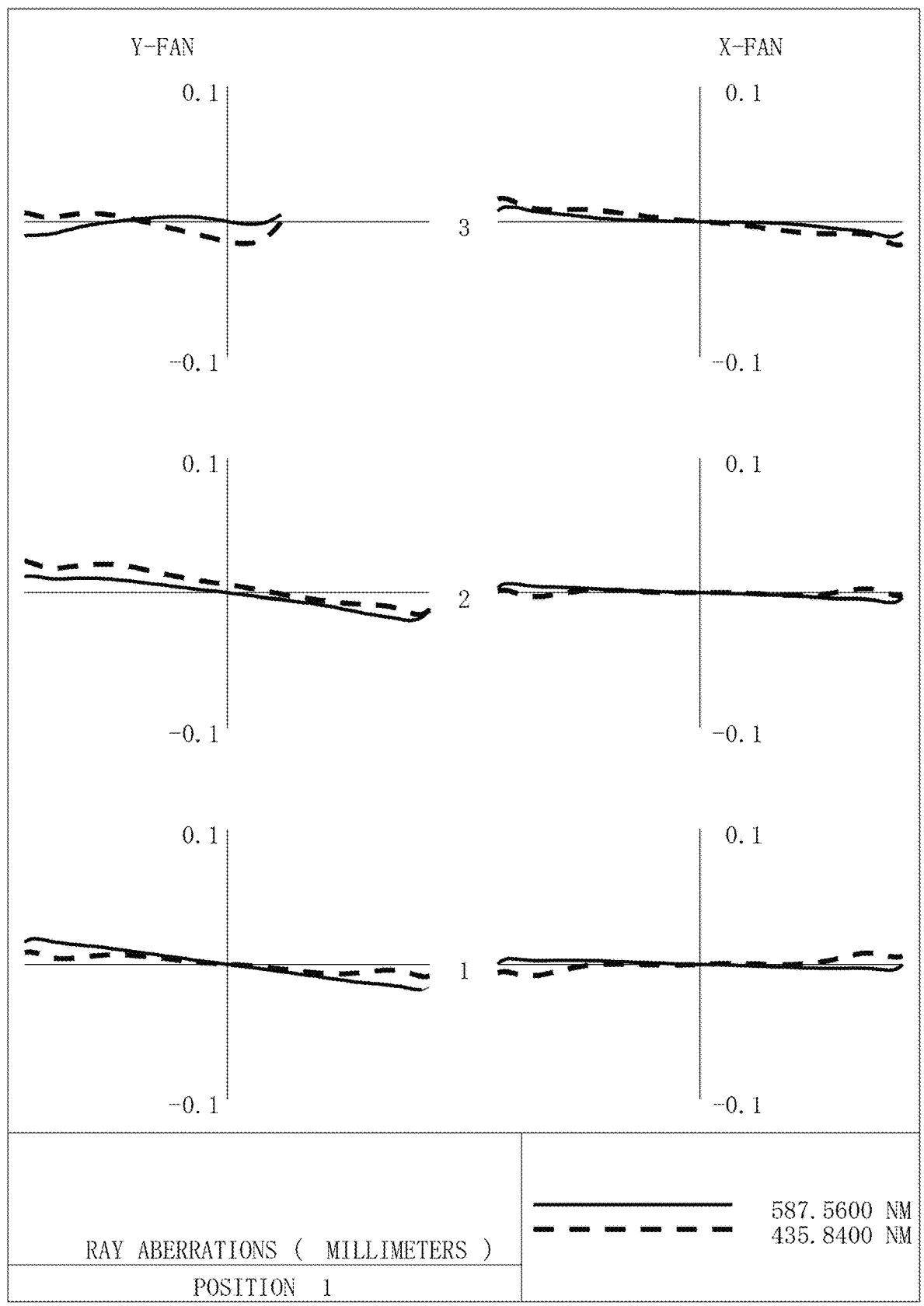
FIGS. 18A, 18B, and 18C are lateral aberration diagrams of the propagation optical system according to the seventh example.
Figure 18B:
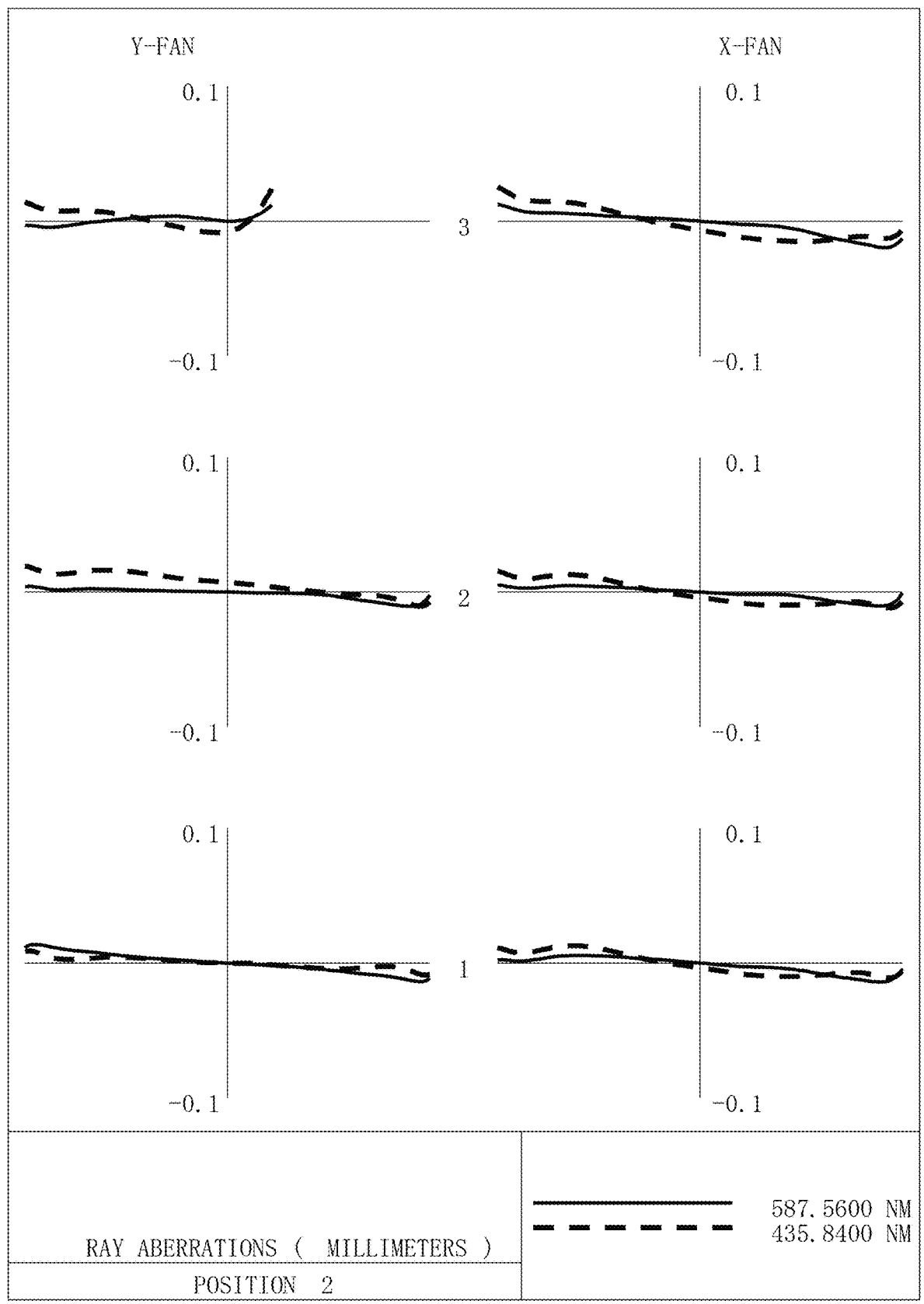
Figure 18C:
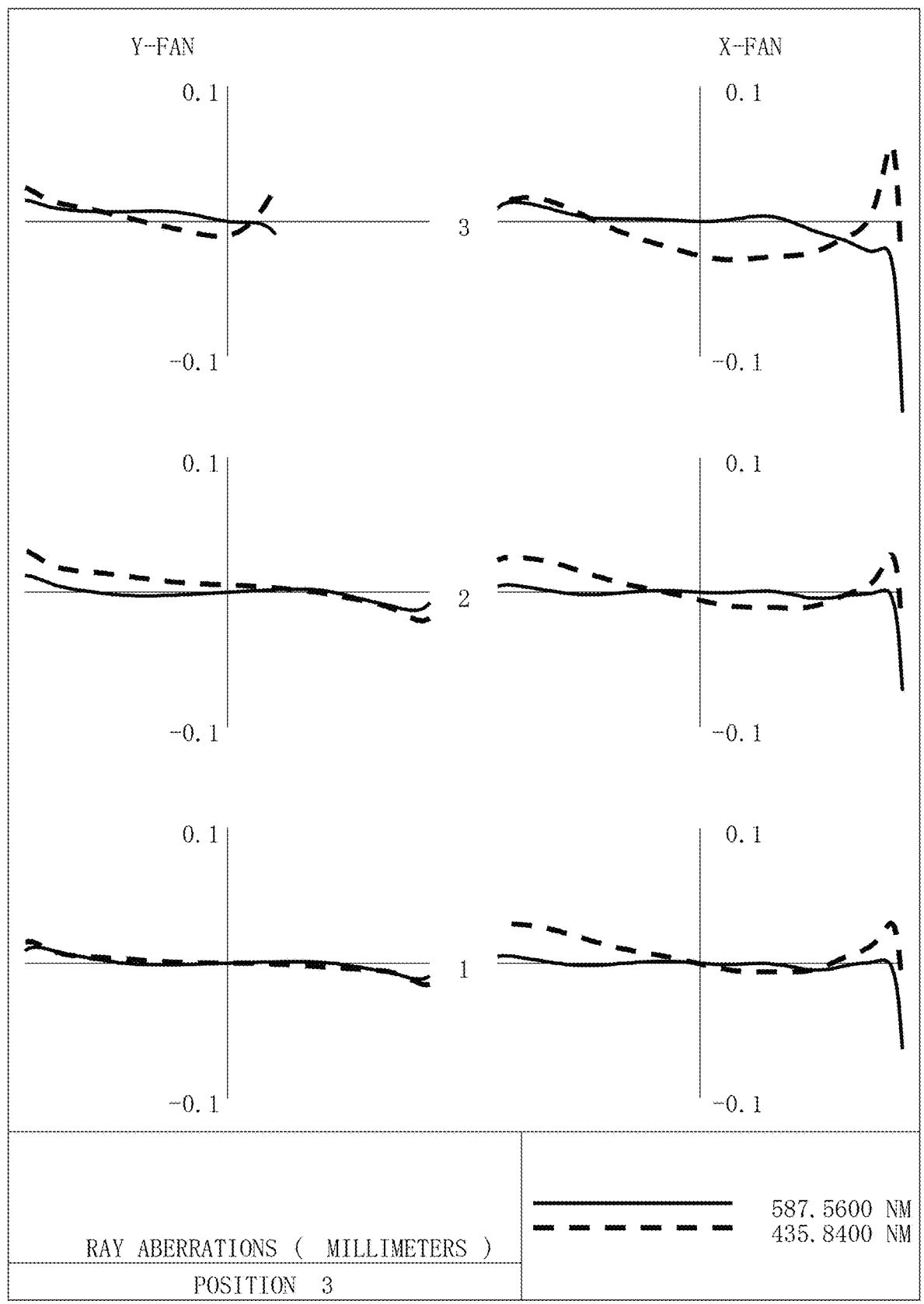
Figure 19A:
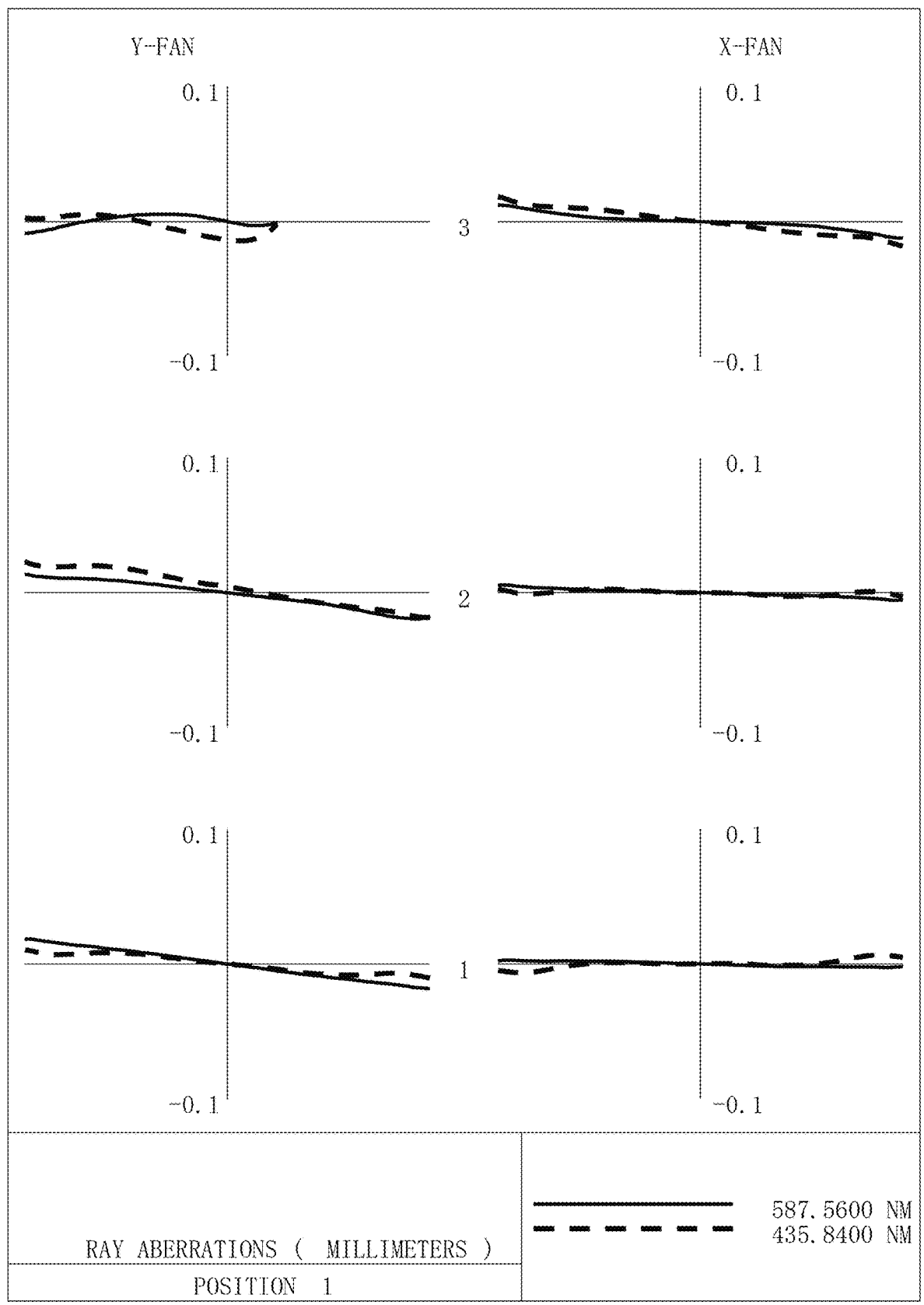
FIGS. 19A, 19B, and 19C are lateral aberration diagrams of the propagation optical system according to the eighth example.
Figure 19B:
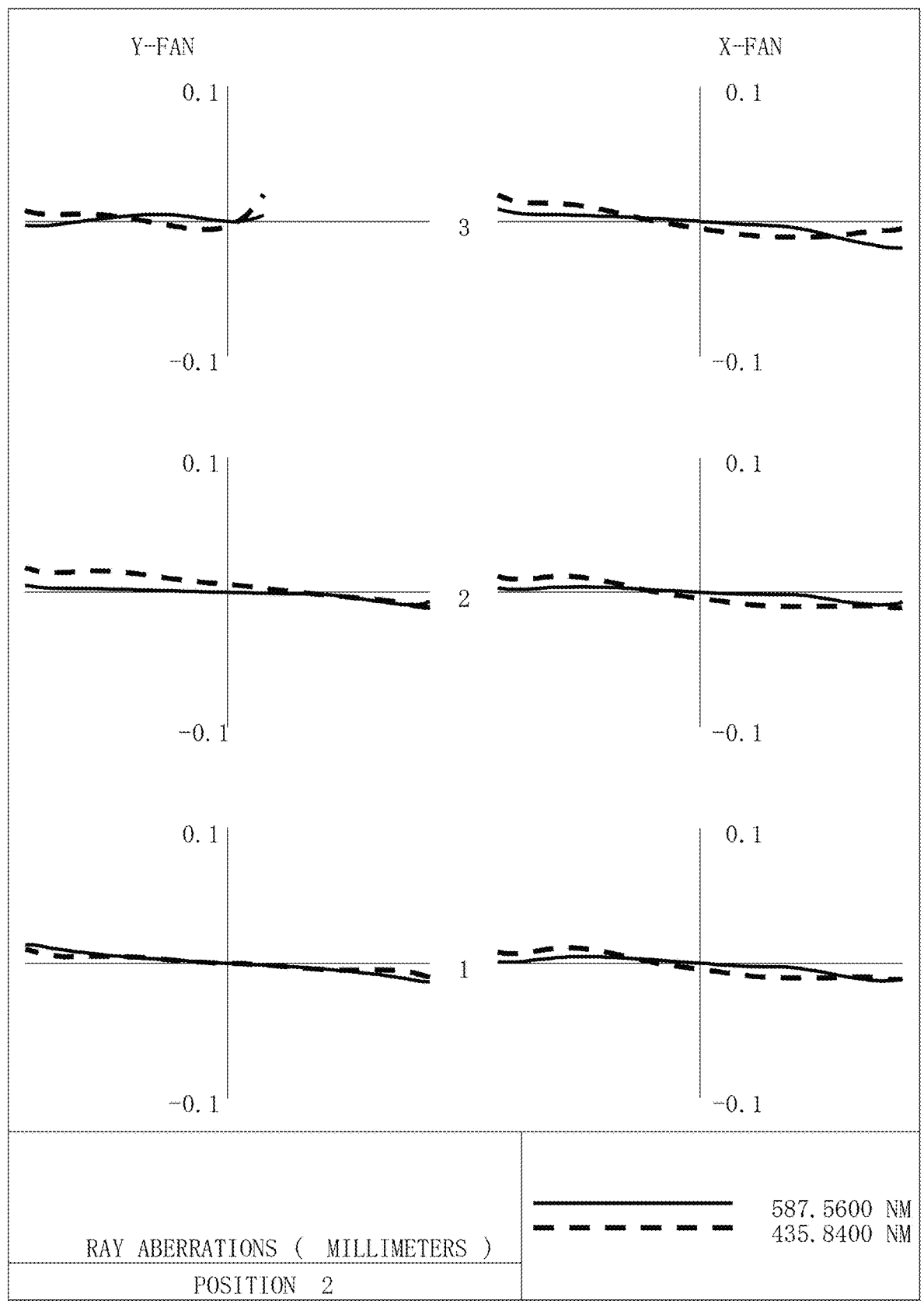
Figure 19C:
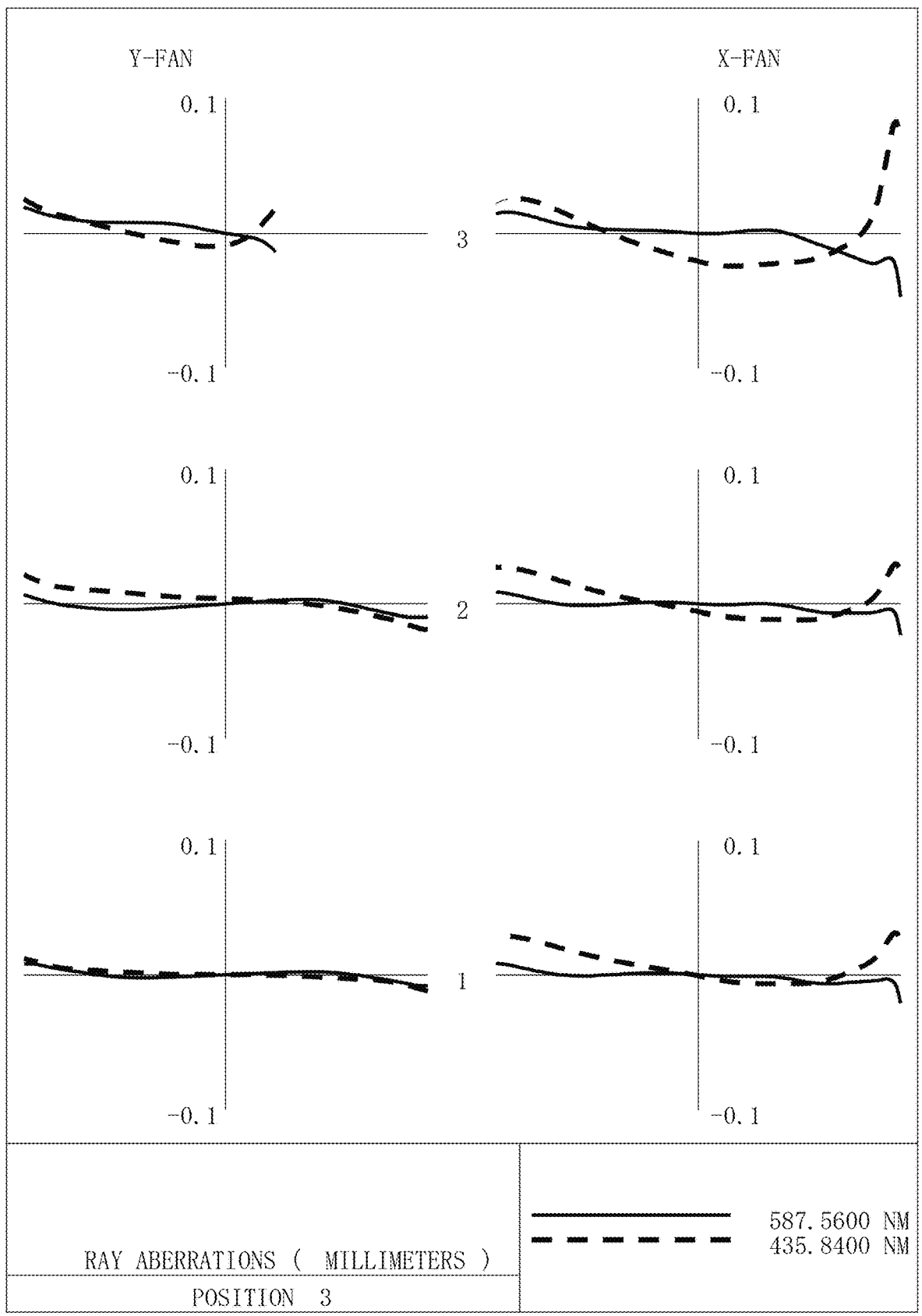
Figure 20A:
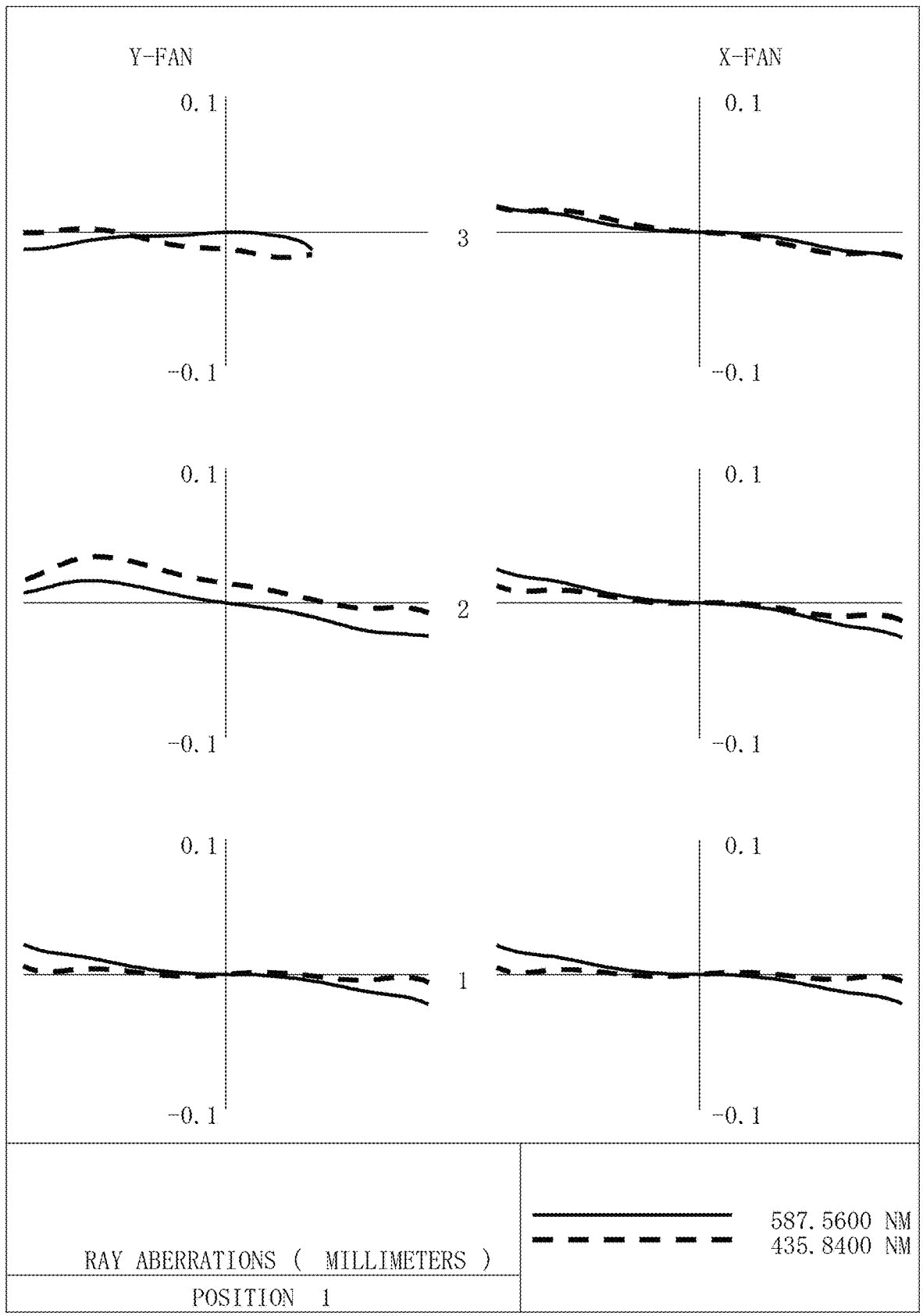
FIGS. 20A, 20B, and 20C are lateral aberration diagrams of the propagation optical system according to the ninth example.
Figure 20B:
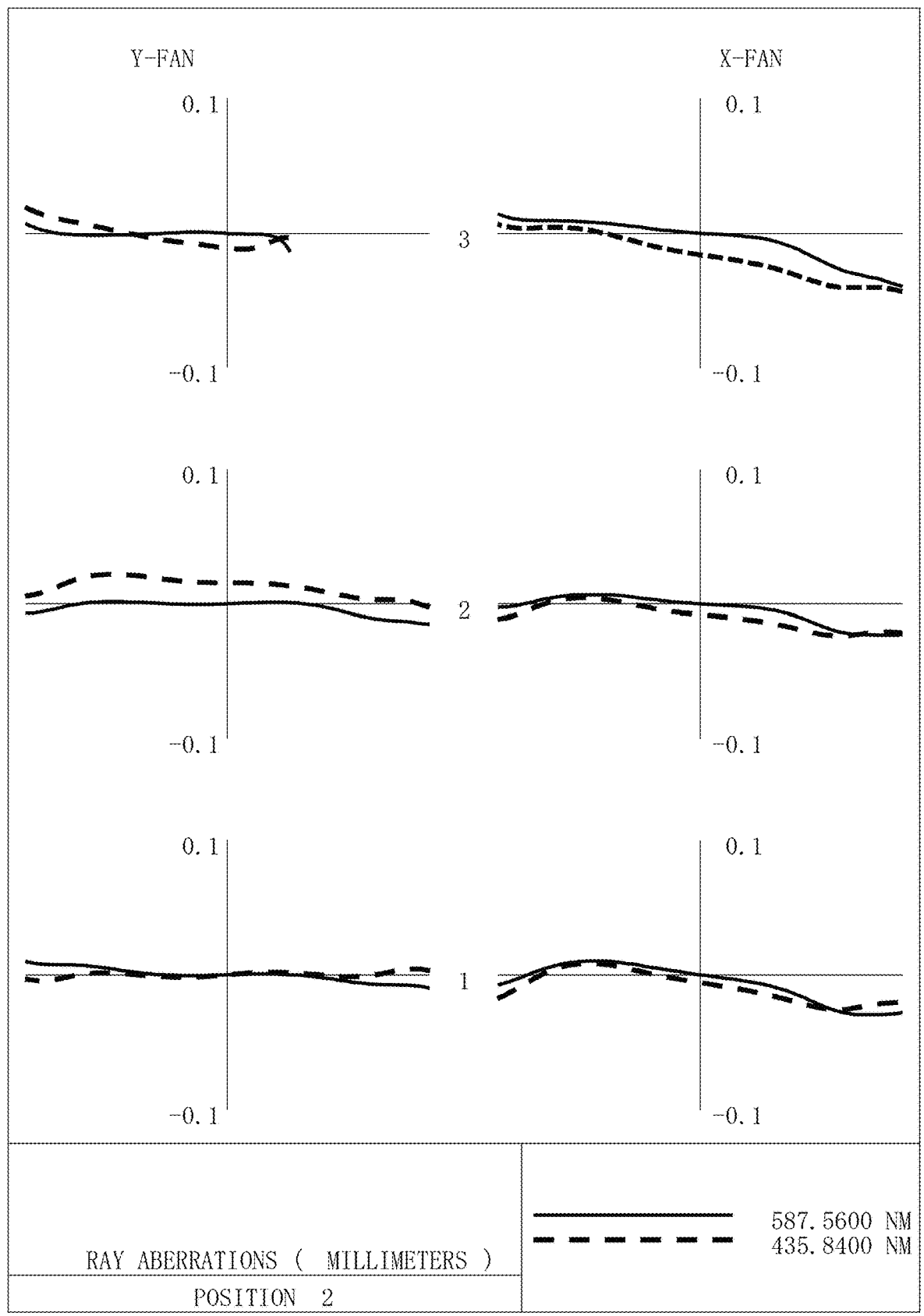
Figure 20C:
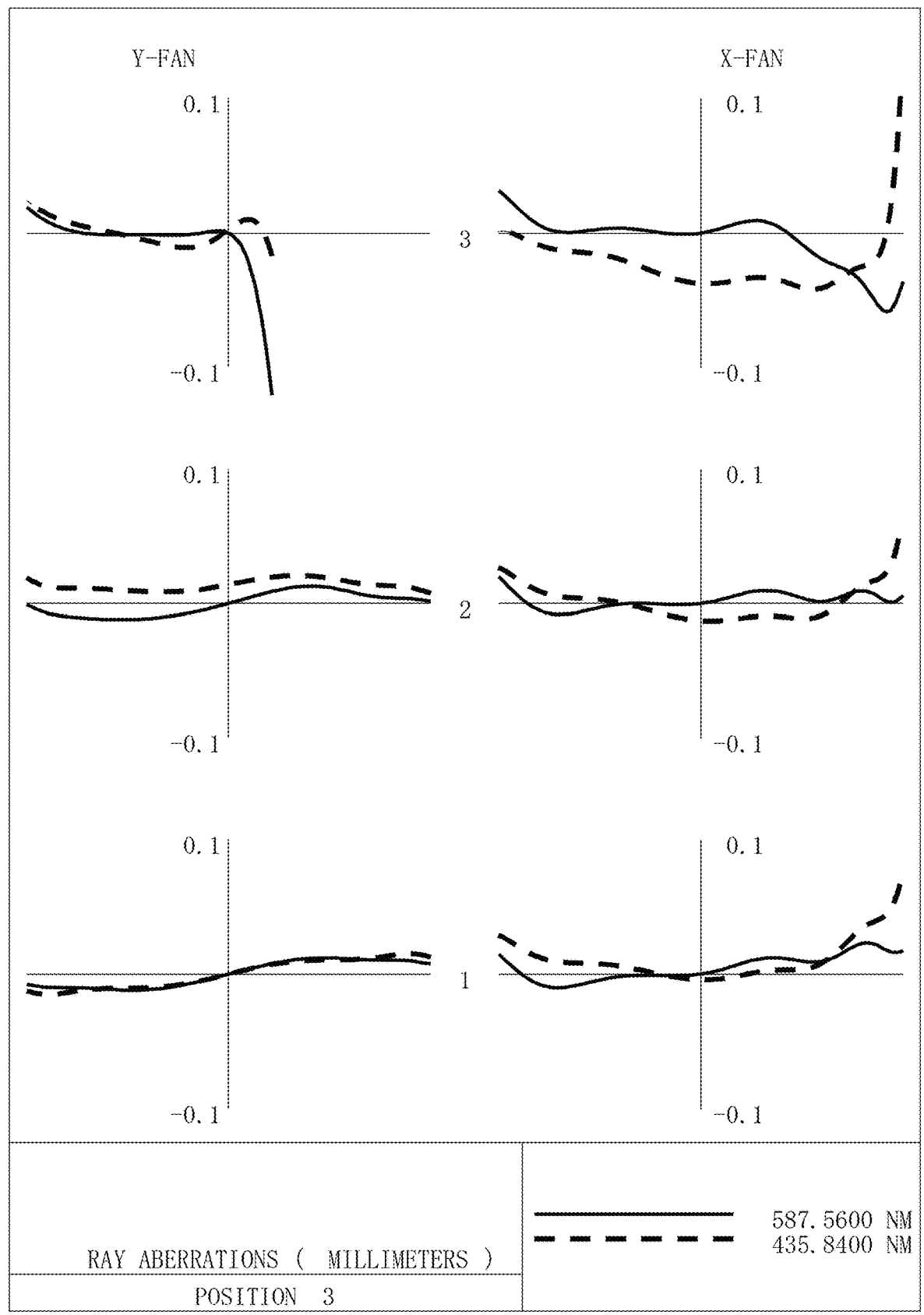

The ninth example uses the lens configuration of the propagation optical system as illustrated in FIGS. 16A and 16B.

The following describes the angle of view of the propagation optical system in each of the vertical direction (i.e., the y-direction), the horizontal direction (i.e., the x-direction), and the diagonal direction:

Angle-of-View
  Vertical direction (y-direction): 19.5 degrees Horizontal direction (x-direction): 34.6 degrees
  Diagonal direction: 40.0 degrees
  Virtual image distance: 1 m Table 39 lists data for the ninth example.

TABLE 39

|  | Ry | Rx | D | Nd | vd |  |
|---|---|---|---|---|---|---|
| 0 |  |  | 0.00 |  |  |  |
| 1 | ∞ | ∞ | 0.70 | 1.51633 | 64.14 | S-BSL7(OHARA) |
| 2 | ∞ | ∞ | 11.19 |  |  |  |
| 3* | −33.405 | −33.405 | 2.51 | 1.53100 | 56 | E48R(ZEON) |
| 4* | −6.394 | −6.394 | 0.75 |  |  |  |
| 5* | −172.749 | −172.749 | 0.93 | 1.63200 | 23 | OKP4HT(Osaka Gas Chemicals) |
| 6* | 8.560 | 8.560 | 0.58 |  |  |  |
| 7* | 6.231 | 6.231 | 2.90 | 1.53100 | 56 | E48R(ZEON) |
| 8* | −45.757 | −45.757 | 0.20 |  |  |  |
| 9 | STOP |  | 16.95 |  |  |  |
| 10* | 131.746 | 131.746 | 2.94 | 1.53100 | 56 | E48R(ZEON) |
| 11* | −6.018 | −6.018 | 4.66 |  |  |  |
| 12* | −4.952 | −4.952 | 0.91 | 1.53100 | 56 | E48R(ZEON) |
| 13* | 9.671 | 9.671 | 6.77 |  |  |  |
| 14* | −70.647 | 6.898 | 5.91 | 1.53100 | 56 | E48R(ZEON) |
| 15 | ∞ | ∞ | 5.20 |  |  |  |
| 16* | 74.488 | 74.488 | 6.00 | 1.63200 | 23 | OKP4HT(Osaka Gas Chemicals) |
| 17* | 21.244 | 21.244 | 1.11 |  |  |  |
| 18* | 32.976 | 32.976 | 7.39 | 1.53100 | 56 | E48R(ZEON) |
| 19* | −9.389 | −9.389 | 1.30 |  |  |  |
| 20 | ∞ | ∞ | 42.69 | 1.53100 | 56 | E48R(ZEON) |
| 21 | ∞ | ∞ |  |  |  |  |

Table 40 lists the aspherical-surface data of the aspherical surfaces as in Table 2.

TABLE 40

|  | K | A4 | A6 | A8 | A10 |
|---|---|---|---|---|---|
| 3 | 0.000 | 3.27069E−04 | −1.78574E−05 | 7.50597E−06 | −5.40216E−07 |
| 4 | 0.000 | −1.20730E−03 | 2.90676E−04 | −1.75694E−05 | 2.39631E−07 |
| 5 | 0.000 | −1.91737E−03 | 4.22213E−04 | −3.45347E−05 | 6.00032E−07 |
| 6 | 0.000 | −1.94436E−04 | 2.75983E−05 | 4.25755E−06 | −5.15839E−07 |
| 7 | 0.000 | −8.22136E−04 | −1.80489E−04 | 2.03990E−05 | −5.79700E−07 |
| 8 | 0.000 | −6.98195E−04 | −5.05036E−05 | 3.71852E−06 | 6.10308E−08 |
| 10 | 0.000 | 1.83968E−04 | −2.44547E−05 | 1.60437E−06 | −1.87825E−08 |
| 11 | 0.000 | 2.07011E−03 | −6.07144E−05 | 2.72431E−06 | −1.77280E−08 |
| 12 | 0.000 | 2.22220E−03 | −3.82183E−04 | 2.49803E−05 | −4.76838E−07 |
| 13 | 0.000 | −4.89637E−03 | 8.21883E−05 | 8.07100E−07 | −3.90139E−08 |
| 16 | 0.000 | −4.78743E−04 | −4.60809E−05 | 5.68828E−08 | −7.11595E−09 |
| 17 | 0.000 | −7.94488E−05 | 1.29910E−06 | −4.37167E−08 | 3.90021E−11 |
| 18 | 0.000 | −3.44986E−05 | 5.36498E−06 | −8.15318E−08 | 4.31115E−10 |
| 19 | −0.519 | −4.83921E−05 | 1.22922E−06 | −2.03319E−08 | 3.49762E−10 |

Table 41 lists the conic constants of the anamorphic aspherical surfaces.

TABLE 41

|  | Ky | Kx |
|---|---|---|
| 14 | 0.000 | 0.000 |

Table 42 lists the coefficients of rotational symmetry of the anamorphic aspherical surfaces.

TABLE 42

|  | $AR_4$ | $AR_6$ | $AR_8$ | $AR_{10}$ |
|---|---|---|---|---|
| 14 | 3.22700E−04 | −1.84623E−05 | 3.06932E−07 | −2.02636E−09 |

Table 43 lists the coefficients of rotational asymmetry of the anamorphic aspherical surfaces.

TABLE 43

|  | AP4 | AP6 | AP8 | AP10 |
|---|---|---|---|---|
| 14 | −1.53968E+00 | −1.36178E+00 | −1.29961E+00 | −1.24937E+00 |

Table 44 lists the values of parameters of the conditional expressions of the propagation optical system according to the ninth example.

TABLE 44

| | |
|---|---|
| (Rp + Rn)/Rp − Rn) | −0.82 |
| Sagp/Sag_rp | 0.71 |
| Sagn/Sag_rn | 0.79 |
| Pos1/Y | 0.03 |
| TLRa/TLR | 0.51 |
| TLA/TL | 0.39 |
| TLC/TLR | 0.43 |
| β_relay | 2.01 |

The ray height "H" for calculating the parameter is 5.9 (H=5.9) for the conditional expression (12) and 3.7 (H=3.7) for the conditional expression (13).

FIGS. 17 to 20 are lateral aberration diagrams of the propagation optical systems according to the sixth example to the ninth example. Similarly to FIGS. 8 to 12, the lateral aberrations in those diagrams each are at a position defined by a combination of the vertical positions "1", "2", and "3" and the horizontal (lateral) positions (a), (b), and (c) in a virtual image as illustrated in FIG. 7.

As is clear from the lateral aberrations in FIGS. 17 to 20, the propagation optical systems used in the sixth example to the ninth example have a high performance.

Similarly to the first example to the fifth example, the propagation optical systems according to the sixth example to the ninth example each have a wide angle of view in each of the horizontal direction, the vertical direction, and the diagonal direction. Particularly in the horizontal direction (i.e., the longer-side direction of the image display area), an extremely wide angle of view of 35 or more degrees is achieved, and thus an extremely successful imaging performance is achieved.

In the aberration diagrams in the figures, the aberrations are calculated assuming that an image is formed by an ideal lens having a focal distance of 17 mm.

Using the propagation optical systems according to the first example to the ninth example provides a virtual image display device with a successful performance, as HMDs such as smart glasses. Using the propagation optical systems according to the first example to the ninth example achieves a high light-utilization efficiency and a wide-angle of view, thus achieving a successful imaging performance, even in a case where a thin light guiding member is used. Hence, the embodiments of the present disclosure enable a lightweight and compact virtual image display device.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A propagation optical system incorporated in a virtual image display device, to propagate light emitted from an image display element to a light guide member to display a virtual image, the propagation optical system comprising:
the image display element configured to emit light to display an image;
a first optical system;
an intermediate optical element; and
a second optical system,
the first optical system, the intermediate optical element, and the second optical system being sequentially arranged in a direction from the image display element toward the light guide member along an optical axis,
wherein the intermediate optical element has a non-rotationally symmetric curved surface, of which shape is non-rotationally symmetric about the optical axis,
wherein, a cross-sectional shape, of the non-rotationally symmetric curved surface, in a first plane including the optical axis is a non-arc shape,
wherein the first plane is a plane in which the non-rotationally symmetric surface has a strongest positive power among planes including the optical axis,
wherein the propagation optical system is configured to form, between the first optical system and the second optical system, an intermediate image corresponding the image displayed on the image display element,
wherein the first optical system is composed of a first front group and a first rear group each having positive power, sequentially arranged in the direction form the image display element toward the light guide member,
wherein the first front group has a plurality of lenses,
wherein the first rear group has a plurality of lenses, and
wherein a distance between the first front group and the first rear group along the optical axis is longest among distances along the optical axis between any neighboring two lenses within the first optical system.

2. The propagation optical system according to claim 1, wherein the non-arc shape has a decreasing positive power with an increase in distance from the optical axis.

3. The propagation optical system according to claim 2, wherein conditional expression (1) is satisfied:

$$0.02 < \text{Sag}/H < 0.25 \quad (1)$$

where

Sag is a maximum value of difference in sag amount between the non-arc shape and an arc having a paraxial curvature of the non-arc shape in a specific plane, and H is an effective ray height from the optical axis in the specific plane.

4. The propagation optical system according to claim 1, wherein the non-rotationally symmetric curved surface is an anamorphic aspherical surface.

5. The propagation optical system according to claim 4, wherein conditional expression (11) is satisfied:

$$-0.9 < (Rp+Rn)/(Rp-Rn) < -0.3 \quad (11)$$

where

Rp is a paraxial radius of curvature of the anamorphic aspherical surface in the first plane, and Rn is a paraxial radius of curvature of the anamorphic aspherical surface in a second plane that includes the optical axis and orthogonal to the first plane.

6. The propagation optical system according to claim 4, wherein the anamorphic aspherical surface has a shape, in the first plane, having a decreasing positive power with an increase in distance from the optical axis.

7. The propagation optical system according to claim 6, wherein conditional expression (12) is satisfied:

$$0.6 < \text{Sag}p/\text{Sag}\_rp < 1.0 \quad (12)$$

where

Sagp is a maximum value of a sag amount of the anamorphic aspherical surface in the first plane, and Sag_rp is a sag amount defined by a circle, in the first plane, having a paraxial curvature of the anamorphic aspherical surface at a height which provides maximum value of the sag amount of the anamorphic aspherical surface.

8. The propagation optical system according to claim 4, wherein conditional expression (13) is satisfied:

$$0.6 < \text{Sag}n/\text{Sag\_}rn < 1.0 \quad (13)$$

where
Sagn is a maximum value of a sag amount of the anamorphic aspherical surface in a second plane that includes the optical axis and is orthogonal to the first plane, and
Sag_rn is a sag amount defined by a circle, in the second plane, having a paraxial curvature of the anamorphic aspherical surface at a height which provides maximum value of the sag amount of the anamorphic aspherical surface.

9. The propagation optical system according to claim 1, wherein the second optical system is composed of a negative lens and a positive lens sequentially arranged in the direction from the image display element to the light guide member.

10. The propagation optical system according to claim 1, wherein conditional expression (2) is satisfied:

$$0.4 < TLRa/TLR < 0.7 \quad (2)$$

where
TLR is a total length of the first optical system along the optical axis, and
TLRa is a distance along the optical axis between the first front group and the first rear group.

11. The propagation optical system according to claim 1, wherein the first front group is composed of three lenses of a positive lens, a negative lens, and a positive lens sequentially arranged in the direction from the image display element to the light guide member.

12. The propagation optical system according to claim 1, wherein the first rear group is composed of two lenses of a positive lens and a negative lens sequentially arranged in the direction from the image display element to the light guide member.

13. The propagation optical system according to claim 1, wherein conditional expression (3) is satisfied:

$$0.1 < TLA/TL < 0.5 \quad (3)$$

where
TLA is a distance along the optical axis between the non-rotationally symmetric curved surface of the intermediate optical element and a surface closest to the light guide member within the second optical system, and
TL is a distance along the optical axis between a surface closest to the image display element within the first optical system and a surface closest to the light guide member within the second optical system.

14. The propagation optical system according to claim 1, wherein conditional expression (4) is satisfied:

$$0.3 < TLC/TLR < 0.6 \quad (4)$$

where
TLC is a total length of the second optical system along the optical axis, and
TLR is a total length of the first optical system along the optical axis.

15. The propagation optical system according to claim 1, wherein conditional expression (5) is satisfied:

$$-3.0 < \beta\_\text{relay} < -1.0 \quad (5)$$

where
β_relay is a lateral magnification of the first optical system.

16. The propagation optical system according to claim 1, wherein the intermediate optical element is a cylindrical lens.

17. The propagation optical system according to claim 1, wherein conditional expression (6) is satisfied:

$$-0.5 < \text{Pos1}/Y < 0.5 \quad (6)$$

where
Pos1 is a position of the intermediate image with reference to a position of the non-rotationally symmetric curved surface on the optical axis, and
Y is a diagonal length of an image display area of the image display element.

18. The propagation optical system according to claim 1, wherein conditional expression (7) is satisfied:

$$0.4 < f\_r/f\_rf < 0.8 \quad (7)$$

where
f_r is a focal length (>0) of the first optical system, and
f_rf is a focal length of the first front group.

19. A virtual image display device comprising:
an image display element configured to emit light to display an image;
the propagation optical system according to claim 1 configured to propagate light from the image display element to a light guide member; and
the light guide member configured to guide and output the light from the propagation optical system to display a virtual image corresponding to the image displayed by the image display element.

20. A propagation optical system incorporated in a virtual image display device, to propagate light emitted from an image display element to a light guide member to display a virtual image, the propagation optical system comprising:
a first optical system;
an intermediate optical element; and
a second optical system,
the first optical system, the intermediate optical element, and the second optical system being sequentially arranged in a direction from the image display element toward the light guide member along an optical axis,
wherein the intermediate optical element has a non-rotationally symmetric curved surface, of which shape is non-rotationally symmetric about the optical axis,
wherein, a cross-sectional shape, of the non-rotationally symmetric curved surface, in a first plane including the optical axis is non-arc shape,
wherein the first plane is a plane in which the non-rotationally symmetric surface has a strongest positive power among planes including the optical axis,
wherein the propagation optical system is configured to form, between the first optical system and the second optical system, an intermediate image corresponding to an image displayed on the image display element, and
wherein the second optical system is composed of a negative lens and a positive lens sequentially arranged in the direction from the image display element to the light guide member.

* * * * *